US009442470B2

(12) United States Patent
Noureldin et al.

(10) Patent No.: US 9,442,470 B2
(45) Date of Patent: Sep. 13, 2016

(54) METHODS FOR PLANNING AND RETROFIT OF ENERGY EFFICIENT ECO-INDUSTRIAL PARKS THROUGH INTER-TIME-INTER-SYSTEMS ENERGY INTEGRATION

(71) Applicant: Saudi Arabian Oil Company, Dhahran (SA)

(72) Inventors: Mahmoud Bahy Noureldin, Dhahran (SA); Abdulaziz M. Alnutaifi, Dhahran (SA); Mana M. Al-Owaidh, Al-Ulaya (SA)

(73) Assignee: Saudi Arabian Oil Company, Dhahran (SA)

( * ) Notice: Subject to any disclaimer, the term of this patent is extended or adjusted under 35 U.S.C. 154(b) by 619 days.

(21) Appl. No.: 13/920,840

(22) Filed: Jun. 18, 2013

(65) Prior Publication Data

US 2013/0325200 A1 Dec. 5, 2013

Related U.S. Application Data

(63) Continuation-in-part of application No. 13/858,731, filed on Apr. 8, 2013, now Pat. No. 9,360,910, and a continuation-in-part of application No. 13/858,718, filed on Apr. 8, 2013, now Pat. No. 9,378,313, which is (Continued)

(51) Int. Cl.
*G06F 17/50* (2006.01)
*G06G 7/48* (2006.01)
(Continued)

(52) U.S. Cl.
CPC ........... *G05B 15/02* (2013.01); *G06F 17/5009* (2013.01); *G06Q 50/06* (2013.01); *G06F 2217/16* (2013.01); *G06F 2217/80* (2013.01); *Y02P 80/10* (2015.11); *Y02P 80/15* (2015.11)

(58) Field of Classification Search
CPC .. G05B 15/02; G06Q 50/06; G06F 17/5009; G06F 2217/16; G06F 2217/80; Y02P 80/10; Y02P 80/15
USPC ........................................................ 703/1, 6
See application file for complete search history.

(56) References Cited

U.S. PATENT DOCUMENTS

| 5,886,895 A | 3/1999 | Kita |
| 7,698,022 B2 | 4/2010 | Noureldin |

(Continued)

OTHER PUBLICATIONS

Related U.S. Appl. No. 13/757,467, filed Feb. 1, 2013.

(Continued)

*Primary Examiner* — Dwin M Craig
(74) *Attorney, Agent, or Firm* — Bracewell LLP; Constance G. Rhebergen; Christopher L. Drymalla

(57) ABSTRACT

Methods of providing enhanced energy efficiency and reduced greenhouse gases for an eco-industrial park with retrofit in mind and eco-industrial park retrofit with retrofit in mind, are provided. An exemplary method includes identifying hybrid inter-time zones inter-area matching solutions through selecting best energy efficient routes, generating technically viable energy efficient eco-industrial parks alternatives, identifying best generation and allocation of energy utilities, and synthesizing a combined heat and power utility system that satisfies the eco-park demands during each time zone as well as rendering its best operating scenario at each specific time-zone. This inter-time-zones inter-area integration can include identifying the best and the second best matching solutions among processes in the eco-industrial park for spatial energy integration and the best and second best matching solutions among all time-zones for temporal energy integration and greenhouse gas emissions reduction for the optimal synthesis or retrofit of eco-industrial parks.

30 Claims, 68 Drawing Sheets

Related U.S. Application Data a continuation-in-part of application No. 12/767,315, filed on Apr. 26, 2010, now Pat. No. 8,417,486, said application No. 13/858,731 is a continuation-in-part of application No. 12/767,315, application No. 13/920,840, which is a continuation-in-part of application No. 12/480,415, filed on Jun. 8, 2009, now Pat. No. 8,606,551, application No. 13/920,840, which is a continuation-in-part of application No. 13/757,467, filed on Feb. 1, 2013, and a continuation-in-part of application No. 13/757,491, filed on Feb. 1, 2013.

(60) Provisional application No. 61/256,754, filed on Oct. 30, 2009, provisional application No. 61/172,698, filed on Apr. 24, 2009, provisional application No. 61/171,030, filed on Apr. 20, 2009, provisional application No. 61/207,874, filed on Jun. 6, 2008, provisional application No. 61/612,470, filed on Mar. 19, 2012.

(51) Int. Cl.
*G05B 15/02* (2006.01)
*G06Q 50/06* (2012.01)

(56) References Cited

U.S. PATENT DOCUMENTS

| | | | |
|---|---|---|---|
| 7,729,809 B2 | 6/2010 | Noureldin | |
| 7,873,443 B2 | 1/2011 | Noureldin | |
| 8,032,262 B2 | 10/2011 | Noureldin | |
| 8,116,918 B2 | 2/2012 | Noureldin | |
| 8,116,920 B2 | 2/2012 | Noureldin | |
| 8,150,559 B2 | 4/2012 | Noureldin | |
| 8,150,560 B2 | 4/2012 | Noureldin | |
| 8,311,682 B2 | 11/2012 | Noureldin | |
| 8,364,327 B2 | 1/2013 | Noureldin | |
| 8,417,486 B2 | 4/2013 | Noureldin | |
| 2003/0125905 A1* | 7/2003 | Patanian | F01K 13/003 702/182 |
| 2005/0116475 A1* | 6/2005 | Hibi | F02G 5/04 290/40 C |
| 2006/0178762 A1 | 8/2006 | Wroblewski | |
| 2009/0076790 A1 | 3/2009 | Fein | |
| 2009/0211263 A1 | 8/2009 | Coyle | |
| 2010/0030547 A1 | 2/2010 | Noureldin | |
| 2010/0070258 A1 | 3/2010 | Noureldin | |
| 2011/0015801 A1 | 1/2011 | Mazzarella | |
| 2011/0040550 A1 | 2/2011 | Graber | |
| 2011/0106504 A1 | 5/2011 | Noureldin | |
| 2011/0266207 A1 | 11/2011 | Willard | |
| 2012/0029897 A1 | 2/2012 | Cherian | |
| 2013/0013284 A1 | 1/2013 | Wang | |

OTHER PUBLICATIONS

Related U.S. Appl. No. 13/757,491, filed Feb. 1, 2013.
M. Bagajewicz, H. Rodera, "Energy Savings in the Total Site Heat Integration Across Many Plants," Computers and Chemical Engineering, 24, (1237-1242), 2000.
M. Noureldin, "GHG Emissions Reduction Via Energy Efficiency Optimization," Greenhouse Gases, chapter 4, (79-100), Croatia, Intech, 2012.
Related U.S. Appl. No. 13/858,731, filed Apr. 8, 2013.
Related U.S. Appl. No. 13/858,718, filed Apr. 8, 2013.
Related U.S. Appl. No. 13/920,808, filed Jun. 18, 2013.
Mohan, An Algebraic Targeting Approach for Effective Utilization of Biomass in Combined Heat and Power Systems Through Process Integration, Jun. 15, 2006.

* cited by examiner

| Symbol | Discretion |
|---|---|
| A | Cogeneration Units |
| B | Boilers Producing High Pressure Steam |
| C | Solar Thermal for Steam Generation at Medium pressure header |
| D | Process heating or Furnace Generating Medium pressure steam |
| E | Steam System Network Balance Summary |
| F | High Pressure Steam Header and Header Properties |
| G | High Pressure Steam Users (Heat Exchangers, columns, and so on) |
| H | Reducing station unit from High pressure header to Medium Pressure steam header |
| I | Back Pressure Steam Turbines Driving Mechanical Loads (pumps, compressors, fans..) |
| J | Back Pressure Steam Turbines Drives Generator |
| K | Solar Thermal for heating boiler feed water (BFW) on the condensate header |
| L | Condensing Steam Turbines Drives Generator |
| M | Process heating or Furnace Generating Low pressure steam |
| N | De-super-heater unit at low pressure steam header (injecting BFW to maintain header properties) |
| O | Deaerator units to remove air and pre-heat BFW |
| P | Medium Pressure Steam Users (Heat Exchangers, columns, and so on) |
| Q | Low Pressure Steam Users (Heat Exchangers, columns, and so on) |
| R | Flash drum to Recover steam from BD |
| S | Make-up Water to plant |
| T | Steam Fin-Fan Condensers to condense low pressure steam |

*FIG. 5.*

| Task type | Stream | Ts | Tt | FCp/h | Duration/schedule | | FCpt |
|---|---|---|---|---|---|---|---|
| Batch process | C1 | 50 | 176 | 0.158 | 4 h | (0→4) | 0.632 |
| | C2 | 130 | 131 | 29.75 | 5 h | (4→9) | 148.75 |
| | C3 | 50 | 140 | 0.238 | 7 h | (9→16) | 1.666 |
| | H1 | 248 | 68 | 0.079 | 12 h | (4→16) | 0.948 |
| | H2 | 266 | 265 | 29.25 | 7 h | (9→16) | 204.75 |
| | H3 | 284 | 68 | 0.079 | 2 h | (9→16) | 0.158 |
| | H4 | 212 | 68 | 0.117 | 6 h | (18→24) | 0.702 |
| Housing | H1 | 140 | 75 | 0.129 | 24 h | (0→24) | 3.096 |
| Compound | H2 | 150 | 120 | 0.042 | 9 h | (9→18) | 0.378 |
| | C | 100 | 170 | 0.042 | 12 h | (4→16) | 0.504 |
| Hospital/Hotels | H1 | 140 | 75 | 0.154 | 24 h | (0→24) | 3.696 |
| Compound | H2 | 230 | 120 | 0.019 | 9 h | (9→18) | 0.171 |
| | C | 100 | 250 | 0.022 | 14 h | (4→18) | 0.308 |
| Continuous | H1 | 680 | 120 | 1.117 | 24 h | (0→24) | 26.808 |
| Process I | C1 | 100 | 650 | 1.517 | 24 h | (0→24) | 36.408 |
| Continuous | H2 | 330 | 160 | 3.433 | 24 h | (0→24) | 82.392 |
| Process II | C2 | 156 | 240 | 5.958 | 24 h | (0→24) | 142.992 |

ECO-INDUSTRIAL PARK TIME-ZONES STREAMS DATA

| Stream name | Supply T | Target T | MCp |
|---|---|---|---|
| time-zone1-1_Hot | 670 | 320 | 4.43 |
| time-zone1-2_Hot | 320 | 150 | 18.2 |
| time-zone1-3_Hot | 150 | 130 | 4.47 |
| time-zone1-4_Hot | 130 | 110 | 5.6 |
| time-zone1-5_Hot | 110 | 65 | 1.33 |
| time-zone1-1_Cold | 50 | 100 | 0.63 |
| time-zone1-2_Cold | 100 | 156 | 6.7 |
| time-zone1-3_Cold | 156 | 176 | 30.9 |
| time-zone1-4_Cold | 176 | 240 | 29.87 |
| time-zone1-5_Cold | 240 | 650 | 6.07 |
| time-zone2-1_Hot | 670 | 320 | 5.586 |
| time-zone2-2_Hot | 320 | 238 | 27.75 |
| time-zone2-3_Hot | 238 | 150 | 27.42 |
| time-zone2-4_Hot | 150 | 130 | 5.979 |
| time-zone2-5_Hot | 130 | 110 | 7.383 |
| time-zone2-6_Hot | 110 | 65 | 1.807 |
| time-zone2-7_Hot | 65 | 58 | 0.393 |
| time-zone2-1_Cold | 100 | 130 | 7.9 |
| time-zone2-2_Cold | 130 | 131 | 7.56 |
| time-zone2-3_Cold | 131 | 156 | 7.9 |
| time-zone2-4_Cold | 156 | 170 | 37.693 |
| time-zone2-5_Cold | 170 | 240 | 37.485 |
| time-zone2-6_Cold | 240 | 250 | 7.693 |
| time-zone2-7_Cold | 250 | 650 | 7.586 |
| time-zone3-1_Hot | 670 | 320 | 7.82 |
| time-zone3-2_Hot | 320 | 256 | 31.85 |
| time-zone3-3_Hot | 256 | 255 | 236.6 |
| time-zone3-4_Hot | 255 | 238 | 31.85 |
| time-zone3-5_Hot | 238 | 220 | 32.4 |
| time-zone3-6_Hot | 220 | 150 | 32.54 |
| time-zone3-7_Hot | 150 | 140 | 8.8 |
| time-zone3-8_Hot | 140 | 130 | 8.8 |
| time-zone3-9_Hot | 130 | 110 | 10.78 |
| time-zone3-10_Hot | 110 | 65 | 2.534 |
| time-zone3-11_Hot | 65 | 58 | 0.553 |
| time-zone3-1_Cold | 50 | 100 | 1.666 |
| time-zone3-2_Cold | 100 | 140 | 12.2 |
| time-zone3-3_Cold | 140 | 156 | 11.067 |
| time-zone3-4_Cold | 156 | 170 | 52.773 |
| time-zone3-5_Cold | 170 | 240 | 52.479 |
| time-zone3-6_Cold | 240 | 250 | 10.773 |
| time-zone3-7_Cold | 250 | 650 | 10.619 |
| time-zone4-1_Hot | 670 | 320 | 2.23 |
| time-zone4-2_Hot | 320 | 274 | 9.1 |
| time-zone4-3_Hot | 274 | 220 | 9.26 |
| time-zone4-4_Hot | 220 | 150 | 9.3 |
| time-zone4-5_Hot | 150 | 140 | 2.83 |
| time-zone4-6_Hot | 140 | 130 | 2.51 |
| time-zone4-7_Hot | 130 | 110 | 3.08 |
| time-zone4-8_Hot | 110 | 65 | 0.728 |
| time-zone4-9_Hot | 65 | 58 | 0.16 |
| time-zone4-1_Cold | 100 | 156 | 3.1 |
| time-zone4-2_Cold | 156 | 240 | 3.3 |
| time-zone4-3_Cold | 240 | 250 | 3.078 |
| time-zone4-4_Cold | 250 | 650 | 3.03 |
| time-zone5-1_Hot | 670 | 320 | 6.702 |
| time-zone5-2_Hot | 320 | 202 | 27.3 |
| time-zone5-3_Hot | 202 | 150 | 28.002 |
| time-zone5-4_Hot | 150 | 130 | 3.402 |
| time-zone5-5_Hot | 130 | 110 | 9.102 |
| time-zone5-6_Hot | 110 | 65 | 2.24 |
| time-zone5-7_Hot | 65 | 58 | 0.7 |
| time-zone5-1_Cold | 100 | 156 | 3.102 |
| time-zone5-2_Cold | 156 | 240 | 44.85 |
| time-zone5-3_Cold | 240 | 650 | 9.102 |

FIG. 36.

ECO-INDUSTRIAL PARK TIME-ZONES STREAMS DATA MAPPING

| Stream Zone Mapping | Zone_1 | Zone_2 | Zone_3 | Zone_4 | Zone_5 |
|---|---|---|---|---|---|
| time-zone1-1_Hot | 1 | | | | |
| time-zone1-2_Hot | 1 | | | | |
| time-zone1-3_Hot | 1 | | | | |
| time-zone1-4_Hot | 1 | | | | |
| time-zone1-5_Hot | 1 | | | | |
| time-zone1-1_Cold | 1 | | | | |
| time-zone1-2_Cold | 1 | | | | |
| time-zone1-3_Cold | 1 | | | | |
| time-zone1-4_Cold | 1 | | | | |
| time-zone1-5_Cold | 1 | | | | |
| time-zone2-1_Hot | | 1 | | | |
| time-zone2-2_Hot | | 1 | | | |
| time-zone2-3_Hot | | 1 | | | |
| time-zone2-4_Hot | | 1 | | | |
| time-zone2-5_Hot | | 1 | | | |
| time-zone2-6_Hot | | 1 | | | |
| time-zone2-7_Hot | | 1 | | | |
| time-zone2-1_Cold | | 1 | | | |
| time-zone2-2_Cold | | 1 | | | |
| time-zone2-3_Cold | | 1 | | | |
| time-zone2-4_Cold | | 1 | | | |
| time-zone2-5_Cold | | 1 | | | |
| time-zone2-6_Cold | | 1 | | | |
| time-zone2-7_Cold | | 1 | | | |
| time-zone3-1_Hot | | | 1 | | |
| time-zone3-2_Hot | | | 1 | | |
| time-zone3-3_Hot | | | 1 | | |
| time-zone3-4_Hot | | | 1 | | |
| time-zone3-5_Hot | | | 1 | | |
| time-zone3-6_Hot | | | 1 | | |
| time-zone3-7_Hot | | | 1 | | |
| time-zone3-8_Hot | | | 1 | | |
| time-zone3-9_Hot | | | 1 | | |
| time-zone3-10_Hot | | | 1 | | |
| time-zone3-11_Hot | | | 1 | | |
| time-zone3-1_Cold | | | 1 | | |
| time-zone3-2_Cold | | | 1 | | |
| time-zone3-3_Cold | | | 1 | | |
| time-zone3-4_Cold | | | 1 | | |
| time-zone3-5_Cold | | | 1 | | |
| time-zone3-6_Cold | | | 1 | | |
| time-zone3-7_Cold | | | 1 | | |
| time-zone4-1_Hot | | | | 1 | |
| time-zone4-2_Hot | | | | 1 | |
| time-zone4-3_Hot | | | | 1 | |
| time-zone4-4_Hot | | | | 1 | |
| time-zone4-5_Hot | | | | 1 | |
| time-zone4-6_Hot | | | | 1 | |
| time-zone4-7_Hot | | | | 1 | |
| time-zone4-8_Hot | | | | 1 | |
| time-zone4-9_Hot | | | | 1 | |
| time-zone4-1_Cold | | | | 1 | |
| time-zone4-2_Cold | | | | 1 | |
| time-zone4-3_Cold | | | | 1 | |
| time-zone4-4_Cold | | | | 1 | |
| time-zone5-1_Hot | | | | | 1 |
| time-zone5-2_Hot | | | | | 1 |
| time-zone5-3_Hot | | | | | 1 |
| time-zone5-4_Hot | | | | | 1 |
| time-zone5-5_Hot | | | | | 1 |
| time-zone5-6_Hot | | | | | 1 |
| time-zone5-7_Hot | | | | | 1 |
| time-zone5-1_Cold | | | | | 1 |
| time-zone5-2_Cold | | | | | 1 |
| time-zone5-3_Cold | | | | | 1 |

| Equip. Name | Min | Max |
|---|---|---|
| HP- Boiler | 0 | 550 |
| HP- Cogen | 0 | 1000 |
| MP- Boiler | 0 | 450 |
| MP- Cogen | 0 | 400 |
| HP-Process StmGen | 100 | 100 |
| MP-Process StmGen | 85 | 85 |
| LPn-Process StmGen | 0 | 400 |
| STG-HP-MP | 0 | 220 |
| STG-HP-LPn | 0 | 500 |
| STG-MPn-LPn | 0 | 300 |
| STG-HP-Cond | 0 | 550 |
| Solar HP-Stm | 0 | 450 |
| Solar MP-Stm | 0 | 850 |
| Solar LPn-Stm | 0 | 650 |
| Solar BFW-Preheat Temp. | 0 | 90 |

FIG. 67.

No. of headers definition
i: Number of medium pressure steam headers
n: Number of low pressure steam headers

| No. Headers | HP | MP | LPn |
|---|---|---|---|
| 1 | 1 | – | – |
| 2 | 1 | 1 | – |
| 3 | 1 | 1 | 1 |
| 4 | 1 | 2 | 1 |
| 5 | 1 | 2 | 2 |
| 6 | 1 | 1 | 2 |
| 7 | 1 | – | – | i:1,2,3,4
n:1,2

| Steam Turbines & Motors List | | | | |
|---|---|---|---|---|
| Type | Service | Switchable/Not | Rated HP | Eff.% |
| Motor-XX | Service-1 | Yes | | |
| Motor-XX | | Yes | | |
| Motor-XX | | No | | |
| Motor-XX | | No | | |
| Motor-XX | Service-2 | No | | |
| Motor-XX | | No | | |
| Motor-XX | | Yes | | |
| Motor-XX | | Yes | | |
| Motor-XX | Service-3 | No | | |
| Motor-XX | | No | | |
| Motor-XX | | No | | |
| Motor-XX | | No | | |
| Motor-XX | Service-i | Yes | | |
| Motor-XX | | Yes | | |
| Motor-XX | | Yes | | |
| Motor-XX | | Yes | | |
| Motor-XX | | Yes | | |
| Motor-XX | | - | - | - |

| Type | Service | Switchable/Not | Rated HP | Stm Rate (Stm/hp) |
|---|---|---|---|---|
| ST-XX | Service-1 | Yes | | |
| ST-XX | | Yes | | |
| ST-XX | | No | | |
| ST-XX | | No | | |
| ST-XX | Service-2 | No | | |
| ST-XX | | No | | |
| ST-XX | | Yes | | |
| ST-XX | | Yes | | |
| ST-XX | Service-3 | No | | |
| ST-XX | | No | | |
| ST-XX | | No | | |
| ST-XX | | No | | |
| ST-XX | Service-i | Yes | | |
| ST-XX | | Yes | | |
| ST-XX | | Yes | | |
| ST-XX | | Yes | | |
| ST-XX | | Yes | | |
| ST-XX | - | - | - | - |

METHODS FOR PLANNING AND RETROFIT OF ENERGY EFFICIENT ECO-INDUSTRIAL PARKS THROUGH INTER-TIME-INTER-SYSTEMS ENERGY INTEGRATION

RELATED APPLICATIONS

This application is a continuation-in-part of and claims priority to and the benefit of U.S. patent application Ser. No. 13/858,731, filed on Apr. 8, 2013, titled "Systems, Computer Readable Media, and Computer Programs for Enhancing Energy Efficiency Via A Systematic Hybrid Inter-Processes Integration," and U.S. patent application Ser. No. 13/858,718, filed on Apr. 8, 2013, titled "Methods For Enhancing Energy Efficiency Via A Systematic Hybrid Inter-Processes Integration," which is a continuation-in-part collectively of and claims priority to and the benefit of U.S. patent application Ser. No. 12/767,315, filed Apr. 26, 2010, titled "System, Method, and Program Product For Synthesizing Heat Exchanger Network and Identifying Optimal Topology For Future Retrofit," which claims priority to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit," U.S. patent application Ser. No. 13/757,467, filed on Feb. 1, 2013, titled "Methods For Simultaneous Process and Utility Systems Synthesis in Partially and Fully Decentralized Environments," and U.S. patent application Ser. No. 13/757,491, filed on Feb. 1, 2013, titled "Systems and Computer Programs for Simultaneous Processing Utility Systems Synthesis in Partially and Fully Decentralized Environments," which claim priority to U.S. Provisional Patent Application No. 61/612,470, filed on Mar. 19, 2012, titled "System, Method, and Computer Program For Simultaneous Processing Utility Systems Synthesis in Partially and Fully Decentralized Environments," and U.S. patent application Ser. No. 12/480,415, filed on Jun. 8, 2009, titled "System, Program Product, and Related Methods For Global Targeting of Process Utilities Under Varying Conditions," and is a continuation-in-part of U.S. patent application Ser. No. 13/757,467, filed on Feb. 1, 2013, titled "Methods For Simultaneous Process and Utility Systems Synthesis in Partially and Fully Decentralized Environments," and U.S. patent application Ser. No. 13/757,491, filed on Feb. 1, 2013, titled "Systems and Computer Programs for Simultaneous Processing Utility Systems Synthesis in Partially and Fully Decentralized Environments," which claim priority to U.S. Provisional Patent Application No. 61/612,470, filed on Mar. 19, 2012, titled "System, Method, and Computer Program For Simultaneous Processing Utility Systems Synthesis in Partially and Fully Decentralized Environments" each incorporated herein by reference in its entirety. See Appendix 1 for a list of related applications.

BACKGROUND OF THE INVENTION

1. Field of the Invention

This invention relates generally to energy management through heat recovery, and more particularly to systems, computer readable media, program product/code, and methods for providing enhanced energy design and retrofit of, and greenhouse gas reduction for, eco-industrial parks through enhanced energy recovery methodologies and system designs.

2. Description of the Related Art

Industrial clusters/symbiosis played a significant role in the economic growth of many countries. Recognized by the inventors is that the industrial ecology concept can promote a new path of local development through the transition from industrial clusters to Eco-Industrial Parks (EIPs). Further recognized is that this can be accomplished by exploiting common features of both models such as, for example, the geographic proximity of time-dependent and non-dependent plants and the non-industrial community, such as malls, hospitals, hotels, housing compounds, schools and so on. Accordingly, also recognized is that implementing the eco-industrial parks' principles in an existing industrial cluster or in the planning of new ones, represents a significant opportunity for its revitalization. For example, eco-industrial parks could potentially exploit synergies from industrial clusters and non-industrial activities to create new production models in which the economic and environmental dimensions are symbiotic.

Prior eco-industrial parks' key to success has been a sequence of independent economically driven actions. Such evolutionary pattern followed to date by countries like Denmark, for example, may not be easily transferred from conventional industrial complexes to eco-industrial parks locations and/or Greenfield development. Accordingly, recognized by the inventors is the need for and benefit of a holistic/revolutionary approach in addressing the problem, using novel methodologies and tools, followed by an evolutionary approach in implementing necessary modifications in either contaminated Brownfields or in the planning/design of Greenfields.

The applicable literatures show that it is very difficult, with the current state-of-art methods and tools, to manufacture eco-industrial parks to work from scratch. First, there should be the basic ingredients in place, namely the desire of plants/firms/communities to actively participate/cooperate and the correct membership/mix and structure of firms. These basic ingredients can then be enhanced and improved upon with the correct support structure in place. The inventors recognize that a significant factor that can enhance the success of eco-industrial park is the presence of a large company which acts as a magnet for other companies. The inventors also recognize that the willingness to make the effort to determine the best connections among different industrial plants/firms and its surrounding communities in an eco-industrial park can be another significant factor in developing a successful eco-industrial park or transforming conventional industrial complexes to eco-industrial parks. Specifically, the material and energy flows' relationship among the different members in the alliance of plants/firms can permit establishing optimal linkage to form a fruitful inter-dynamic structure. If such structure does not exist, a successful eco-industrial park may not be able to be realized. The inventors further recognized that the emphasis for the eco-industrial park should be on a system approach, rather than focusing on specific streams. Accordingly, recognized is the need for systems, computer readable medium, program products/code, and methods which capitalize on such recognitions.

The sustainability concept is considered to have four dimensions, namely social, environmental, economic, and institutional. It is understood to be the improved management of natural resources within a business setting to provide economic and social benefits to the business and its surroundings. Eco-industrial parks can serve a significant role in realizing the economic, environmental and social benefits both to individual plants/companies as well as to network of plants/firms. As such, eco-industrial parks have been publicized as a means of reducing environmental damage through reduced waste, based on the literature case studies. Studies have shown that eco-industrial parks can have a number of benefits at different levels. The desire to attain financial gain irrespective of the environmental benefits, however, has historically been the major driving factor for the creation of most eco-industrial parks.

Besides other objectives, the conventional system concept of transitioning industrial complexes to eco-industrial parks and the planning and synthesis/design of the new ones for energy efficiency maximization and energy-based GHG emissions reduction, is the transfer of waste heat from one plant/firm to a nearby another. In other words, each plant/facility/firm in the eco-industrial park alliance allows the usage of its waste energy to be used by another adjacent plant/facility/firm. The energy waste of one company is used partially or totally in another adjacent one. Through waste integration cooperation, adjacent plants can save transportation costs and energy degradation during transit.

There are essentially three recognized approaches for transitioning industrial complexes to eco-industrial parks and the planning and synthesis/design of the new ones to attain the objectives of energy efficiency maximization and energy-based GHG emissions reduction, among others. The first approach is the ad hoc method which uses an obvious waste heat stream from a power plant in a nearby process, for example. This method, however, is not systematic and is far from efficient.

The second approach is the total site targeting method, which is based on the pinch technology, the most widely used to date in literature. This method allows waste heat from processes to be used as a source of heat in other processes. The waste heat sources are converted to steam, which through a steam system infrastructure, is utilized to pass the heat to processes that are in heat deficit. To identify the external heating and cooling requirements of a group of individual plants to be satisfied by a central utility system, for each of the individual plants, a thermal integration of its hot streams to be cooled and cold streams to be heated is performed using each individual plant's grand composite curve. The temperature/enthalpy data from respective individual plant is then extracted from the plant.

The grand composite curve defines each plant's thermal heat deficiency and thermal heat surplus after intra-plant heat integration. The collection of grand composite curves of the whole site are then used to graphically add all thermal deficiencies to draw the total site heating demand curve, and add all thermal surpluses to draw the total site cooling demand curves. The two curves are then superimposed on one graph with the existing and/or suggested steam generation levels and steam supplying levels to find the minimum total site external energy utilities requirement and naturally best indirect inter-plants thermal integration. In this method, intra-integration is accomplished first. Thereafter, any remaining waste heat (below pinch streams) of the plant is shared with other parks' members. The inventors recognize this methodology to be a reactive form of cooperation rather than a proactive form. Also, recognized is that this methodology results in a mismatch in number of steam levels required for eco-industrial park users in generation and utilization, which translates to undesirable energy loss. Further, while in literature, this method in its application is said to be able to address both time non-dependent and time dependent sites processes, the use of time as an optimization variable for hybrid inter-time-inter-systems energy integration is ignored.

Therefore, recognized by the inventors is the need for a methodology: that can accomplish inter-time zone and systems integration first; that can share the waste heat of multiple processes within each plant with each other plant; that can match the number of steam levels; that utilizes time as an optimization variable for hybrid inter-time-inter-systems energy integration; and that can modified time zone or zones boundaries/duration.

The third approach uses the mathematical programming method, which uses simplistic assumptions to be able to model whole city' industrial and non-industrial processes without resulting in a mathematically intractable problem. The inventors are open to the possibility that the mathematical programming method could, theoretically speaking, find best mass and energy integration among its members, and design the whole eco-industrial park energy utility system accordingly. Currently, however, there is no public domain literature describing how to use such approach in the retrofit or in the planning of new energy efficient eco-industrial park applications.

The state of-the-art software for transitioning industrial complexes to eco-industrial parks and for the planning and synthesis/design of the new ones for energy efficiency maximization and energy-based GHG emissions reduction, among other objectives, are extremely limited and almost non-existent. The most famous one is the Apentech Co. Total Site commercial software. Other decision support software for general eco-industrial park planning, namely "FaST", "DIET" and "REaLiTy", are database software with linear programming capability. These software are essentially focused on material exchange and only address very obvious waste heat exchange, where a waste heat stream in one plant/power station is used in other eco-industrial parks' plants.

Recognized by the inventors is that proper planning of new eco-industrial parks, and the transformation of conventional industrial complexes to an eco-industrial park, can bring significant value to energy efficiency. Further, recognized by the inventors is that the transition of an industrial complex's energy systems to, or synthesis of eco-industrial parks containing time dependent and non-dependent processes and tasks (referred to as industrial symbiosis), is a huge multi-variable multi-dimensional optimization problem in which the total eco-industrial park network depends on a factor as small as a single stream condition and as big as the whole park/city functionality. Also recognized by the inventors is that integration among multiple industrial and non-industrial plants/processes in adjacent geographical locations can bring in more degrees of freedom to optimize the "waste energy recovery," and consequently, presents a new horizon for radical energy-based GHG emissions reduction.

Further recognized by the inventors is the need for a methodology for the simultaneous inter-time zones-inter-systems energy integration in industrial symbiosis where non-industrial community is also included, to attain new levels of energy saving and GHG emissions reduction using hybrid methods of integration. Additionally recognized is the need for a hybrid methodology that systematically looks to all options together and finds best combinations out of the available solutions package, while simultaneously considering both inter-time-zones and inter-systems energy integration.

SUMMARY OF THE INVENTION

Many of the reasons hindering the application of simultaneous inter-process integration among several processes, for better energy consumption cost reduction and less energy-based GHG emissions, are in some cases valid. However, according to various embodiments of the invention, most of them can be addressed in a novel cost-effective way to enable wider adaptation. The adaptation of inter-time-inter-systems energy integration in industrial cities to date is not systematically practiced. Additionally, since the emanation of the pinch technology and its evolution to pinch analysis technique for process synthesis, the direct inter-processes integration has been considered impractical. The inventors have recognized that old arguments such as that: the processes sometimes have different start up and shut down times; the processes can work at partial loads; the processes can have seasonal changes in its conditions; the utility systems, heaters and HEN capital may not be reduced due to changes in processes schedule and operation philosophy; the disturbance in one process can propagate to another one if they are integrated which make the process difficult to control; the distance-time/velocity lags affect the controllability of processes; the geographical distances among processes will cost energy in pumping or compression and capital in piping, pumping, and compression; the concern that safety might be impacted due to the travel of a fluid from one hazardous area to another; and the fear of leakage, and so on, which are very common to plant engineers, can now have cost-effective solutions, which can be considered during matching phase.

In view of the foregoing, various embodiments of the present invention advantageously provide systems, computer readable media, program product/code, and methods of systematically providing enhanced energy efficiency and reduced greenhouse gases for an eco-industrial park through inter-time-inter-system energy integration. Various embodiments of the present invention advantageously provide systems, computer readable media, program product/code, and methods that achieve new levels of energy consumption and energy-based GHG emissions reduction via radical energy efficiency improvement of eco-industrial parks planning and/or retrofit using hybrid inter-system-inter-time-zones energy integration solutions. Such solutions can advantageously include systematic hybrid inter-processes integration. Various embodiments of the invention provide a holistic/revolutionary approach in addressing the problem, using novel methodologies and tools, followed by an evolutionary approach in implementing necessary modifications in either contaminated Brownfields or in the planning/design of Greenfields.

Various embodiments provide a methodology for the simultaneous inter-time zones-inter-systems energy integration in industrial symbiosis where non-industrial community is also included to attain new levels of energy saving and GHG emissions reduction using hybrid methods of integration. Various embodiments use a hybrid methodology that systematically looks to all options together and that finds the best combinations out of the available solutions package while simultaneously considering both inter-time-zones and inter-systems energy integration. Various embodiments of the invention also or alternatively address the energy component of eco-industrial park via novel system approach, computer readable medium, program products/code, and methods which provide for the retrofit or synthesis of efficient eco-industrial parks' energy systems symbiosis.

Various embodiments of the invention provide systems, computer readable medium, program product/code, and methods for enhancing energy efficiency of the eco-industrial park mega-problem's representation, energy targeting for industrial and non-industrial processes/activities, inter-time-zones-inter-processes/activities energy integration, and best temporal and spatial matching among energy-dependent processes and activities. All industrial and non-industrial processes/activities, hot streams to be cooled and cold streams to be heated, can be represented in one time-temperature interval graph using a new composite curves building method where the problem-wide pinch point(s) is defined and optimal pinch temperature is identified, and time and space zone, block, facility, process unit, and or stream controlling pinch point location is found. Zone(s), block(s), facility(s), process(s) unit and stream(s) having high impact on the waste energy recovery problem are located. A graphical technique can be used to identify minimum number of direct matches/connections among time and space zones or blocks or facilities or processes. The graphical technique can include utilization of a temperature-duty diagram and a time-temperature-duty diagram. Where the current state-of-art is only adapting direct or indirect spatial integration, but not both, and/or where the current state-of-art is only adapting indirect integration using steam system or hot oil system, but not both together, various embodiments of the invention provide hybrid methodologies. Various embodiments of the invention address the combined heat and power system planning for the whole eco-industrial park in a multi-time-period approach while considering simultaneously best inter-time-zones-inter-systems energy integration applications' options.

An example of an embodiment of a method of providing enhanced energy efficiency and reduced greenhouse gases for an eco-industrial park through application of spatial and temporal waste heating and cooling energy integration, can include the steps of identifying the functional areas for an eco-industrial park, and identifying significant heating and cooling tasks for each significant time-dependent and non-time-dependent industrial and non-industrial activity within the eco-industrial park. The functional areas include both a plurality of industrial functional areas and one or more non-industrial functional areas, in adjacent geographical locations. Each of the plurality of industrial functional areas typically include a plurality of spatial zones, a plurality of blocks, a plurality of facilities, a plurality of plants, and a plurality of batch and continuous process units, and at least one, but more typically multiple hot process streams to be cooled, and/or at least one, but more typically multiple cold process streams to be heated. The one or more non-industrial functional areas can include one or more housing compounds, one or more hospitals, one or more laundry facilities, and one or more facilities having large capacity dishwashing units, which include one or more hot waste streams and/or one or more cold streams. The non-industrial functional areas can contain new sources of hot or cold streams, which advantageously provide an untapped potential in thermal integration.

The step of determining one or more inter-time zone thermal energy integration targets can include analyzing the duration of the plurality of time zones as an optimization variable. According to an embodiment, the boundaries of the plurality of time zones can be defined by a smallest heating or cooling time duration for any significant activity in the eco-industrial park under analysis. Time zone or zones boundaries can be modified, for example, via control flow rates and/or orchestrating batch tasks (industrial and non-industrial) timing and duration. Flow rates can be controlled using, for example, variable speed drivers. The steps of determining one or more inter-time zone thermal energy integration thermal targets and intra-time zone thermal energy integration thermal targets can include the steps of identifying total supply and demand thermal energy loads at each of a plurality of temperature intervals, identifying inter-time zone surplus thermal energy load between each of the plurality of time zones at each of the plurality of temperature intervals, identifying total supply and demand thermal energy loads at each of the plurality of time zones at each of the plurality of temperature intervals, and identifying a thermal energy load to be integrated via inter-time zone thermal energy integration and intra-time zone matching. The steps can also or alternatively include identifying total supply and demand at each temperature interval, identifying the supply and demand and surplus of each functional area, and identifying the global minimum heating and cooling needs for the dependent and non-time dependent industrial and non-industrial activities.

The method can also include the step of determining one or more inter-time zone thermal energy integration thermal targets and intra-time zone thermal energy integration thermal targets responsive to or otherwise based upon the identified functional areas and identified significant heating and cooling tasks, and identifying one or more inter-time zone thermal energy integration matching solutions across a plurality of time zones to substantially satisfy a thermal load or loads to be integrated via inter-time zone thermal energy integration responsive to her otherwise based upon. The step of identifying can be performed responsive to or otherwise based upon the determined one or more inter-time zone thermal energy integration thermal targets and one or more intra-time zone thermal energy integration thermal targets. This step can be performed prior to performing intra-time zone thermal energy integration matching. This can advantageously provide the least possible quality degradation by not removing pockets that result from performing intra-time zone integration prior to performing inter-time zone integration.

The step of identifying the one or more inter-time zone thermal energy integration matching solutions can include generating the matching solutions based upon thermal loads determined using inter-time zone thermal energy integration in conjunction with inter-area/system thermal energy integration within and across the respective time zones, and/or performing inter-time zone thermal energy integration matching, which can include temporally and spatially matching batch process streams with batch process streams and batch process streams with continuous process streams, and/or which can be performed while simultaneously considering both inter-time zones and inter-area thermal energy integration. The matching can also or alternatively include identifying a plurality of the functional areas to be included and one or more of the functional areas to be excluded in the matching solution.

The identifying step can also or alternatively include identifying best, second best, third-best, fourth best, and so on, matching solutions from the one or more potential inter-time zone thermal integration matching solutions. One of the matching solutions can be selected that either substantially satisfies an optimal one of the one or more inter-time zone thermal energy integration thermal targets and/or a desired level of one or more energy targets for heating utility, cooling utility, or both heating utility and cooling utility selected by a decision-maker.

The step of identifying one or more inter-time zone thermal energy integration matching solutions can also or alternatively include matching waste heat of multiple hot process streams within each functional area with multiple hot process streams of each other functional area of a plurality of functional areas. This can be performed for each of a plurality of different steam levels required by tasks/activities within the functional areas. This step can also or alternatively include performing inter-time zone thermal energy integration matching while simultaneously considering both inter-time zone and inter-area integration. The matching can include performing hybrid matching techniques such as, for example, direct and indirect area integration, hot-to-hot process-to-process matching, cold-to-cold unit process-to-process matching, and process identities switching, and can include performing process stream rescheduling, performing process energy storage, and performing process stream heat capacity flowrate manipulation using variable speed drivers.

The steps can also or alternatively include generating one or more technically viable eco-industrial park heat exchange system design alternatives responsive to the identified one or more inter-time zone thermal energy integration matching solution and/or generating at least one technically viable energy efficient eco-industrial park alternative that satisfies the eco-industrial park thermal energy and steam utilities demands for the plurality of time zones as well as rendering a corresponding approximately optimal operating scenario at each specific time-zone.

The method can also or alternatively include identifying the media of the thermal load to be integrated via inter-time zone thermal energy integration, e.g., thermal energy storage, rescheduling of activities or process streams, and changing of process stream flow rates, and identifying one or more intra-time zone thermal energy integration matching solutions for each of the plurality of time zones and across a plurality of the functional areas having one or more tasks operating within the respective time zone when having more than one functional area associated therewith. The step of identifying one or more intra-time zone thermal energy integration matching solutions can include identifying best and the second best matching solutions among the hot and cold process streams in the eco-industrial park for spatial energy integration, and identifying best and second best matching solutions among each of the plurality of time-zones for temporal energy integration and greenhouse gas emissions reduction for optimal synthesis or retrofit of the eco-industrial park. This step can also or alternatively include identifying functional areas to consider for integration and others to neglect as having an in substantial energy values.

The method can also include the step of generating a plurality of technically viable energy efficient eco-industrial park alternatives that satisfies eco-industrial park utilities demands during each of the time zones as well as rendering a corresponding approximately optimal operating scenario at each specific time-zone. This step can include identifying a scheme of inter-area integration including direct, indirect or hybrid inter-area integration, and when either indirect or hybrid are utilized, identifying indirect medium, the indirect medium comprising water, steam, hot oil, or a combination thereof. The solution can account for hot and/or cold process streams having different start up or shut down times, that work intermittently at partial loads, or that have seasonal dependent operating conditions.

The method can also or alternatively include identifying one or more best energy and greenhouse gas emission reduction targets, systematically identifying when direct inter-time integration is best utilized and is the only option to reach the best energy and greenhouse gas emissions reductions' targets, and systematically identifying when indirect intra-time integration alone can be used to reach the best energy and greenhouse gas emissions reduction targets.

The method can also or alternatively include the steps of extracting operational data for the plurality of significant heating and cooling tasks, the operational data comprising duration, process stream initial type, supply temperature, target temperature, and heat capacity flow rate, constructing a virtual time-space schematic for the eco-industrial park heating and cooling tasks to identify time zone boundaries, and providing a Time-Temperature-Duty-Diagram to establish a functional area supply-demand cascade from heating and cooling tasks respectively at each of a plurality of temperature intervals. The steps can further include calculating a total supply and demand at each temperature interval, the step of calculating comprising cascading the functional areas supply and demand in time, calculating one or more of the following: inter-time zones energy load storage, rescheduling requirements, and stream flowrate modifications among each of the plurality of time zones for the eco-industrial park, and calculating global minimum heating and cooling needs for the dependent and non-dependent industrial and non-industrial activities of the eco-industrial park.

According to an embodiment of the method, the step of identifying one or more inter-time zone thermal energy integration matching solutions can also or alternatively include constructing a virtual problem wide time-temperature duty diagram. The step of constructing can include forming a global Cold Composite Line (gCCL) summarizing heating energy requirements for substantially all significant zones, blocks, facilities, plants and processes' streams in each of a plurality of time zones at each of a plurality of temperature intervals, and forming a global Hot Composite Line (gHCL) summarizing cooling energy requirements for substantially all the zones, blocks, facilities, plants and processes' streams in each time zone at each of the plurality of temperature intervals. The steps can also include displaying a problem-wide pinch location or interval, displaying indicia of cold composite and hot composite thermal loads above the problem-wide pinch temperature for each individual time zone, displaying indicia of a cold composite and hot composite thermal loads below the problem-wide pinch temperature for each individual time zone, displaying indicia of total surplus heating load for each time zone for above the problem wide pinch temperature and for below the problem wide pinch temperature, displaying indicia of a global cooling energy utility requirement, displaying indicia of total surplus cooling load for each time zone for above the problem-wide pinch temperature and for below the problem-wide pinch temperature, and displaying indicia of a global heating energy utility requirement.

According to an embodiment of the method, the step of identifying one or more inter-time zone thermal energy integration matching solutions can also or alternatively include the step of performing hybrid inter-time zone inter-area thermal energy integration matching. The matching can include the steps of predefining a global cold composite line accounting for heat energy requirements for substantially all significant zones, blocks, facilities, plants and processes' streams comprised by the plurality of functional areas in each of a plurality of time zones at each of a plurality of temperature intervals, and predefining a global hot composite line accounting for waste cooling energy for substantially all the zones, blocks, facilities, plants and processes' streams in each time zone at each of the plurality of temperature intervals. The matching can also include the steps of identifying thermal loads to be integrated via intra-time integration and inter-time integration, conducting inter-time zone energy matching, defining media of the thermal load to be integrated via the inter-time zone thermal energy integration, and conducting intra-time zone intra-area energy matching for each of the plurality of time zones. The conducting step can include initiating the intra-time intra-area matching via de-lumping of each predetermined time zone specific global cold composite line and each predefined time zone specific global hot composite line into its functional area structures from largest to smallest, and conducting the intra-time intra-area matching.

According to an embodiment of the method, the steps can also or alternatively include determining global minimum heating energy utility and global minimum cooling energy utility requirements under all reasonably probable combinations of process-specific modifications and stream-specific $\Delta T\_min$ in an acceptable user defined range across space and time, locating problem wide pinch interval and pinch location controlling stream or streams, determining energy targets for inter-time inter- and intra-space energy integration and intra-time inter- and intra-space energy integration, receiving decision maker selection identifying desired level of energy targets for one or more of the following: heating utility, cooling utility, and both heating and cooling utilities, and receiving user input of absolutely constrained and forbidden functional area and process streams matching whereby a respective thermal load must be satisfied via indirect integration. The steps can also include collapsing operational data intervals when operational data is provided in interval form to locate the problem wide best for desired pinch temperature, the pinch-temperature location controlling process, and the best process stream changes as well as streams-specific $\Delta T\_min$ in the acceptable user defined range. In this embodiment, the step of identifying one or more inter-time zone thermal energy integration matching solutions can include determining one or more best possible matches among the time zones and the functional areas.

According to an embodiment of the method, the steps can also or alternatively include generating a plurality of technically viable energy efficient eco-industrial park alternatives that satisfies eco-industrial park utilities demands during each of the time zones as well as rendering a corresponding approximately optimal operating scenario at each specific time-zone. According to an aspect of this embodiment, the step of generating one or more technically viable energy efficient eco-industrial park alternatives can include identifying best generation and allocation of steam energy utilities, and synthesizing the combined heat and power utility system that satisfies the eco-industrial park utilities demands during each of the time zones as well as rendering its best operating scenario at each specific time-zone.

According to another aspect, the step of generating can also or alternatively include calculating required steam supply and demand levels and loads for the plurality of functional areas, establishing a virtual functional area steam supply-demand cascade in space from steam supply and demand loads respectively at each a plurality of steam levels, calculating total supply and demand loads at each steam level responsive to the cascade of the functional areas steam supply and demand in space, defining functional area arrangements which minimize steam transportation, and identifying amounts of steam to be transferred from one functional area to another to achieve global minimum steam demand before steam letdowns.

According to another aspect, the step of generating a plurality of technically viable energy efficient eco-industrial park alternatives includes the step of performing a domino affect low-pressure steam sharing targeting process. This process can include the steps of allocating low-pressure steam to functional areas in a mosaic starting with a central power plant or main cogeneration plant then followed by functional areas arranged in the form of demand supply demand and ending by functional area demand. In such configuration, steam is being transferred from one functional area to the next functional area primarily or completely only to avoid long distances and steam condensation. Correspondingly, a number of the functional areas act as a conduit to pass steam from a supplying functional area to another functional area without requiring steam from the supplying functional area. The steps also include highlighting in-process modifications that can be performed to enhance process or functional area capability in producing more steam or whose status can be changed from demanding to supplying or vice versa, and arranging the functional areas by their geographical locations to substantially reduce steam travel distances and steam condensation.

The economics of industrial production, the limitations of global energy supply, and the realities of environmental conservation are an enduring concern for all industries. The majority in the world scientific communities believe that the world's environment has been negatively affected by the global warming phenomenon due to the release of greenhouse gases (GHG) into the atmosphere. Accordingly, various embodiments of the invention advantageously include systems, computer medium, program product/code, and methods for systematic targeting for hybrid, direct and indirect, inter-time-zones-inter-systems energy integration in eco-industrial parks planning and retrofit that can create new opportunities for energy conservation beyond that current state-of-art in eco-industrial parks, which mostly depend only on intra-process integration and indirect inter-processes integration using steam or hot oil systems whereby waste energy is not optimally recovered. Various embodiments identify, systematically, the least number of temporal and spatial direct inter-processes integration connections which render best impact on waste energy recovery before addressing the decision of whether or not to resort to indirect process integration methods using steam, hot oil, and tempered hot water systems.

Various embodiments provide a systematic methodology for enhancing energy efficiency and GHG emission reduction in the development of new eco-industrial parks due to energy efficiency optimization beyond what is possible to date using state-of-art technologies. This can be accomplished, for example, via hybrid inter-time-zones-inter-systems integration that overcomes technical problems, such as $\Delta T\_min$ constraints and others such as, for example: economics-of-scales constraints, capital availability constraints in standalone companies/plants/processes and so on, during the retrofit or planning of eco-industrial parks. Various embodiments also or alternatively provide a systematic methodology for enhancing energy efficiency beyond what is possible to date in the retrofit or planning of eco-industrial parks using state-of-art technologies, accomplished, for example, via the simultaneous hybrid inter-time-zones-inter-systems integration that overcomes the problem of intra-units/processes partially and fully-forbidden matches' constraints and the problem of $\Delta T\_min$ constraints in standalone units and processes that are having a negative impact on waste energy recovery.

The hybrid inter-time-zones-inter-systems integration can be performed under all possible industrial and non-industrial intra-processes' and/or activities structures and parameters as well as operating conditions' scenarios changes while using streams' specific $\Delta T\_min$. The steps/operations performed to obtain the hybrid inter-time-zones-inter-systems integration can include identifying which plant would be ideal as an ambassador and which stream(s) would be ideal as an ambassador(s), and/or can employ hot-to-hot and cold-to-cold matching and streams switching techniques for partially and/or fully forbidden matches. The steps/operations can also or alternatively provide for use of steam, hot oil, tempered water and a mix of all of them, and can define the type of indirect integration in both time (temporal) and space (spatial) and its desired thermal load. The steps/operations can also or alternatively include identifying the best eco-industrial parks alliance of members via defining what is best, the second best, third-best, and so on, in inter-time-zones-inter-systems direct integration. The integration can be performed with retrofitability-in-mind of each unit, process, facility, block and zone for the sake of more energy conservation, via finding both the current and the future problem's optimal pinch, and conducting matching for the current system and future system. The steps can also or alternatively identify situations where inter-time-zones-inter-systems direct integration is the only option to reach desired energy and GHG emissions reduction targets. An example of direct inter-time zone integration includes utilization of storage tanks, and manipulating or delaying flow streams, among others recognized by one of ordinary skill in the art.

Various embodiments of the invention advantageously include systems, computer readable medium, program product/code, and methods which render radically enhanced energy efficiency and reduced energy-based GHG emissions, beyond what is conventionally possible, through the synthesis and retrofit of industrial complexes to eco-industrial parks. This achievement can be provided through use of a new approach or approaches in which members go beyond exchanging their wastes, to a new level of cooperation in which each member (e.g., facility, housing compound, mall, hospital and so on) in the eco-industrial park' alliance performs waste heat, power, and utility resource import, export, or exchange as necessary for the mutual benefit of the whole alliance. According to the approaches, each member is designed to, and makes the necessary changes in its business-as-usual design and/or operation strategies/philosophies, to advance energy efficiency and GHG emissions reduction.

Various embodiments of the invention advantageously can create new opportunities to energy consumption and GHG emissions reduction beyond what is possible to date via novel hybrid inter-systems inter-time energy integration technique to overcoming the problems of current intra-system intra-time energy integration constraints, which negatively impact the possibility of enhancing waste energy recovery. According to one or more embodiments, this can be accomplished using, simultaneously, all possible intra-processes intra- and inter-time structures and parameters conditions' changes, stream specific minimum temperature approach ($\Delta T\_min$), direct and indirect inter-systems integration, hot-to-hot process-to-process matching, cold-to-cold unit process-to-process matching, process identities switching (hybrid techniques), rescheduling, energy storage, and heat capacity flowrate manipulation using variable speed drivers, for present requirements, while considering future retrofit for more energy conservation to reach best energy and GHG emissions targets. Various embodiments of the invention advantageously provide for systematically identifying when direct inter-time integration is best utilized and is the only option to reach the best energy and GHG emissions reductions' targets, and when indirect intra-time integration alone can be used to reach best energy and GHG emissions reduction targets.

Various embodiments of the invention advocate a different approach/eco-industrial park concept where industrial activities/companies and non-industrial activities form "total community symbiosis," while conventional approaches, in contrast, advocate only the creation or retrofitting of industrial zones where waste or by-products of one company are used as resources by another company. One or more embodiments of the invention address a energy consumption and greenhouse gas reduction methodology that is wider and different than that addressed by the current-state-of-art. For example, one or more embodiments seek to achieve best synergy, which is not addressed by conventional systems, whereas, conventional systems employ an integration methodology whereby "one facility's energy waste becomes another facility's energy supply." Instead, according to an exemplary implementation, the "best synergy" refers to an optimal system design of the whole eco-industrial park energy system simultaneously, not sequentially.

Various embodiments of the invention advantageously can render more degrees of freedom for radical energy efficiency and a new problem representation for initial solutions generation, and can render hybrid integration solutions designs with retrofit in mind or retrofit with retrofit in mind. Various embodiments can utilize a holistic systematic approach including advanced matching, e.g., cold-cold, hot-hot, streams switching identity, and streams changing identity to save quality and help others get more benefit. Various embodiments can employ process-specific changes, energy storage and transfer for inter-time-dependent and/or inter-space-dependent integration, process-specific rescheduling in the context of the overall system, and process-specific FCp changes for time-dependent and continuous processes using variable speed drivers. Various embodiments can provide better data extraction resulting from the inclusion of new types of streams such as waste streams in housing compounds and hospitals, washing machines, dish washers and so on. Various embodiments can employ intra-integration of time-dependent systems, and can provide the least possible quality degradation by not removing integration pockets, which result from performing intra-time zone integration prior to performing inter-time zone integration. Integration pockets are produced, for example, when intra-process integration is conducted and hot and cold streams in heat exchangers are matched using a temperature difference that is higher than the desired minimum. Various embodiments can employ simultaneous consideration of utility and processes design or retrofit, integration in time and space simultaneously, and inclusion of industrial and non-industrial systems in the problem boundary.

Various embodiments of the invention can provide targeting for best candidate and the second best alternative and so on for any number of zones, blocks, facilities, plants processes and streams as well as any number of time intervals for time-dependent processes. According to various embodiments, solution alternatives can include best candidate(s) for system symbiosis, best process-specific conditions modifications and rescheduling, best matches, batch-with-batch and batch-with-continuous matching, in time or in space or both, best utility synthesis not limited to a given utility design, and best utility operating scenario for each time interval.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 5 is a symbol key for the utility system shown in FIG. 4 representing plants and units, among others, labeled A-T according to an embodiment of the present invention.

FIG. 28 is a graphical illustration of a data table for an eco-industrial park data extraction example according to an embodiment of the present invention.

FIG. 30 is a graphical illustration of an energy consumption and pinch location calculation webpage form restricted to standalone batch plant energy targeting calculations according to an embodiment of the present invention.

FIG. 36 is a graphical illustration of an eco-industrial park time zones streams data table according to an embodiment of the present invention.

FIG. 37 is a graphical illustration of an eco-industrial park time zones streams data map according to an embodiment of the present invention.

FIG. 39 is a graphical illustration of an energy consumption calculation webpage form illustrating eco-industrial park intra-time zone energy targeting (Zone 2) according to an embodiment of the present invention.

FIG. 40 is a graphical illustration of an energy consumption calculation webpage form illustrating eco-industrial park intra-time zone energy targeting (Zone 3) according to an embodiment of the present invention.

FIG. 41 is a graphical illustration of an energy consumption calculation webpage form illustrating eco-industrial park intra-time zone energy targeting (Zone 4) according to an embodiment of the present invention.

FIG. 42 is a graphical illustration of an energy consumption calculation webpage form illustrating eco-industrial park intra-time zone energy targeting (Zone 5) according to an embodiment of the present invention.

FIG. 64 is a graphical illustration of an exemplary industrial city total steam demand table according to an embodiment of the present invention.

FIG. 65 is a graphical illustration of an exemplary industrial city total power demand table according to an embodiment of the present invention.

FIG. 66 is a graphical illustration of an equipment name and operating capability input form according to an embodiment of the present invention.

FIG. 67 is a graphical illustration of a steam header definition input form according to an embodiment of the present invention.

FIG. 68 is a graphical illustration of a motor and steam turbine data input form according to an embodiment of the present invention.

Figure 69:
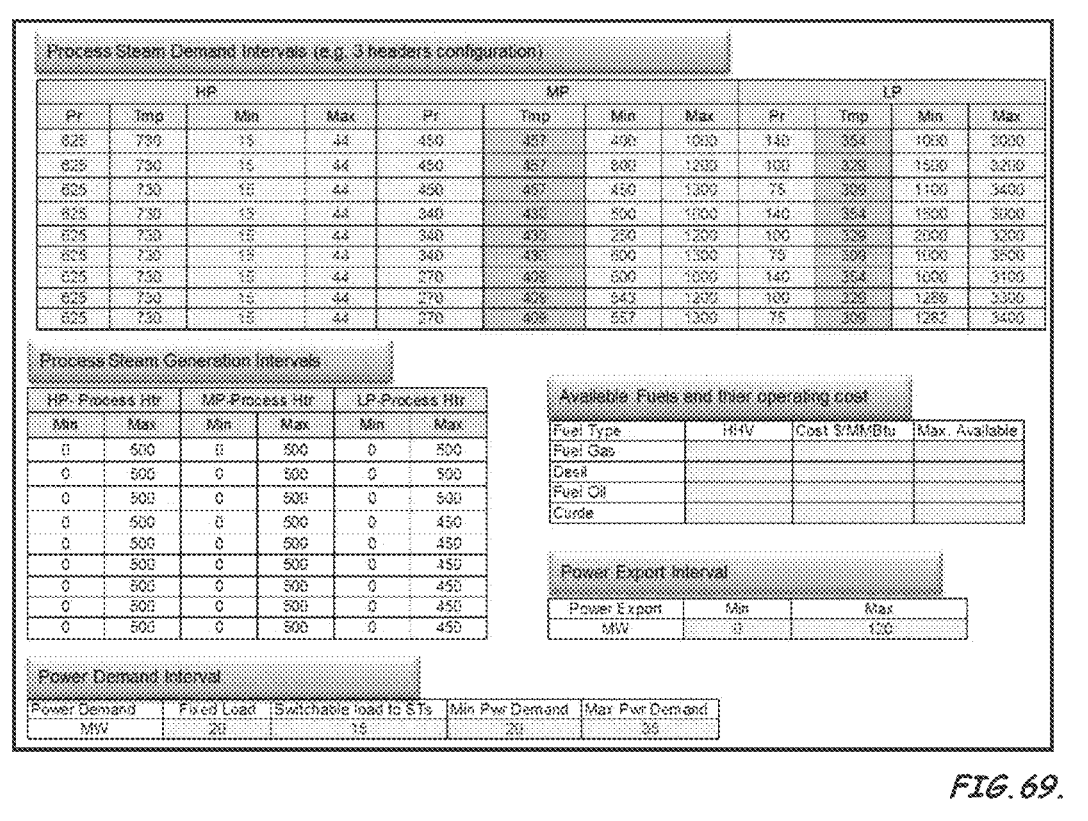

FIG. 69 is a graphical illustration of a set of combined heat and powder model input data entry forms/fields according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

System Structure:

An Eco-Industrial Park (EIP) can include an industrial city or cities and the non-industrial community. An industrial city or site typically contains a number of zones. Each zone contains blocks, e.g., east, west, north and south. Each block contains a number of facilities, e.g., oil refinery; plastics complex, pulp & paper, etc. Each facility (e.g., an oil refinery) contains a number of time-dependent and non-dependent plants, e.g., a hydrocracking plant, naphtha hydrotreating plant (NHT), crude distillation plant, etc. Each plant (e.g., an NHT plant) contains a number of units, e.g., a stripping unit, naphtha splitting unit, reaction unit, etc. Each unit contains a number of hot process streams that need to be cooled and cold process streams that need to be heated, e.g., feed stream to the naphtha splitter, bottom product stream, top product stream, feed stream to reboiler, feed stream to condenser, etc. The nonindustrial community can include malls, hospitals, hotels, housing compounds, schools and so on. In eco-industrial parks, there are numerous industrial and non-industrial activities distributed over space in the form of cities' zones/blocks/facilities/processes, and over time in the form of batch, semi-batch and continuous combinations. For energy integration among eco-industrial parks members, there can be a very substantial number of combinations at multiple time zones. For example, for a 25 plant industrial activity, there can be up to $4.6386 \times 10^{18}$ integration combinations for just one time zone. Various exemplary system options according to a plurality of exemplary embodiments of the present invention are described below.

Figure 1:
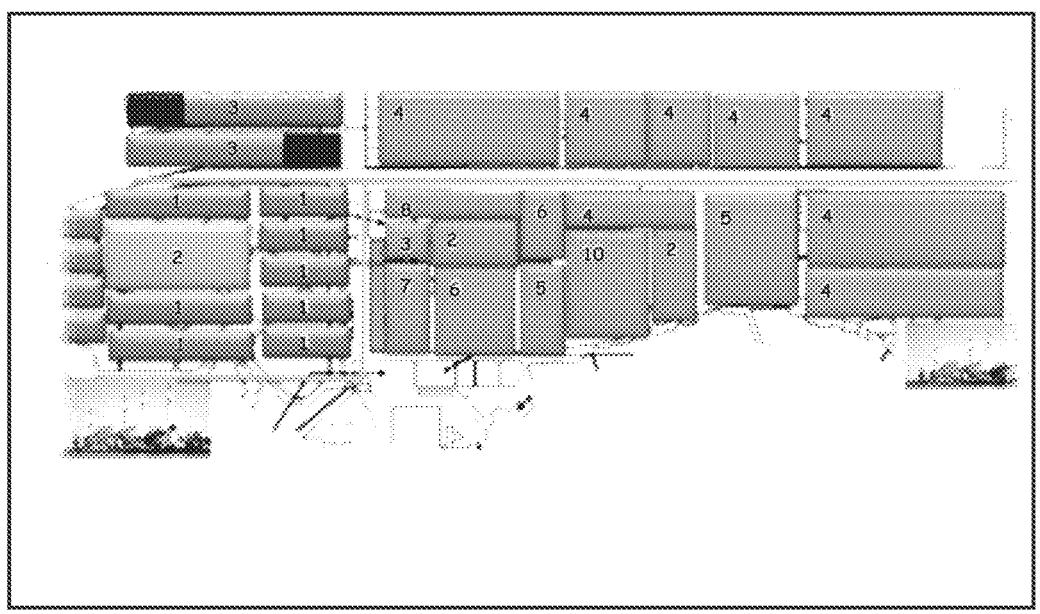
FIG. 1 is a schematic diagram of an eco-industrial park targeted for inter-time inter-systems energy integration according to an embodiment of the present invention.

FIG. 1 illustrates an eco-industrial park containing any number of adjacent industrial facilities, batch, semi-batch, and continuous industrial process facilities, and non-industrial communities including residential and community houses labeled as 1, commercial buildings, hospitals, churches, mosques, etc. labeled as 2, and industrial plants labeled as 3, 4, 5, 6, 7, 8, 9, and 10.

Figure 2:
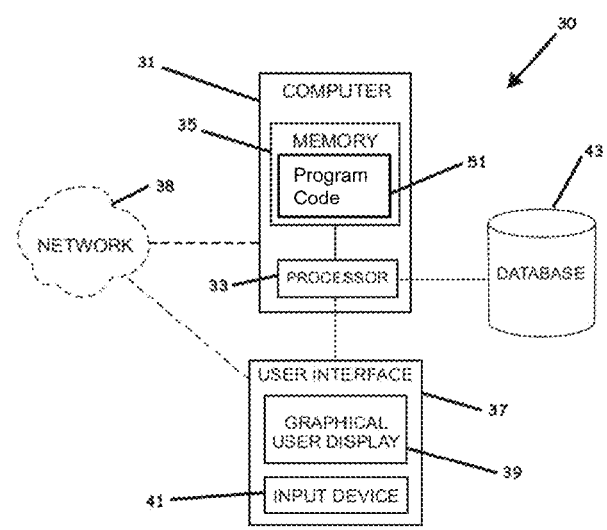
FIG. 2 is a schematic block diagram of a system to target for enhanced energy efficiency and greenhouse gas reduction for eco-industrial park according to an embodiment of the present invention.

FIG. 2 illustrates a system/apparatus 30 to target for enhanced energy efficiency for an eco-industrial park through identifying hybrid direct and indirect inter-systems-inter-time-zones matching solutions through selecting best energy efficient routes; generating technically viable energy efficient eco-industrial parks alternatives, identifying best generation and allocation of energy utilities, and synthesizing the combined heat and power utility system that satisfies the eco-park demands during each time zone as well as rendering its best operating scenario at each specific time-zone to provide enhanced energy efficiency and reduced greenhouse gas emissions for a mega industrial site. This inter-systems-inter-time-zones integration can include identifying the best and the second best matching(s) solutions among processes in the eco-industrial park for spatial energy integration and the best and second best matching(s) solutions among all time-zones for temporal energy integration and GHG emissions reduction for the optimal synthesis or retrofit of eco-industrial parks, using all possible combinations of processes-specific design and operations modifications.

The system 30 can include an inter-time zones inter-systems integration analysis and design computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include one or more databases 43 stored in the memory 35 (internal or external) contained within, associated with or coupled to the inter-time zones inter-systems integration analysis and design computer 31 and having various forms of eco-industrial park mega site data to include: a plurality of sets of values each separately defining operational attributes for each of a plurality of hot process streams and a plurality of cold process streams. Such attributes can include, for example, a value for supply temperature (Ts) of each of the hot process streams and each of the cold process streams, a value for a target temperature (Tt) of each of the hot process streams and each of the cold process streams, and/or a value for a heat capacity flow rate (FCp) of each of the hot process streams and each of the cold process streams.

The one or more databases 43 can also include one or more sets of stream-specific minimum temperature approach values between streams ($\Delta T\_mini, j, k, l, m$), streams initial types, streams matching constraints, global utility consumption values Qh, Qc for the entire park to a consumption varies for each time zone, utility consumption values for each spatial zone, system surplus and deficit values above and below the pinch point, as well as the interval and/or discrete locations of the pinch regions often referred to as a "pinch point," which describe a "region of minimum choice lower and upper temperature boundaries" when in interval form, at least for each pinch point controlling process stream temperature. The one or more databases 43 can also include identification of the streams, processes, units, facilities, plants, and/or zones that control the pinch locations, data linking the pinch points to define a map or maps of the pinch locations according to a progressive change in $\Delta T\_min\_i$ or process conditions, and the minimum number of heat exchanger units required for a network condition at each pinch. The one or more databases 43 can also include such data for one or more hot oil circuits and buffer systems, and can include capital costs of various heat exchangers network and buffer equipment and hot oil circuit equipment for the industrial site.

The one or more databases 43 can further include fuel type/energy source (coal, heavy fuel oil, natural gas, biomass, waste materials, solar etc.), equipment which generate steam (for heating purposes, pumps and compressors driving, heat carrying, cleaning, cooling) and power (for lighting and other applications), steam headers and its range of conditions (pressure or saturation temperature), shaft work network configuration, and the range of values with respect to allocation of steam and power to both process and utility plants usage, and discrete values identified as providing optimal and potentially optimal results, among others as would be understood by those of ordinary skill in the art.

The one or more databases can also include an identification of best and second best. The one or more databases 43 can also include the topology of the mega industrial site and final direct and indirect connection points, steam headers, and oil circuits.

The system 30 can also include an inter-time zones inter-systems integration analysis and design program 51 stored in memory 35 of the inter-time zones inter-systems integration analysis and design computer 31 and adapted to provide systematic processes that include various unique phases of analysis and design. The unique phases of analysis and design can beneficially provide a revolutionary solution approach to provide systematic methods/tools that enable the designer to first temporarily target for inter-time zones integration prior to targeting for intra-time zone integration. Additionally, the designer can beneficially first spatially target for direct and indirect loads for integration, without leaving anything "on the table" and generate as many technically viable options/alternatives/solutions as necessary to attain desired level of energy consumption.

Figure 3:
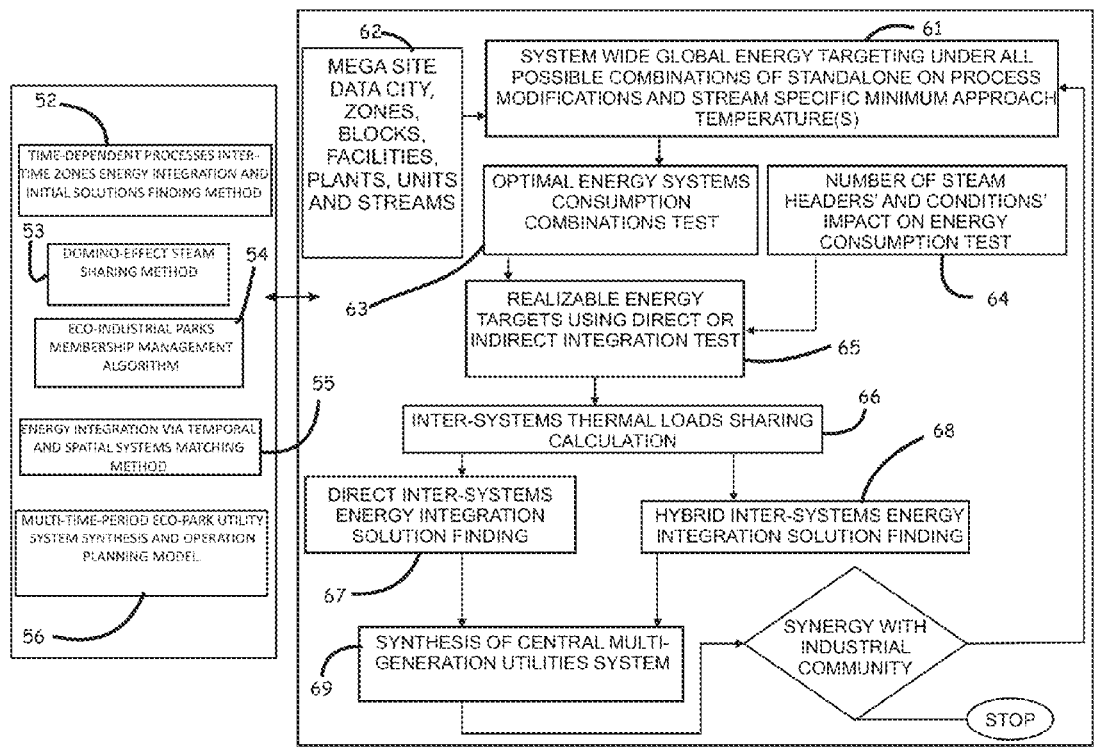
FIG. 3 is a block flow diagram illustrating the interconnection between major processes/program modules according to an embodiment of the present invention.

FIG. 3 illustrates the interconnection between the major processes/program modules according to an exemplary embodiment of the present invention. The program 51 can incorporate one or more combinations of the following processes/program modules: a time-dependent processes inter-time zones energy integration and initial solution finding module 52, a domino-effect steam sharing module 53, an eco-industrial parks membership management module 54, an energy integration via temporal and spatial systems matching module 55, and a multi-time period eco-park utility system synthesis and operation planning model module 56. The program 51 can also include processes/program modules 61, which provide system-wide global energy targeting under all possible combinations of standalone in-process modifications and stream-specific minimum approach temperatures. One or more of the processes/program modules 61 receive mega site input data 62 including internal or interface structural connections and operational attributes for adjacent cities, industrial site zones, blocks, facilities, plants, units, and streams. These processes/program modules 61 include, but are not limited to, those described in the patents/patent applications listed in Appendix 1. The program 51 can also include: an optimal energy systems consumption combinations test program module 63, a number-of-steam headers' and conditions' impact on energy consumption test program module 64, a realizable energy targets using direct or indirect integration test program module 65, an inter-system thermal loads sharing calculation program module 66, a direct inter-systems energy integration solution finding program module 67, a hybrid inter-systems energy integration solution finding program module 68, and synthesis of central multi-generation utilities system program module 69, which can provide for synergy with the industrial community.

Note, the inter-time zones inter-systems integration analysis and design program 51 can be in the form of microcode, programs, routines, and symbolic languages that provide a specific set for sets of ordered operations that control the functioning of the hardware and direct its operation, as known and understood by those skilled in the art. Note also, the inter-time zones inter-systems integration analysis and design program 51, according to an embodiment of the present invention, need not reside in its entirety in volatile memory, but can be selectively loaded, as necessary, according to various methodologies as known and understood by those skilled in the art.

Methodology Overview

In eco-industrial parks, there are numerous industrial and non-industrial activities distributed over space in the form of cities' zones/blocks/facilities/processes, and over time in the form of batch, semi-batch and continuous combinations. Various embodiments of the invention can provide a huge potential for energy consumption and GHG emissions reduction attainable through smart energy integration among several industrial and non-industrial processes and activities in eco-industrial parks.

Various embodiments provide systems, computer readable media, program products/code, and methods that can find in the planning of a new eco-industrial park, or its transition from just an industrial complex to an eco-city: the best time (temporal) and space (spatial) zones matching, the best blocks matching, best facilities matching, and the best streams matching that achieves the best energy saving and GHG emissions reduction. An approach adopted according to one or more embodiments of the present invention incorporates a hybrid methodology that systematically looks to all options together to find the best combinations out of the available solutions package.

According to one or more embodiments, the matching can be implemented directly and/or indirectly. Directly matching can be accomplished by finding the best matching without any buffers. Indirect matching can be accomplished by utilizing water, steam, hot oil, all of them, or a combination thereof. A zone, a block, a facility and finally a process stream can be utilized as a buffer or as an ambassador to take energy from one place and transfer it to another. The matching can be performed using advanced matching techniques where a zone, a block or a facility or a stream can match homogeneously and/or heterogeneously. The advanced matching techniques can also include those where a zone, a block or a facility or a stream can be manipulated to change its identity from energy supplier to energy receiver and return back to energy supplier or from energy receiver to energy supplier and return back to energy receiver.

Beneficially, the matching can also be performed under all possible combinations of process changes in each facility in a way that perfects the matching of a facility with other facilities in the same block and/or with other blocks and/or matching within the same zone and/or with other zones using direct, indirect, and hybrid methods of integration. Beneficially, the matching can be accomplished at each time zone via intra-time energy integration, and/or through reasonably possible inter-time-zones integration using: energy storage, industrial and non-industrial processes and activities rescheduling, as well as throughput/durations schedules optimization, or all of the above.

Matching of streams can be accomplished, for example, through application of the latest advanced matching techniques depicted in U.S. Pat. No. 7,729,809, titled "System, Method, and Program Product for Targeting and Identification of Optimal Process Variables in Constrained Energy Recovery Systems," U.S. Pat. No. 8,116,920, titled "System, Method, and Program Product for Synthesizing Non-Thermodynamically Constrained Heat Exchanger Networks," U.S. patent application Ser. No. 12/767,315, filed Apr. 26, 2010, titled "System, Method, and Program Product for Synthesizing Heat Exchanger Networks and Identifying Optimal Topology for Future Retrofit," and U.S. Pat. No. 8,032,262, titled "System, Method, and Program Product for Synthesizing Non-Constrained and Constrained Heat Exchanger Networks." The hot and cold process streams can be matched intra-process and inter-process in both a single time zone and across multiple other times, and/or the hot and cold streams of each zone, block or facility can be consolidated into a single representative process stream and cold process stream and matched homogeneously and/or heterogeneously.

The advanced matching can allow for a zone, a block or a facility or a stream to change its identity from energy supplier to energy receiver and return back to energy supplier or from energy receiver to energy supplier and return back to energy receiver. The advanced matching can also be performed under all possible combinations of reasonably anticipated process changes in each facility, for example, in a way that perfects the matching of the respective facility with other facilities in the same block and/or with other blocks and/or within the same zone and/or with other zones using direct, indirect and hybrid methods of integration.

This can also be accomplished, for example, under a set of stream-specific minimum approach temperatures ($\Delta T\_min\_i, j, k, l, m$) which provide an optimal combination for enhanced energy recovery, where "i" refers to the hot stream number, "j" refers to process number, "k" refers to plant/facility number (industrial or non-industrial) and "l" refers to block number and "m" refers to the zone number. Alternatively, the stream-specific minimum approach temperatures ($\Delta T\_min\_i, j, k_1, k_2, l, m$) are further identified by the stream location within the plant within the facility, where "$k_1$" refers to the plant number, and "$k_2$" refers to the facility number. U.S. Pat. No. 7,873,443 "System, Method, and Program Product for Targeting and Optimal Driving Force Distribution in Energy Recovery Systems," incorporated herein by reference, describes a methodology of calculating a set of stream-specific minimum approach temperatures for a process. According to this exemplary configuration, for application to a mega industrial city, the algorithm includes additional stream identification to include the process, plant, facility, block, and/or zone number. The targeting module according to the exemplary configuration can define upon the energy targets calculation which stream(s), unit, plant, facility, block and zone controls the pinch location for the whole problem under the current minimum approach temperature and for future ones.

The analysis can beneficially be performed to identify the best possible scenarios for inter-time zones inter-processes/systems integration and the most cost effective solution(s) now and in the future at the targeting phase via "plants' smart matching." The exemplary configuration provides a systematic methodology/technique to first do the right integration at the highest level and then to do the right integration at the lower levels. The right integration at the highest level includes the identifying of what load to integrate and among what systems to do so, along with the identifying of the possible matches and loads to consider and others to neglect (e.g., small energy values). The right integration at the lower levels includes identifying the optimal method of inter-systems integration, i.e., direct, indirect or hybrid, and if indirect or hybrid, identifying it's medium, i.e., water, steam or hot oil, and performing smart matching or combinations.

Conventional methods can result in a twofold loss in energy. The first is energy loss in form of quality due to the "without pockets thermal heat" intra-plant integration, which is not included in the inter-plants integration; and the second is due to the lumping of different steam generation and/or demand levels. The first form of energy quality loss results, for example, from performing intra-process integration first followed by the inter-processes integration. In most of the cases, this results in matches between hot streams and cold streams with approach temperatures much higher than the recommended minimum, which can result in thermal energy degradation that could otherwise be used to satisfy other processes or generate work when other lower grade energy in another process could be used to satisfy the need of the first process. The second form of energy loss is due to the way steam from waste hot process streams is generated. For example, if steam is generated at certain temperature in process "A," in order to use it in another process "B" its temperature must be higher than the process needs, which in many cases is not possible.

Various embodiments of the invention provide solution alternatives that include best utility synthesis and/or best utility system operating scenario for each time interval. According to an embodiment, the utility system synthesis identifies the whole eco-industrial park power and steam generation structure, number of units (combustion gas turbines, steam turbines, solar systems, diesel, heat recovery steam generators, and so on), equipment sizes and capacities to generate both heat and power which satisfy the eco-industrial park' needs for both power and heat at any time. According to an embodiment, the utility system operating scenario provides the number of equipment and capacities running at each time period of operation in summer, winter, partial loads, peak loads and so on.

Conventional methods do not include the analysis and selection of the difference between the stream supply and target pressure of hot streams to be cooled or cold streams to be heated as degrees of freedom, i.e., using the difference as an optimization variable to create extra heating or cooling capabilities. Various embodiments of the invention perform such analysis and selection process. Many streams have high pressure to be reduced and low pressure to be increased. Reducing the stream pressure results in a reduction in the supply temperature of such stream which translates to a cooling capacity. The increase in pressure of other streams results in an increase of its supply temperature and its capacity for heating. Such variables can be optimized for the sake of the whole inter-process integration. According to an embodiment, the energy targeting module uses intervals for the supply temperatures and/or target temperatures of the streams. The supply temperature interval can represent the possible pressure increase of a stream or possible pressure reduction of another to achieve optimum energy consumption saving of the whole eco-industrial park. As such, one of ordinary skill in the art will understand that optimized steam pressure can be extracted from the optimization problem through optimization of the supply temperature provided a relation is established or understood to exist between steam pressure and the supply temperature.

Conventional methods prevent indirect inter-plants integration using steam because of the long distances involved due to capital cost requirements, and/or condensation problems. Various embodiments of the invention advantageously utilize a "Beyond-Cooperation" approach through a "Domino-Effect-Steam-Transfer/Steam-Propagation/Steam Sharing Module" in which processes of a plant act as ambassador to a pair of plants: one supplying steam and one requiring steam. Various embodiments can identify such ambassadors. For example, Plant A's hot streams can generate steam. Instead of integrating such hot streams with the plant cold streams, Plant A transfers steam to Plant B, which does not need steam. Plant B will then be able to generate steam to give it to next door Plant C, avoiding the long distance between Plants A and C.

Conventional methods use waste heat in form of hot process streams or waste steam to offset an adjacent plant's thermal heat deficit. Various embodiments of the present invention systematically include waste cooling capacities for integration as well. Further or alternatively, various embodiments provide steps/operations for simultaneously spatial and temporal inter-systems integration which enhance load smoothing or peak-lopping due to high intermittent loads on heat and/or power.

Figure 16:
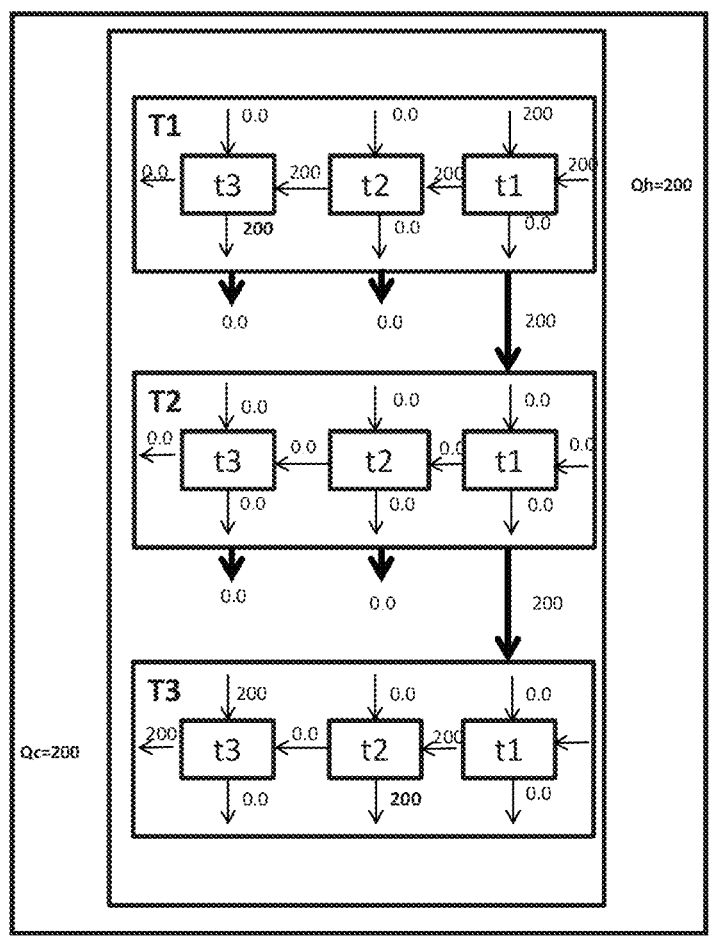
FIG. 16 is a flow diagram illustrating a conventional solution obtained utilizing the graphical model of FIG. 12 according to an embodiment of the present invention.
Figure 17:
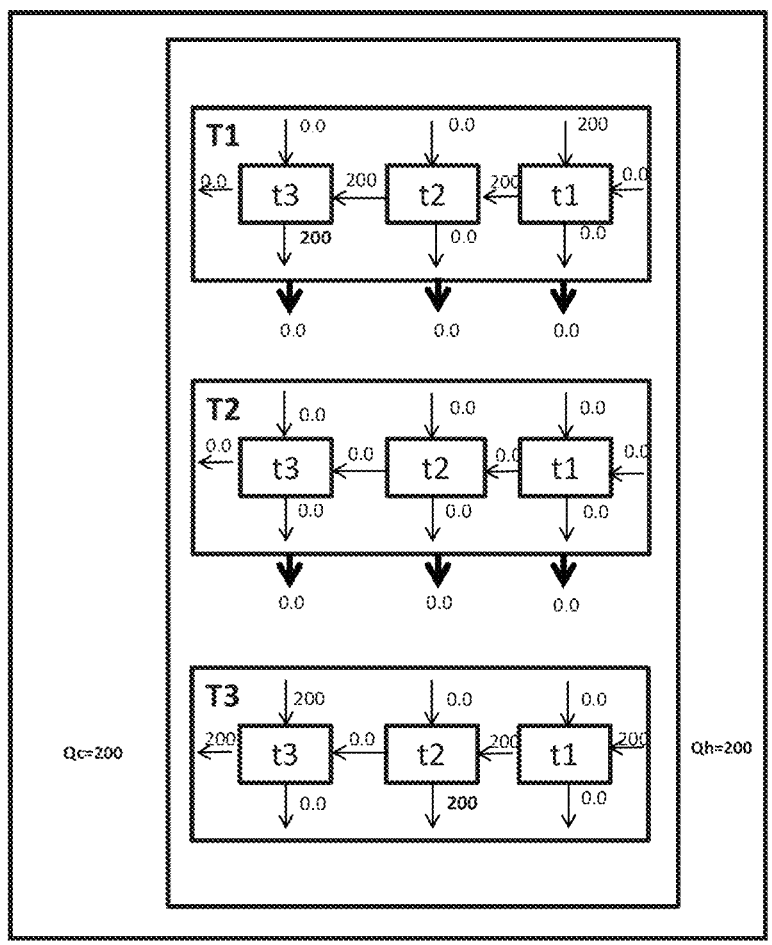
FIG. 17 is a flow diagram illustrating a conventional solution obtained utilizing the graphical model of FIG. 12 according to an embodiment of the present invention.

Additionally, various embodiments of the invention provide a methodology for inter-time-zone integration that is rigorous as compared to the two famous state-of-the-art methods: the time pinch method and cascade algorithm, described by Ian C. Kemp, "Pinch Analysis and Process Integration" p. 271 (2007), which are not rigorous and thus, do not provide a consistently accurate solution. For example, the energy targets calculated using one or more embodiments of invention, applied to the primitive example illustrated in FIGS. 13-14, renders Q_heating=0 units and Q_cooling=0 units. In contrast, as shown in FIGS. 16-17, the conventional methodologies on the same primitive example would render higher energy targets, on the order of Q_heating=200 units and Q_cooling=200 units, which means that they do not provide the optimal solution, or even a sufficient solution. Consequently, the conventional systems can cause the user to miss out on numerous possible solutions in the solutions' space for energy saving otherwise available if they employed inter-time-zones energy integration according to various embodiments of the invention.

There are several reasons behind their erroneous energy targets calculation. For example, the cascade analysis method limits the potential scope of its inter-time zones energy integration by first conducting an intra-time zone integration in a first time zone ("t1"), and then if there is surplus energy below the pinch temperature in the first time zone t1, it is transferred to next time zone ("t2") above its pinch for inter-time zones energy integration. In such scenario, the method used will be expected to miss numerous opportunities due to the mishandling of the temperature/thermodynamic constraint. For example, according to the cascade methodology, a hot stream carrying waste heat at a certain temperature in time zone t1 can only transfer heat to time zone t2, i.e., the next time zone as per the cascade method, if and only if its temperature is higher than that of the cold stream in time zone t2 by a minimum temperature difference or more. Otherwise if there is no cold stream in time zone t2, having such criterion then the waste heat in the hot stream in time zone t1 will be wasted to a cooling media.

Also for example, the energy targeting method, in its calculation logic and procedures, treats the time constraint as a hard constraint. An example includes treating the range/length of the boundaries/time zone intervals as hard constraints. Another example happens when the hot stream to be cooled exists in a later time zone while the cold stream to be heated exists in an earlier one. This limitation deprives it from being inclusive, resulting in the loss/missing of numerous possible opportunities, even though the time constraint can be relaxed/overcome through use of various process solutions such as, for example, rescheduling of streams, storage of a hot stream to next batch, using of a buffer stream, using an in-process waste utility stream, storing a cold stream to future time zones, using advanced matching techniques as in the cases of non-thermodynamic constraints, as well as manipulating streams flow rates across the time zones (e.g., increase, decrease and both).

A buffer stream such as water, hot oil and so on or in-process condensate stream, waste water stream or steam condensate stream and so on can be used, for example, to take the thermal load available heating or cooling and transfer it to another plant in another time zone. For example, the stream can take the thermal load from a hot stream or streams that need to be cooled in time zone t1 without interrupting an associated batch process path, and use it to give heat to a cold stream in time zone t2. In order not to delay the batch process in time zone t1, a storage tank can be used for the hot stream. Using advanced matching techniques can be conducted, for example, via allowing a second hot stream "H2" leaving time zone t1 to time zone t2 for further processing to be heated up by a first hot stream "H1" in time zone t1. H2 receives extra heating load while cooling down H1 to continue its processing path in time zone t1. The extra heating load added to the H2 stream already embarked for processing time zone t2 can then be transferred to cold streams to be heated in time zone t2. The H2 stream, in such case, is a thermal heating load "carrier" that receives heat from one zone to be used in another time zone into which it is already heading for further processing.

Experts in the field have recognized a long felt need for a targeting methodology that identifies the maximum potential for heat recovery. The experts will also recognize the benefits of the methodology of doing so according to various embodiments of the invention, which can include taking time constraints, thermodynamic/temperature constraints, and non-thermodynamic constraints (e.g., forbidden heat transfer/matching) into consideration simultaneously, and not sequentially. Experts in the field will also understand that the calculated attainable global maximum potential for heat recovery provided according to one or more embodiments of the invention, can be waived, typically at the management level, later on in favor of allowing for higher utility energy consumption targets as determined according to various solutions' options, based upon "big picture" economics and/or process objectives' priorities.

Various embodiments of the invention provide a problem representation for targeting and solutions generation using a time and temperature duty diagram (TTDD) or T2D2 graph. Various embodiments of the invention provide hybrid integration in time and space simultaneously. Various integration scenarios include energy storage and transfer and/or process-specific rescheduling in the context of the overall system for inter-time and/or inter-space integration. One or more embodiments, industrial and non-industrial systems in the problem representation boundary. One or more embodiments provide targeting for the best candidate and the second alternative and so on for eco-park membership for any number of zones, blocks, facilities, plants processes and streams as well as any number of time intervals. According to one or more embodiments, solution alternatives include multiple alternatives for economic evaluation to include: process-specific conditions modifications, rescheduling, energy storage, and processes matching to include batch-with-batch and batch-with-continuous, among others as understood by those of ordinary skill, in both time and space. Solution alternatives can include best utility synthesis and best utility operating scenario for each time interval in the eco-industrial park. Various embodiments also include a methodology for designing candidate solutions with retrofit in mind or retrofit with further retrofit in mind, hybrid indirect medium integration solutions, simultaneous consideration of utility and processes design or retrofit, and process-specific structural and operations changes (e.g., temperatures and pressure), as well as stream-specific minimum approach temperature.

Multi-Process Approach

Figure 4:
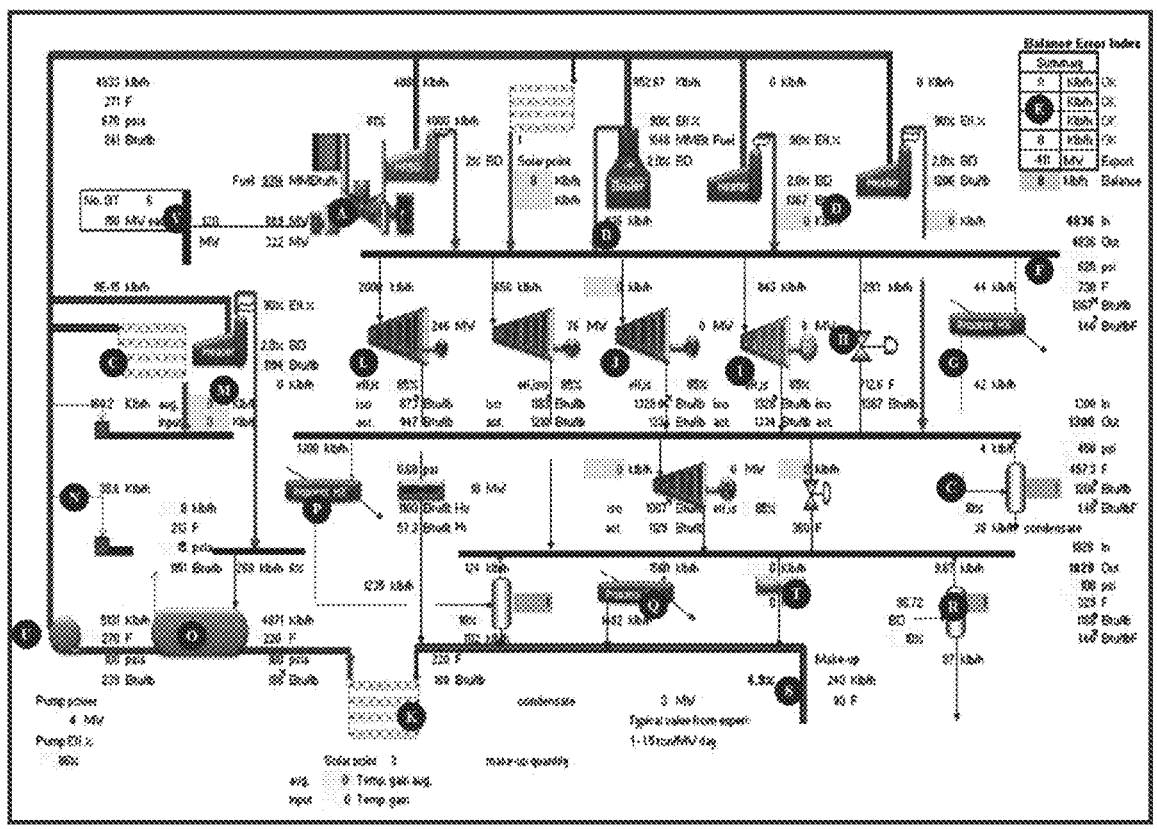
FIG. 4 is a schematic diagram of a central multi-generation utility system in synergy with a mega industrial community including industrial and non-industrial according to an embodiment of the present invention.

The various embodiments of the present invention beneficially provide new tools for the mega-problem representation, targeting for inter-processes energy integration, and processes/plants matching. FIG. 4 illustrates synthesis of a central multi-generation utilities system in synergy with an industrial community and a non-industrial community. As an example, at least partially shown in FIG. 4 is an exemplary combined heat and power modified structure interfaced with residential housing labeled as 1, commercial building, hospitals, churches, mosques, etc. labeled as 2, and other industry site zones 3-10 shown in FIG. 1.

Figure 18:
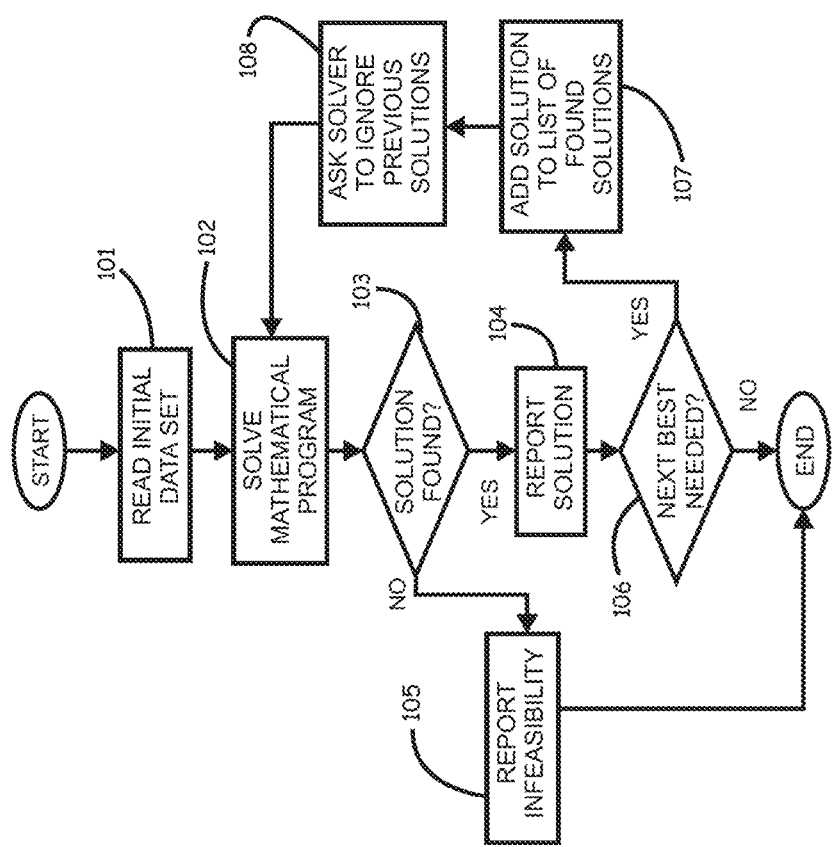
FIG. 18 is a block flow diagram illustrating execution steps for a mathematical program model according to an embodiment of the present invention.

According to an embodiment, the tools for solving the mega-problem for the eco-industrial park shown, e.g., in FIG. 4 include multiple processes/procedures including but not limited to: performing eco-industrial parks inter-time zones inter-systems energy integration to using, for example, the time-dependent processes inter-time zones energy integration and initial solution finding module/method 52 (FIGS. 3 and 10-14), performing hybrid inter-time inter-system matching; and performing eco-industrial park membership management utilizing, for example, eco-industrial park mathematical program model 54 (FIGS. 3 and 18). The processes/procedures can also include: performing a domino-effect model for low pressure steam targeting process using, for example, the domino-affect steam sharing module/method 53 (FIGS. 3, 19, and 24); performing a multi-levels multi-facilities steam targeting process (FIGS. 25-27); and data extraction and utility energy targeting (FIGS. 28-34). FIGS. 35-51 provide targeting and best coupling examples. The processes/procedures can further include energy integration via temporal and spatial systems matching using module/method 55 (FIGS. 52-62), and developing multi-time period combined heat and power models for eco-industrial park utility system synthesis and planning under uncertainty utilizing, for example, the multi-time period eco-industrial park utility system synthesis and operation planning models 56 (FIGS. 3-5 and 63-69).

In performing these processes/procedures, the following issues are addressed systematically: inter-time zones inter-systems energy integration; hybrid inter-time inter-systems matching; low pressure steam targeting utilizing a domino effect model; multi-levels-multi-facilities steam targeting; mathematical program modeling for eco-industrial park membership management; best and second best couplings of temporal zones inter-zones/systems integration; multi-time period combined heat and power modeling; and energy integration via temporal and spatial systems matching, each potentially performed under all possible combinations of process-specific design modifications and advanced matching. Additional issues also or alternatively include, but are not limited to: spatial direct and indirect as well as hybrid integration (i.e., when to use direct, indirect or both); addressing partial and totally forbidden matches; best and second best couplings of spatial zones, facilities, units and streams using direct integration for any number of industrial facilities; targeting and finding solutions; and design or retrofit with future retrofit-in-mind, addressed in detail in U.S. patent application Ser. No. 13/858,731 and U.S. patent application Ser. No. 13/858,718, the related discussions of which are incorporated by reference in their entirety.

According to an exemplary configuration, using the composite curves building method, all streams for all time periods/zones can be represented in one temperature interval graph, problem-wide pinch point(s) can be defined and an optimal pinch temperature can be identified. Additionally, the zone; block, facility, process unit and stream controlling pinch point location(s), both spatially and temporally, can be found. Further, the zone(s); block(s), facility(s), process unit(s), and stream(s) and time zones having a high and highest impact on the waste energy recovery problem can be located. A graphical technique can also be used to identify the minimum direct number of matches/connections among zones or blocks or facilities or processes (U.S. patent application Ser. No. 13/858,731 and U.S. patent application Ser. No. 13/858,718), spatially and/or temporally. A graphical technique can also be used via the all-in-one composite lines to decide the amounts of indirect heating and indirect cooling duties and its associated temperature levels above and below the problem-wide pinch, as well as the estimated targets for extractable work above the pinch and reducible work below the pinch. Note, in cases where the pinch temperature is equal to ambient temperature or below, according to an embodiment, one can expect only extractable work above the pinch and reducible work below the pinch. In all of the cases, according to an embodiment, one can expect to find and can identify extractable work above and below the pinch.

Prior to providing an eco-industrial park problem wide representation, the following discussions regarding eco-industrial park inter-time zones inter-systems energy integration, methods of constructing a newly developed problem-wide time-temperature duty diagram (T2D2), and hybrid inter-time inter-systems matching procedures, are provided.

Figure 6:
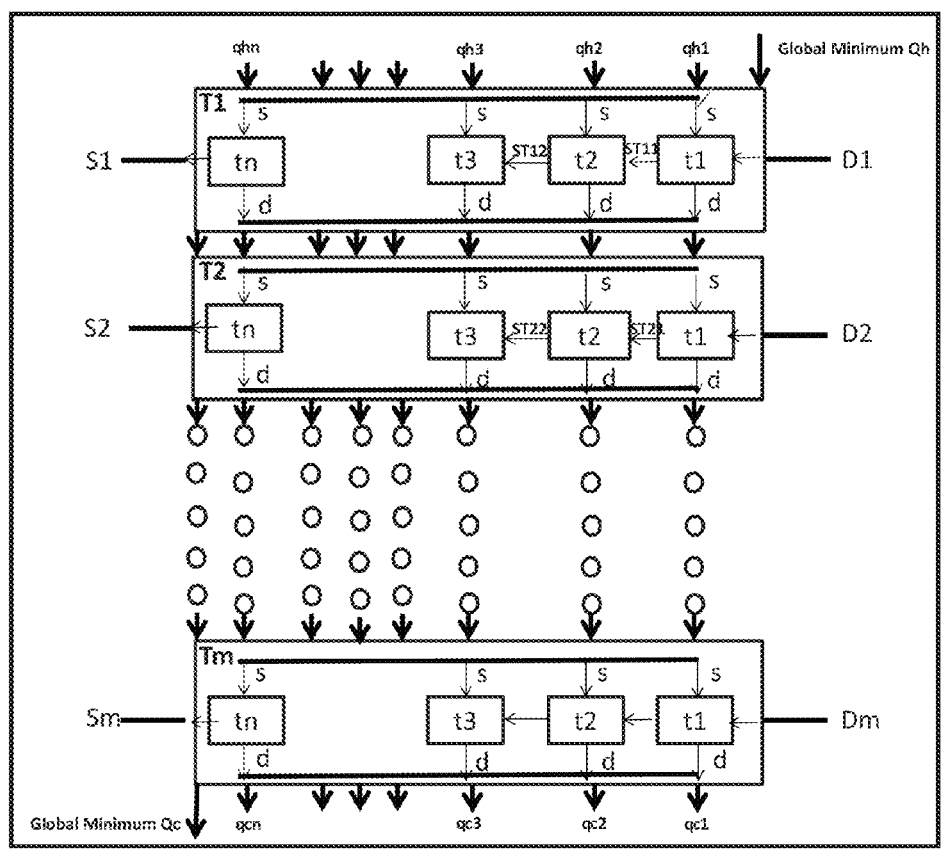
FIG. 6 is a block flow diagram illustrating a time-dependent processes energy targeting and initial solutions' finding model according to an embodiment of the present invention.

Eco-Industrial Parks Inter-Time-Zones-Inter-Systems Energy Integration Module:

The eco-industrial park inter-time zones inter-systems energy integration module/process, described with respect to FIG. 6, can include the following steps:

| | |
|---|---|
| Step 1 | Extract all the heating and cooling tasks for all significant industrial and non-industrial activities in/for the whole of the entire eco-industrial park. |
| Step 2 | Construct a time-space schematic for the eco-industrial park heating and cooling tasks to identify the time zones boundaries. |
| Step 3 | Use the Time-Temperature-Duty-Diagram to establish a supply (s)-demand (d)-cascade from heating and cooling tasks, respectively at each temperature interval. |
| Step 4 | Use step # 3 to calculate (a) "S" supply and "D" demand at each temperature interval via cascading "s" and "d" in time and (b) inter-time zones energy load storage and/or rescheduling requirements ("st11", "st12", "st21", "st31"and so on) among time zones for the whole eco-industrial park. |
| Step 5 | Use step # 4 to calculate via another cascade in "S" and "D," the global minimum heating and cooling needs of the whole eco-industrial park's time-dependent and non-dependent industrial and non-industrial activities. |
| Step 6 | For eco-industrial park heating and cooling needs, uncertainties inclusion in the calculation steps from #1 to #2 will be conducted using intervals instead of real numbers. |

Step 1 includes extracting all the heating and cooling tasks for all significant industrial and non-industrial activities in/for the entire eco-industrial park. This can be accomplished via entering input data in an input table or spreadsheet, such as, for example, Table 1 shown below for a single batch process, or in an input webpage form similar to that shown in FIG. 29.

TABLE 1

| Time Zone | Duration(hour) | Stream type | Ts | Tt | FCpt |
|---|---|---|---|---|---|
| t1 | 0-1 | H1 | 400 | 300 | 2 |
| t2 | 1-2 | C1 | 0 | 100 | 2 |
| t3 | 2-3 | C2 | 280 | 380 | 2 |
| t3 | 2-3 | H2 | 120 | 20 | 2 |

Step 2 includes constructing a time-space schematic for the eco-industrial park heating and cooling tasks to identify the time zones boundaries. According to the exemplary configuration, the time zone boundaries are defined by the smallest heating or cooling time duration of any activity in the park under analysis. According to a less desirable alternative, the smallest time zone can be a standard time block such as, 1 hour, one minute, other, or a combination standard and activity specific thereof.

Step 3 includes establishing a supply (s)-demand (d) cascade from heating and cooling tasks, respectively, at each temperature interval (T1-Tm), using, for example, a Time-Temperature-Duty-Diagram (T2D2), described below. FIG. 6 illustrates an exemplary model illustrating the supply-demand cascade.

Step 4 includes: (a) calculating the energy supply S1-Sm and the demand (D1-Dm) at each temperature interval (T1-Tm) via cascading supply "s" and demand "d" in each separate time zone, and (b) calculating inter-time zones energy load storage and or rescheduling requirements ("ST11", "ST12", "ST21", "ST31" and so on) among time zones (t1-tn) for the whole eco-industrial park. Note, ST11 represents storage at temperature interval T1 and time zone t1.

Step 5 includes calculating the global minimum heating (Qh) and global minimum cooling (Qc) needs of the whole of the eco-industrial park time-dependent and non-dependent industrial and non-industrial activities via another cascade in "S" and "D." Note, in the special case of a threshold problem requiring only heating utility or cooling utility, the global value can be calculated by summing the respective D1-Dm or S1-Sm.

Step 6 includes including intervals instead of real numbers in the calculations performed in steps 1-5 where it is desired to include uncertainties in the eco-industrial park heating and cooling needs.

Method for Constructing Problem-Wide Time-Temperature-Duty Diagram (T2D2):

The eco-industrial park inter-time zones inter-systems energy integration module/process, described with respect to FIGS. 7-9 and 13, can include the following steps:

| | |
|---|---|
| Step 1 | Define the problem time and space zones, blocks, facilities, plants and processes considered for inter-systems energy integration. |
| Step 2 | Construct the global Cold Composite Line (gCCL) for all the zones, blocks, facilities, plants and processes' streams in each time zone. |
| Step 3 | Construct the global Hot Composite Line (gHCL) for all the zones, blocks, facilities, plants and processes' streams in each time zone, with embedded ΔT_min for specific zone, block, facility, plant, process and stream and steam headers as well as hot oil circuits. |
| Step 4 | Locate the problem-wide desired pinch and the pinch-location controlling process/stream. |
| Step 5 | Draw the global Cold Composite Line (gCCL) for each time zone above and below the pinch. |
| Step 6 | Draw the global Hot Composite Lines (gHCL) for each time zone above and below the pinch. |
| Step 7 | Write the thermal load on the top of each time zone above the pinch. |
| Step 8 | Write the thermal load on the bottom of each time zone below the pinch. |
| Step 9 | Write the Surplus Heating Load for each time zone at the top left corner above the pinch and bottom left corner below the pinch (include Qc). |
| Step 10 | Write the Deficit Heating Load for each time zone on the bottom right corner below the pinch and on the top right corner above the pinch (include Qh). |

Note, U.S. patent application Ser. No. 13/858,731 and U.S. patent application Ser. No. 13/858,718, provides a detailed discussion regarding obtaining data, constructing global hot and cold composite lines, identifying problem wide pinch locations and pinch controlling processes/zones/streams.

Step 1 includes defining the problem time and space zones, blocks, facilities, plants and processes considered for inter-systems energy integration. This can include identifying the spatial structure and time durations of batch, semi-batch, and continuous activities/facilities, for example.

Step 2 includes constructing the gCCL for all the zones, blocks, facilities, plants and processes' streams in each time zone (t1-t3 in this example).

Step 3 includes constructing the gHCL for all the zones, blocks, facilities, plants and processes' streams in each time zone, with embedded ΔT_min for specific zone, block, facility, plant, process and stream and steam headers as well as hot oil circuits. Note, the steam headers and hot oil circuits exchangers are assigned one-half the minimum approach temperature of each hot stream they receive load from.

Step 4 includes locating the problem-wide desired pinch and the pinch-location controlling process/stream. The pinch controlling stream is one of the streams extending from the problem-wide desired pinch and can be identified by changing values of the suspect stream or streams to see if the problem wide pinch location changes.

Figure 7:
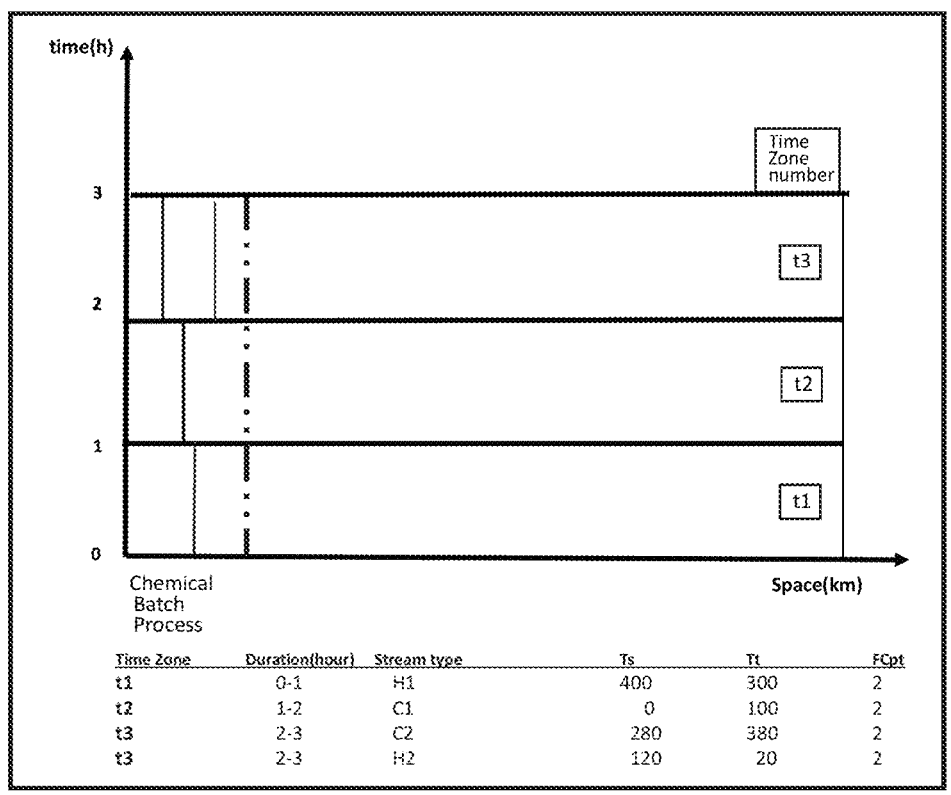
FIG. 7 is a data table and corresponding graph providing an exemplary display of the tabular data according to an embodiment of the present invention.
Figure 8:
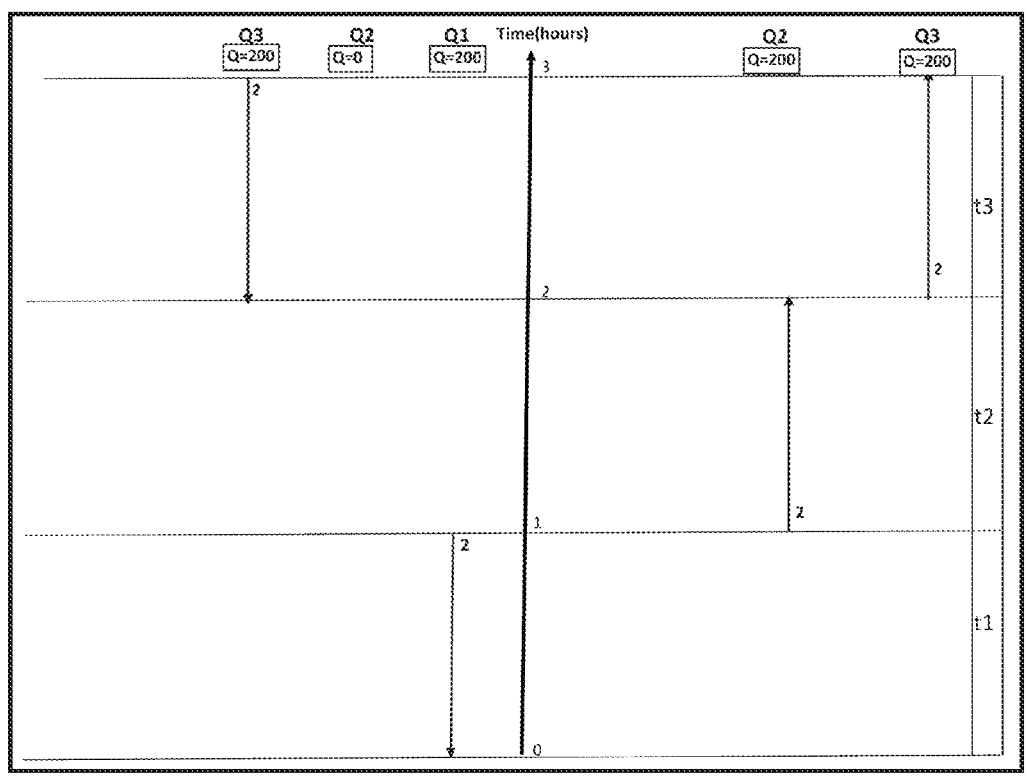
FIG. 8 is a time duty diagram illustrating the tabular data of FIG. 7 according to an embodiment the present invention.
Figure 9:
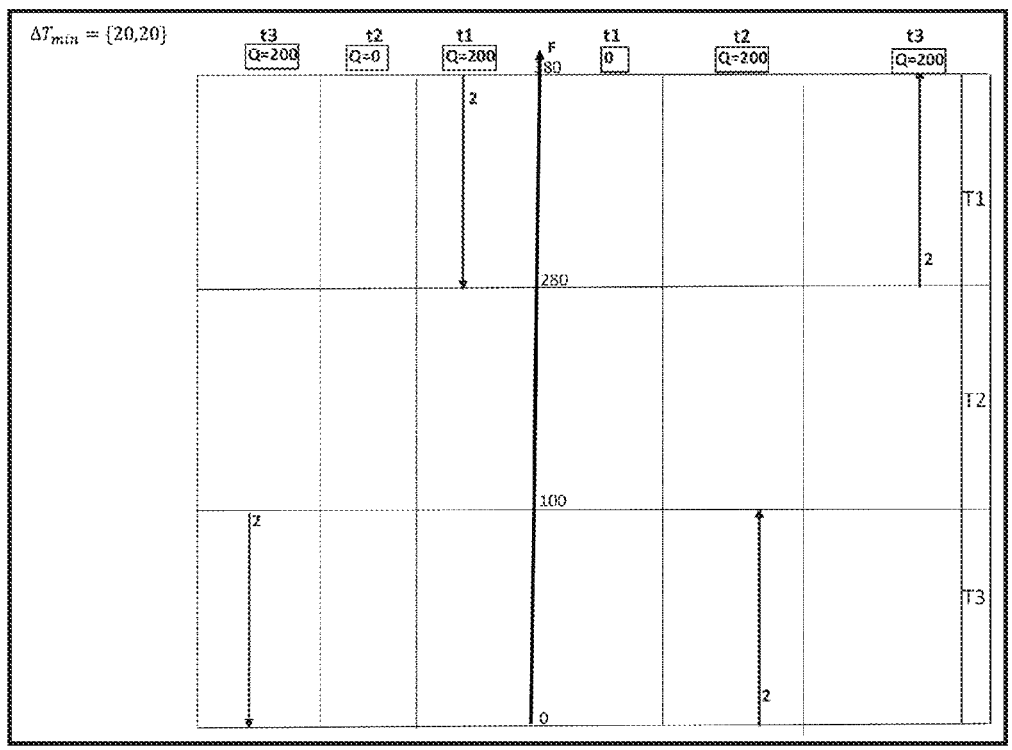
FIG. 9 is a temperature time duty diagram illustrating the tabular data of FIG. 7 used for visualizing inter-time zones integration according to an embodiment of the present invention.

Step 5 includes drawing the gCCL for each time zone (t1-t3) above and below the pinch, and Step 6 includes drawing the gHCL for each time zone (t1-t3) above and below the pinch. FIG. 7 illustrates developing a time interval graph that can be used for identifying the hot streams "H" and cold streams "C" for each of the various processes/zones, etc. for each time zone. FIG. 8 illustrates a time duty diagram (TDD) which graphically provides the global hot and cold composite lines for each spatial designation (e.g., zone, process, etc.) labeled as "Q1-Q3" in the figure for each time zone labeled "t1-t3" in the figure. FIG. 9 illustrates a temperature-time duty-diagram which graphically displays the hot and cold composite lines for each time zone for each temperature interval.

Step 7 includes writing/transferring the thermal load on the top of each time zone (t1-t3) above the pinch (see, e.g. FIG. 9), and Step 8 includes writing the thermal load on the bottom of each time zone (t1-t3) below the pinch.

Step 9 includes writing/transferring the Surplus Heating Load for each time zone at the top left corner above the pinch (see, e.g., FIG. 13) and bottom left corner below the pinch, along with the value of global cooling utility requirement value Qc, and Step 10 correspondingly includes writing/transferring the Deficit Heating Load for each time zone on the bottom right corner below the pinch and on the top right corner above the pinch, along with global heating utility requirement value Qh.

Note, the Surplus Heating Load above the pinch is the load that needs to be recovered via inter-time-zones-inter-systems energy integration, otherwise cooling duty above the eco-industrial park problem pinch will be required, which results in a loss in energy efficiency. The Surplus Heating Load below the pinch is the load that needs to be recovered via inter-time-zones-inter-systems energy integration, otherwise more cooling duty will be needed above desired energy target. The Deficit Heating Load below the pinch is the load that needs to be provided via inter-time-zones-inter-systems energy integration, otherwise heating duty below the eco-industrial park problem pinch will be required, which results in loss in energy efficiency. The Deficit Heating Load above the pinch is the load that needs to be provided via inter-time-zones-inter-systems energy integration, otherwise more heating duty will be needed above desired energy target.

Figure 13:
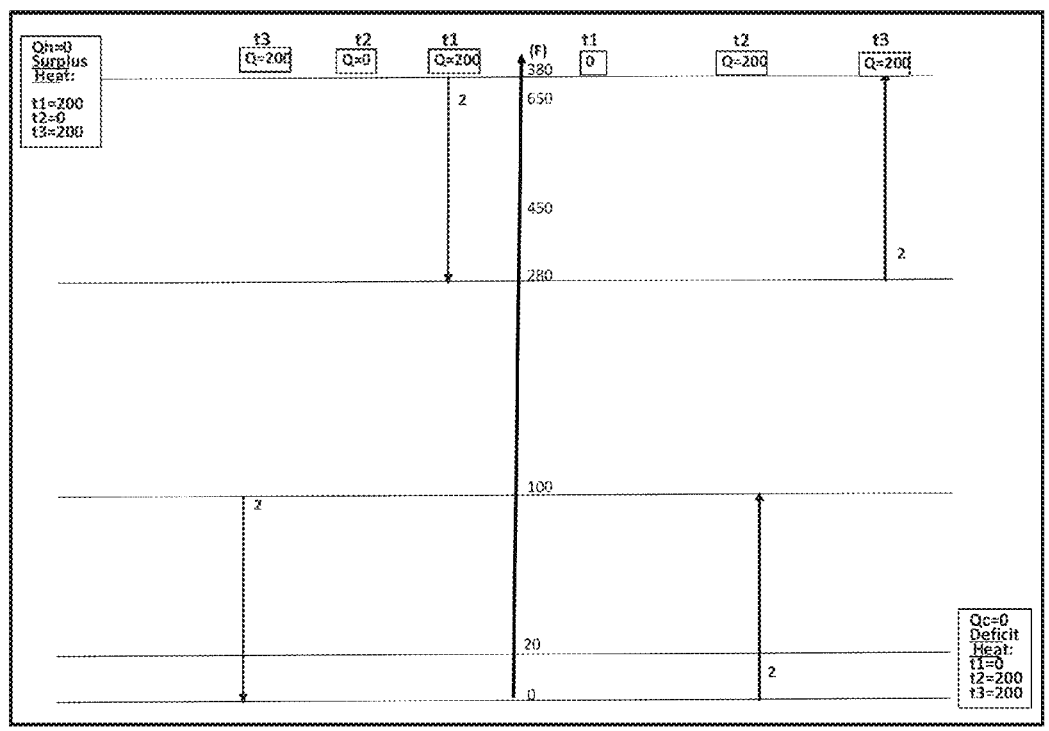
FIG. 13 is a graphical illustration of a temperature time duty diagram used for inter-time zones solutions' finding according to an embodiment of the present invention.

Hybrid Inter-Time-Inter-Systems Matching Procedures:

The hybrid inter-time inter-systems matching module/process, described with respect to FIGS. 3 and 13—can include the following steps:

| | |
|---|---|
| Step 1 | Conduct inter-time-zones energy matching. |
| Step 2 | Identify the thermal load to be integrated via intra-time integration and inter-time integration. |
| Step 3 | Define media of thermal load integration via inter-time zone integration. |
| Step 4 | Conduct intra-time inter-systems energy matches for each time zone. |
| Step 4a | Start the intra-time-inter-systems matching via de-lumping of each time zones gCCL and gHCL into its forming facilities, then plants, processes and streams. |
| Step 4b | Conduct the intra-time-inter-systems matching that achieve the defined intra-time zone thermal load integration using a "temperature duty diagram." |

Figure 14:
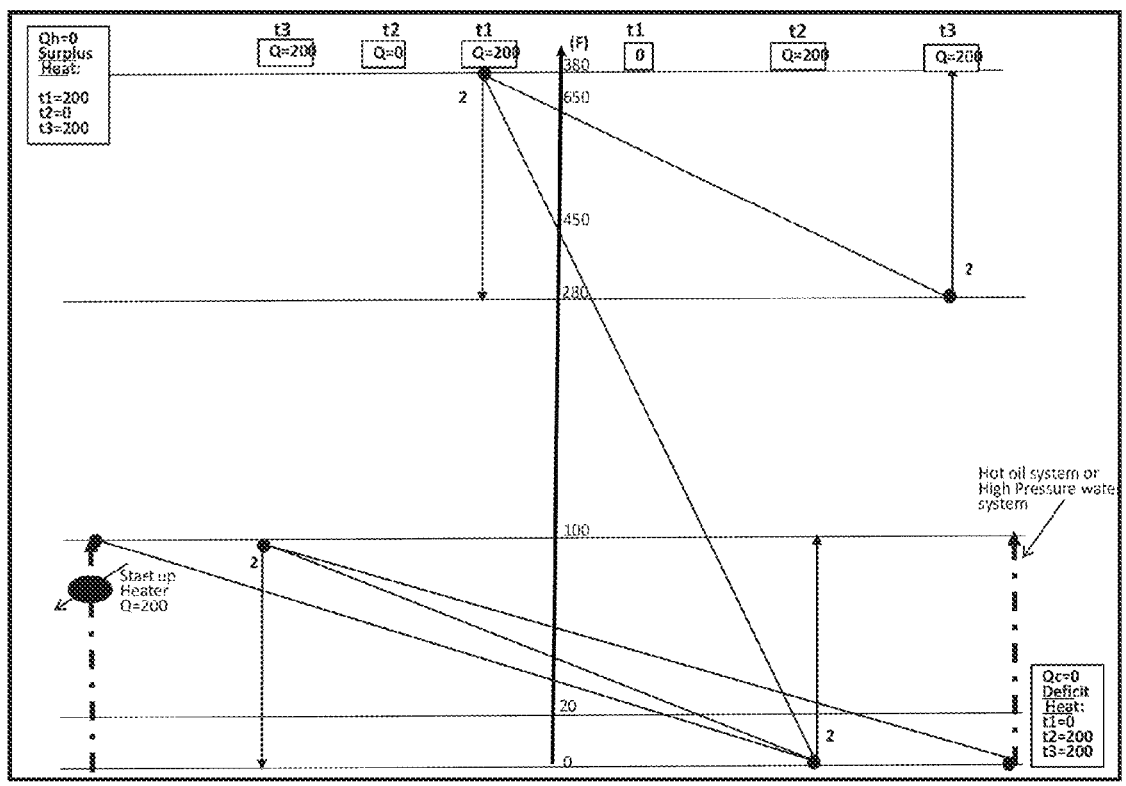
FIG. 14 is a graphical illustration of the time-temperature duty-diagram of FIG. 13 illustrating an exemplary matching scenario according to an embodiment the present invention.

Step 1 includes conducting inter-time-zones energy matches. FIG. 14 illustrates an example of performing both direct and indirect matching using oil and/or water. According to one or more embodiments, it has been shown that performing inter-time zone energy matching first, against conventional wisdom, and then intra-time zone matching provides more potential for reducing energy utility consumption and GHG emissions.

Step 2 includes identifying the thermal load to be integrated via intra-time integration and inter-time integration. Note, exemplary procedures applicable to inter/intra-time inter-systems energy matching is provided in U.S. patent application Ser. No. 13/858,731 and U.S. patent application Ser. No. 13/858,718.

Step 3 includes defining the media of thermal load to be integrated via inter-time zone integration. Such media can include, but is not limited to, thermal energy storage, rescheduling of activities or processes, and changing of the flow rates.

Steps 4-4b include conducting intra-time inter-systems energy matches for each time zone. This step includes starting intra-time-inter-systems matching via de-lumping of each time zones gCCL and gHCL into its forming facilities, then plants, processes and streams, and conducting intra-time-inter-systems matching that achieves the defined intra-time zone thermal load integration. This can be accomplished through use of a "temperature duty diagram" (see, e.g., FIG. 8), the construction of which is described in detail in U.S. patent application Ser. No. 13/858,731 and U.S. patent application Ser. No. 13/858,718.

Eco-Industrial Park Problem-Wide Representation and Lab Test Procedures:

The eco-industrial park problem wide representation and lab test procedures module/method can incorporate the time-dependent processes inter-time zones energy integration and initial solution finding module/method 52, an eco-industrial parks membership management module 54, an energy integration via temporal and spatial systems matching module 55, a multi-time period eco-park utility system synthesis and operation planning model module 56, and one or more of the processes/program modules 61 (FIG. 3). The eco-industrial park problem wide representation and lab test procedures can include the following steps:

| | |
|---|---|
| Step 1 | Define the eco-industrial park time and space problems Zones, Blocks, Facilities, Plants and Processes streams considered for inter-systems energy integration. |
| Step 2 | Use energy targeting module to find [Qh] and [Qc] under all possible combinations of process-specific modifications and stream-specific ΔT_min in the acceptable user defined range, and use time-dependent processes inter-time zones energy integration module and/or energy integration via temporal and spatial systems matching module to obtain energy targets for intra- and inter-time and simultaneous space/systems energy integration. |
| Step 3 | Locate the problem-wide pinch interval and the pinch-location controlling processes/streams. |
| Step 4 | Decision maker selects/identifies desired level of energy target(s) for heating utility, cooling utility or both. |

-continued

| | |
|---|---|
| Step 5 | Collapse the intervals when in interval form to locate the problem-wide best/desired pinch, the pinch-location controlling process and the best process changes as well as streams-specific ΔT_min in the acceptable user defined range. |
| Step 6 | Define the user input of absolutely constrained/forbidden zones, facilities, plants, processes and streams matching (thermal load that must be handled via indirect integration). |
| Step 7 | Use a eco-industrial park membership management mathematical programming module to guide through best possible matches among the time and space zones, or blocks, or facilities, or plants, or processes |
| Step 8 | For very large number of processes and/or time zones, use a time-temperature duty-diagram to guide through the selection of best matches, as well. |

Step 1 includes defining the eco-industrial park time and space problems Zones, Blocks, Facilities, Plants and Processes streams considered for inter-systems energy integration.

Step 2 includes using the energy targeting module 63 to find [Qh] and [Qc] under all possible combinations of process-specific modifications and stream-specific ΔT_min in the acceptable user defined range, and use the time-dependent processes inter-time zones energy integration module 52 and/or energy integration via temporal and spatial systems matching module 54 to obtain energy targets for intra- and inter-time and inter- and intra-space/systems energy integration.

Step 3 includes locating the problem-wide pinch interval and the pinch-location controlling processes/streams.

In Step 4, the decision maker reviews the data provided in Step 3 and selects/identifies the desired level of energy target(s) for heating utility, cooling utility or both.

Step 5 includes collapsing the supply and demand intervals (when in interval form) to locate the problem-wide best/desired pinch, the pinch-location controlling process or processes, and the best process changes as well as streams-specific ΔT_min in an acceptable user defined range.

Step 6 includes defining, typically through user input, the absolutely constrained/forbidden zones, facilities, plants, processes and streams matching (i.e., the thermal load or loads that must be handled via indirect integration).

Step 7 includes using the eco-industrial park membership management mathematical programming module 54 to guide through best possible matches among the time and space zones, or blocks, or facilities, or plants, or processes.

Step 8 includes optionally using the time-temperature duty-diagram (e.g., FIG. 13) for very large number of processes and/or time zones, to assist in guiding the user through the selection of best matches, as well.

Figure 10:
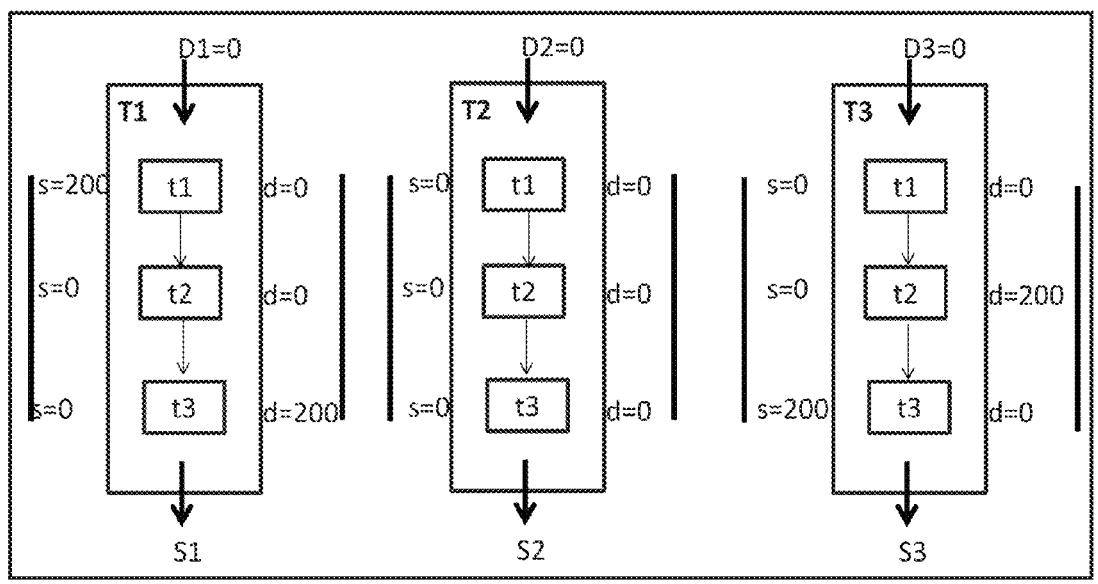
FIG. 10 is a graphical illustration of a populated time-dependent processes energy targeting model according to an embodiment of the present invention.
Figure 11:
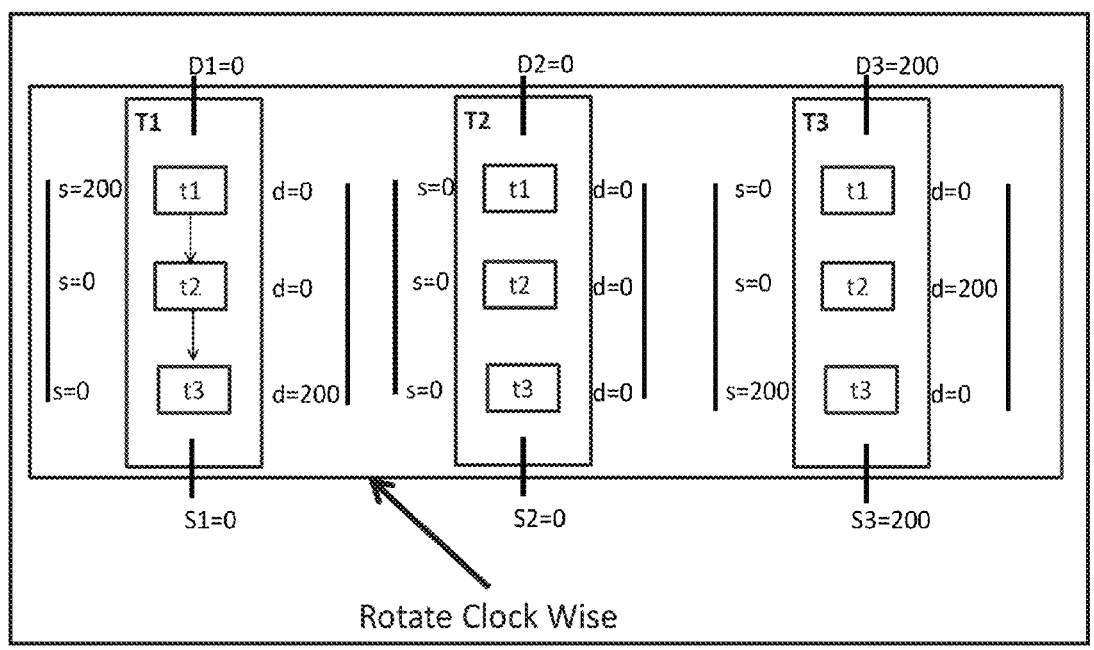
FIG. 11 is a graphical illustration of the model of FIG. 10 highlighted for rotation according to an embodiment present invention.
Figure 12:
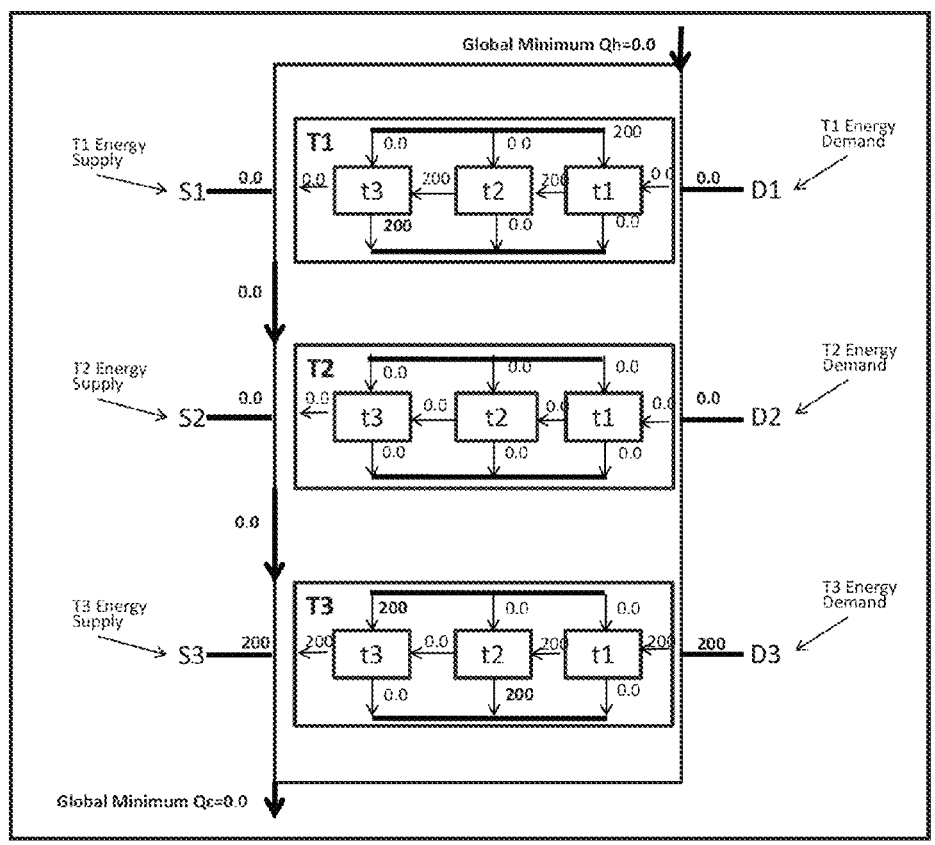
FIG. 12 is a graphical illustration of the model of FIG. 11 after rotation according to an embodiment of the present invention.

FIGS. 10-12 provide a step-by-step example of the targeting and solutions finding method. FIGS. 13-14 provide a graphical illustration of displaying the problem and performing matching using the temperature-time duty-diagram (T2D2). FIG. 10 includes a graphical illustration of the problem whereby the data is organized as a cascade of time steps (t1-t3) at individual temperature intervals (T1-T3). FIG. 12 illustrates a clockwise rotation of the data illustrated in FIG. 10.

FIG. 12 provides a graphical illustration organized vertically by temperature step and horizontally by time steps to provide for targeting and developing an initial solution through use of a combination of media of thermal load integration via inter-time zone integration. As shown graphically in the figure, optimal heat exchange can be achieved through inter-time zone integration.

FIG. 13, introduced previously, illustrates application of the streams data listed in the Table 1, to a temperature-time duty-diagram. FIG. 14 illustrates a combination of advanced matching with inter-time zone integration. In this example, optimal heat exchange can be achieved through rescheduling of stream t3-cold ("c") to time period t1; rescheduling of stream t2-c to time period t3; rescheduling of stream t3-hot ("h") to time period t2; storing the hot stream t1-h for use in time period t3; storing the hot stream t3-h to next batch and use start up heater for t2-c; storing the cold stream t2-c for use in time period t3; using of a buffer stream such as hot oil to heat up t2-c and then to cool down t3-h; using of a buffer stream such as high pressure water heat up t2-c and then to cool down t3-h; using the available steam boiler feed water system to cool t3-h; and manipulating the flowrate of stream t2-c to be FCp=0.25 in t2 and FCp=1.75 in t3. Notably, the global heating energy utility [Qh] requirement and global cooling energy utility [Qc] requirement are both zero.

Figure 15:
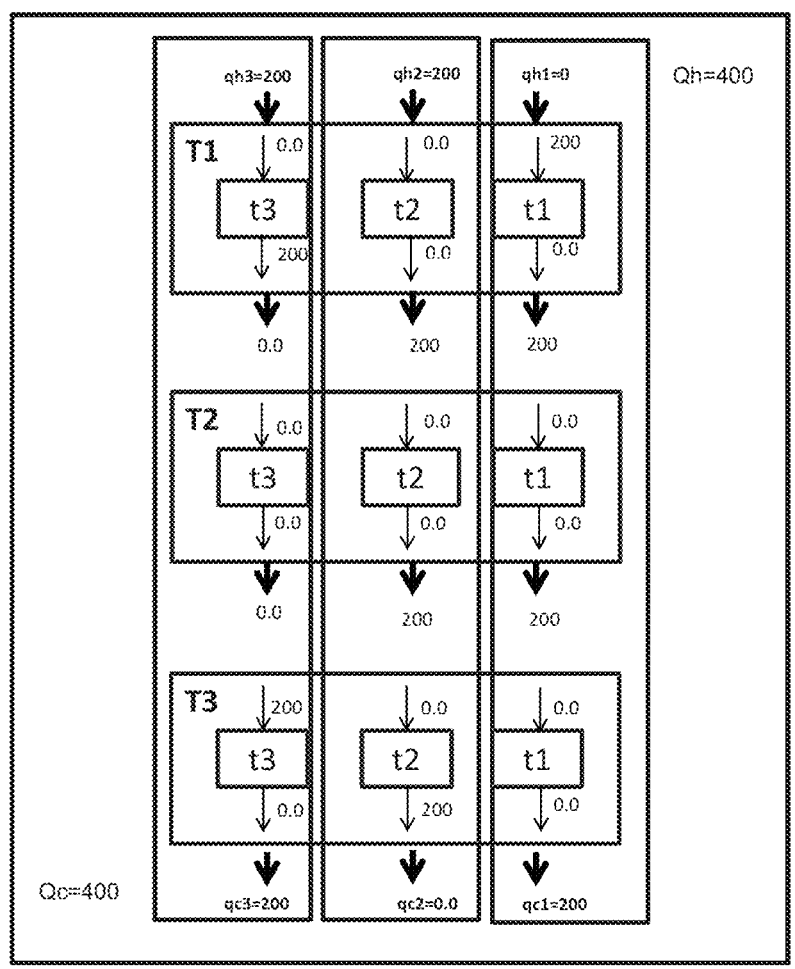
FIG. 15 is a flow diagram illustrating a conventional solution obtained utilizing the graphical model of FIG. 12 according to an embodiment of the present invention.

FIGS. 15-17 illustrates three prior art methods of optimizing energy recovery using the analysis model shown in FIG. 12 for comparative purposes.

FIG. 15 illustrates application of a conventional intra-time zone integration energy targeting calculation to the data shown in Table 1. Notably, it can be seen that the global heating energy utility Qh and the global cooling energy utility Qc are each 400 units.

FIG. 16 illustrates application of a conventional cascade analysis energy targeting method to the data shown in Table 1. Although providing better results than the conventional intra-time zone integration energy targeting calculation, the global heating energy utility Qh and global cooling energy utility Qc values, each 200 units, are still above that provided according to the embodiment of the methodology illustrated in FIGS. 10-12.

FIG. 17 illustrates application of a conventional time pinch energy targeting method to the data shown in Table 1. Similar to the conventional cascade analysis energy targeting method, although providing better results than the conventional intra-time zone integration energy targeting calculation, the global heating energy utility Qh and global cooling energy utility Qc values, each 200 units, are still above that provided according to the embodiment of the methodology illustrated in FIGS. 10-12.

The energy targets calculations using both Time Pinch and Cascade Analysis Methods render the same wrong results of minimum heating and cooling utilities, Q_heating (Qh)=200 units and Q_cooling (Qc)=200 units, which are higher than the real global minima. Wang. Y. P., and Smith. R., "*Time Pinch Analysis*" Trans IChemE, vol 73, Part A, 1995. The difference between the two is: the Time Pinch method considers the time constraint, first, as a hard constraint, and the second "Cascade analysis" considers the temperature first. In the Time Pinch method, a tank is used to move stream t1-H1 from t1 to t3, a low pressure steam stream is used for heating t2-C1 to desired target temperature and as a cooling medium for t3-H2. In the Cascade Analysis method, a tank is used to move stream t1-H1 from t1 to t2, and a high pressure steam stream is used for heating t3-C2 to desired target temperature and as a cooling medium for t3-H2.

Mathematical Programming Model for the Eco-Industrial Park Membership Management:

The mathematical programming model can incorporate the eco-parks membership management module 54 (FIG. 3). According to an exemplary embodiment, the below formulation is solved successively to enumerate all possible combinations of solutions ranked from best objective function value to least for each "user-selected" type of membership to identify the elements of the eco-industrial park alliance/eco-industrial park members. These elements can include, for example, plants and other activities in both space and time.

The model can include the following parameters:

1. Main Sets

A: is the set of all areas or time-zones in the problem
S: is the set of all streams in the problem Area or Time-Zones Properties $qh_a$: hot utility needed for area a when pinched alone
$qc_a$: cold utility need for area a when pinched alone Stream Properties $st_s$: the supply temperature of stream s
$tt_s$: the target temperature of stream s
$fcp_s$: heat flow content of stream s
$dtmin_s$: delta-min for stream s $$loc_{s,x} = \begin{cases} 1 & \text{if } s \text{ is in area } a \\ 0 & \text{otherwise} \end{cases}$$

Problem Configuration n: number of tuples needed
c: cardinality of a tuple

Calculated Sets and Parameters

HS={hs:hs∈S and $st_{hs} \geq tt_{hs}$}
CS={cs:cs∈S and s∉HS}
xt: maximum supply or target temperatures among all streams
mt: minimum supply or target temperatures among all streams
T={t∈N:t∈[xt,mt]}, set of possible 1-degree wide temperature periods
G={$G_1, G_2, \ldots, G_n$}, set of possible area groups 2. Variables $$x_{a,g} = \begin{cases} 1 & \text{if } a \text{ is assigned to group } g \\ 0 & \text{otherwise} \end{cases}$$

$$TDem_{t,g} = \sum_{ext>st_{cs} \& t \leq tt_{ci}} \left( \sum_{a:loc_{a,c,s}} x_{a,g} \cdot fcp_{cs} \right)$$

$$TSup_{t,g} = \sum_{hmt>tt_{hs} \& t \leq st_{hs}} \left( \sum_{a:loc_{a,h,s}} x_{a,g} \cdot fcp_{hs} \right)$$

$TFeed_{t,g}$ $TSur_{t,g}$

3. Constraints

One group for each area or time zone: $\Sigma_g(x_{a,g}) \leq 1 \; \forall_a \in A$
Group Size match tuple cardinality: $\Sigma_a x_{a,g} = c \; \forall g \in G$
Period Feed Link: $TFeed_{t,g} = TSur_{t-1,g} \; \forall(t,g): t \neq xt$
Period Balance: $TFeed_{t,g} + TSup_{t,g} - TDem_{t,g} - TSur_{t,g} = 0$ Objective Function $$obj = \Sigma_a(qh_a + qc_a) \cdot (1 - \Sigma_g x_{a,g}) + \\ \Sigma_g T \; Feed_{x,t,g} + \\ \Sigma_g T \; Sur_{m,t+1,g}$$

FIG. 18 illustrates a flow chart which describes an exemplary implementation of the mathematical programming model algorithm. According to the exemplary configuration, the computer reads the initial data set (block 101), which can include the set of all areas or time-zones and the set of all streams in the problem and their properties, and solves the mathematical program (block 102). If a solution is found (block 103), the solution is reported (block 104). If no solution is found, a report of infeasibility (block 105) is issued. If a next best alternative is needed (block 106), the solution is added to the list of found solutions (block 107), the problem solver is asked to ignore the previous solution (block 108), and the mathematical program is again executed (block 102).

Eco-Industrial Park Membership Management Program List:

An exemplary embodiment of the eco-industrial park membership management program list is located in Appendix 2.

Domino-Effect Model for Low Pressure Steam Targeting Method:

The domino effect model can utilize the Domino-effect stream sharing module/method 53 (FIG. 3). According to an exemplary embodiment, the steps of the model include:

| Step 1 | Allocating processes in a "mosaic" starting with the power plant or main cogeneration plant then followed by plants/facilities arranged in the form of Demand-Supply-Demand and ending by plant Demand. |
| Step 2 | Steam is transferred from one door to the next door primarily or completely only to avoid long distances and steam condensation. |
| Step 3 | Highlight in-process modifications that can be performed to enhance process/plant' capability in producing more steam or whose status can be changed from demanding to supplying or vice versa. |
| Step 4 | Plants are arranged by their geographical locations and such location will be decided after conducting the targeting phase calculation and guided by step one in grassroots applications. |
| Step 5 | Three steam targets are calculated:<br>A. No steam transfer from one plant to another target,<br>B. Steam is only transferred to the next door plant target, and<br>C. Steam wheeling target selected using the "Domino-Effect" targeting method steps 1-4. |

Figure 19:
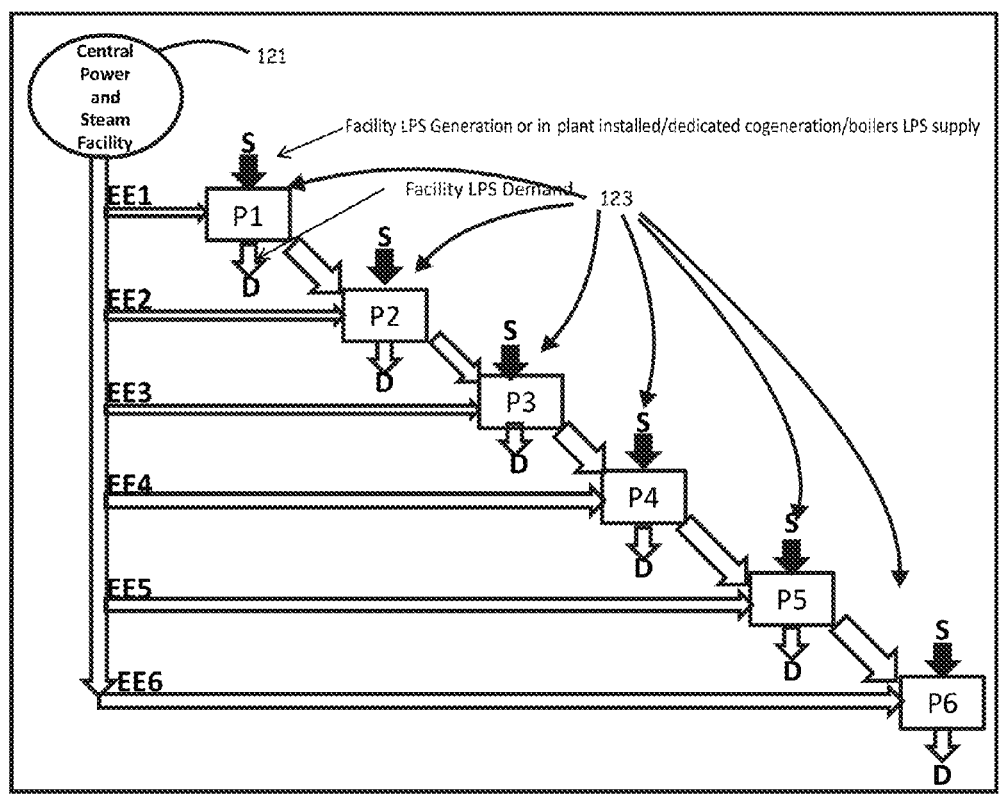
FIG. 19 is a graphical illustration of a domino effect low-pressure-steam "sharing" targeting method according to an embodiment of the present invention.

According to Step 1, and as perhaps best shown in FIG. 19, processes are preferably allocated in a "mosaic" starting, for example, with the central power and steam facility or main cogeneration plant 121 then followed by plants/facilities 123 (P1-P6) arranged in the form of demand D-supply S-demand D and ending by demand D. In this example, "S" indicates the facility low-pressure steam generation or in-plan installed/dedicated cogeneration/boilers low-pressure steam supply; "D" indicates the plant/facility low-pressure steam demand; and "EE" (e.g., EE1-EE6) indicates the external steam energy requirement for the respective plants/facilities.

In Step 2, steam is transferred from one door to the next door primarily or completely only to avoid long distances and steam condensation.

In Step 3, in-process modifications that can be performed to enhance process/plants capability in producing more steam, or whose status can be changed from demanding to supplying or vice versa are highlighted.

In Step 4, plants 123 are arranged by their geographical locations and such location will be decided after conducting the targeting phase calculation and guided by step one in grassroots applications. For example, if it is determined that it is desirable to share steam between plants P1 and P2, particularly if the design is a new eco-industrial park design, to the extent feasible, it would be beneficial to position the plants adjacent each other to avoid the long distances and steam condensation, and to continue passing steam door-to-door to other plants P3-P5.

In step 5, according to an exemplary configuration, three potential steam targets are calculated to determine the optimal steam transfer configuration. Potential steam targets include: No steam is transferred from one plant to another target; Steam is only transferred to the next door plant target; and Steam wheeling target is selected using this "Domino-Effect" targeting process.

Figure 20:
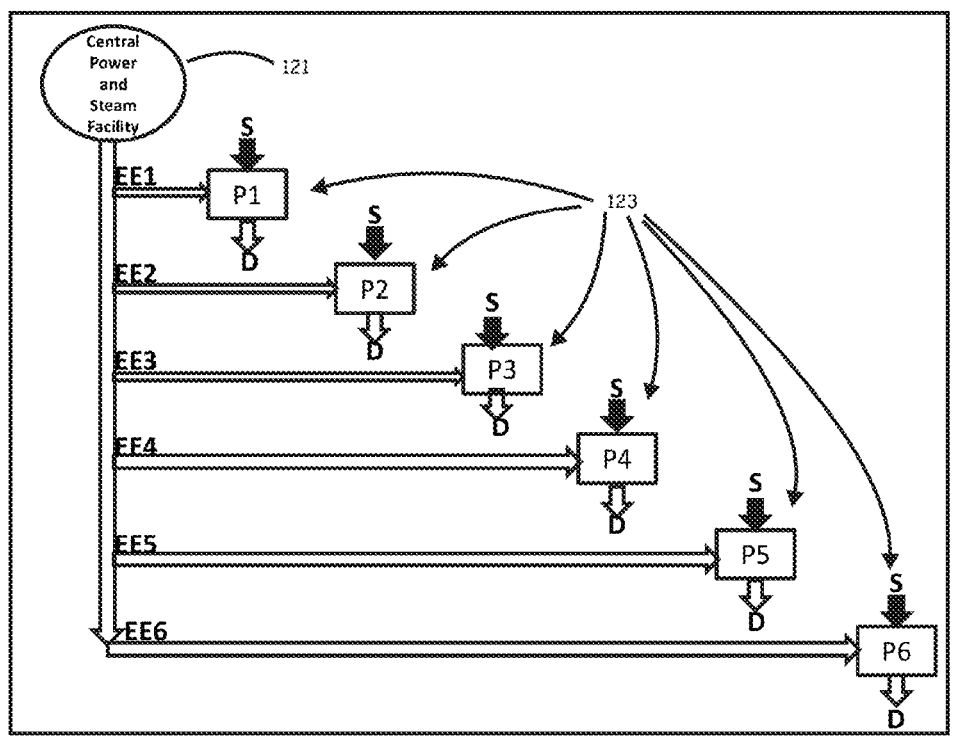
FIG. 20 is a graphical illustration of a conventional method of obtaining low-pressure steam.
Figure 21:
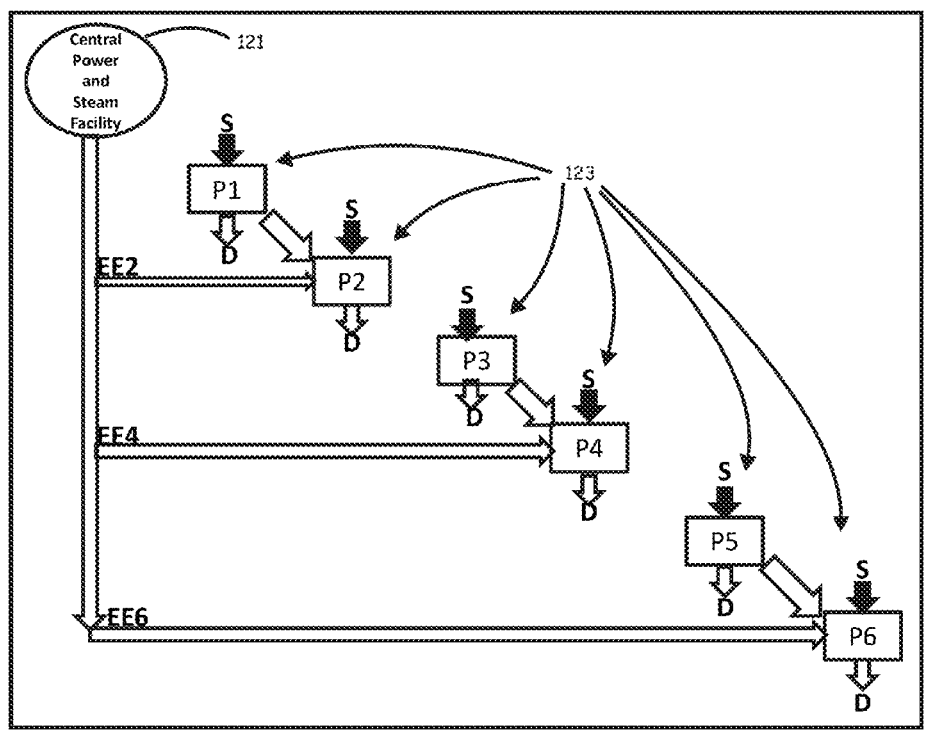
FIG. 21 is a graphical illustration of a conventional method of obtaining low-pressure steam.

FIG. 20 graphically illustrates an example model of a scenario where no sharing occurs and the steam deficit is obtained only from the central power and steam facility 121. FIG. 21 graphically illustrates an example model of a scenario where the steam deficit is obtained from a next-door plant 123 and/or the central power and steam facility 121.

Figure 22:
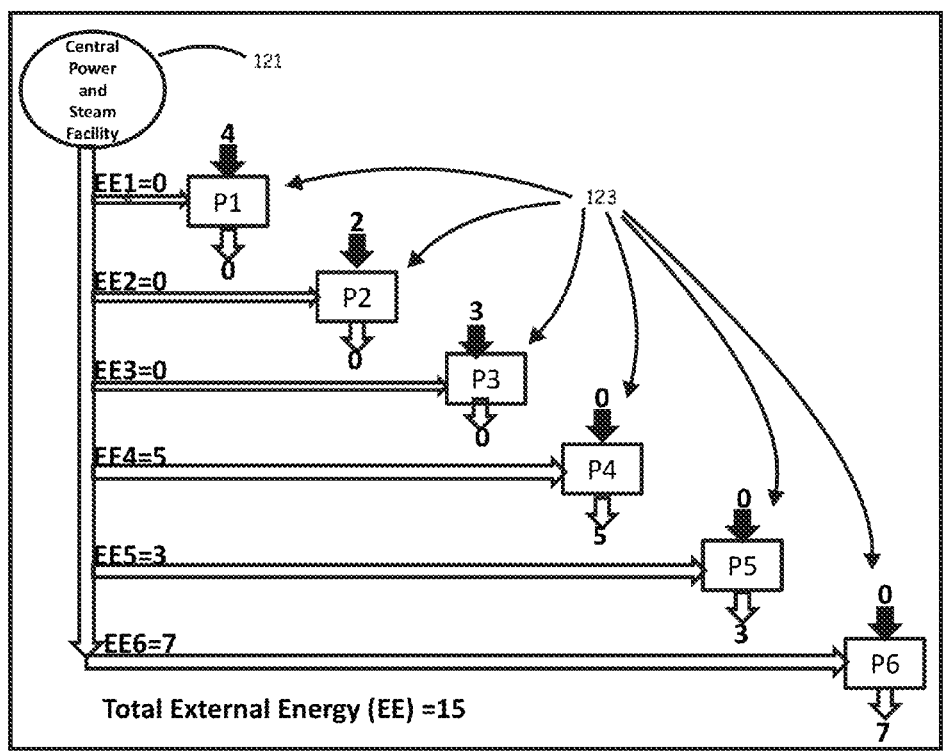
FIG. 22 is a graphical illustration of a conventional method of obtaining low-pressure steam.
Figure 23:
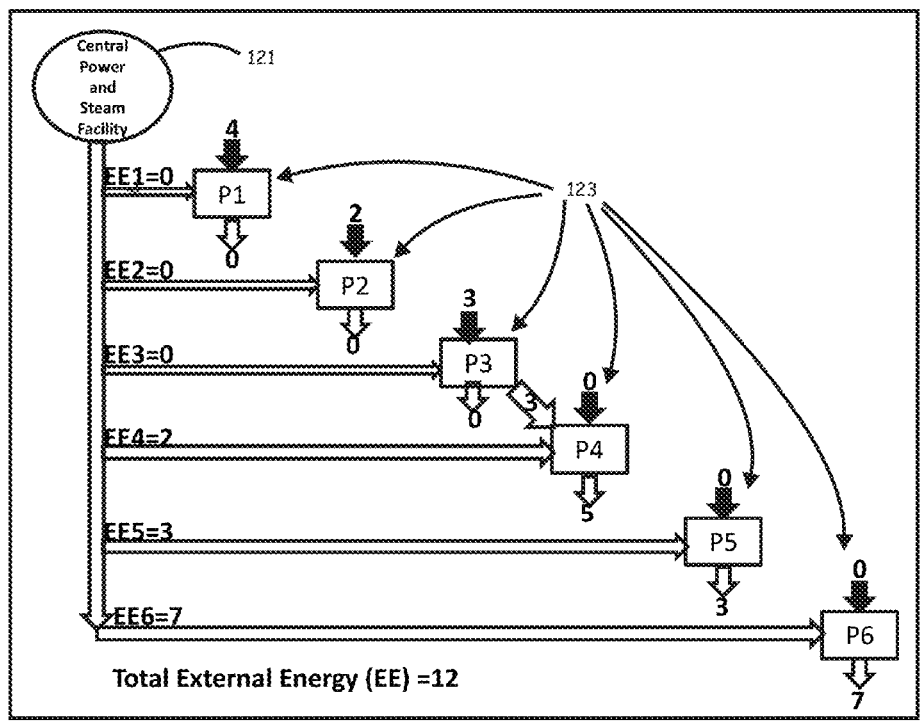
FIG. 23 is a graphical illustration of a conventional method of obtaining low-pressure steam.
Figure 24:
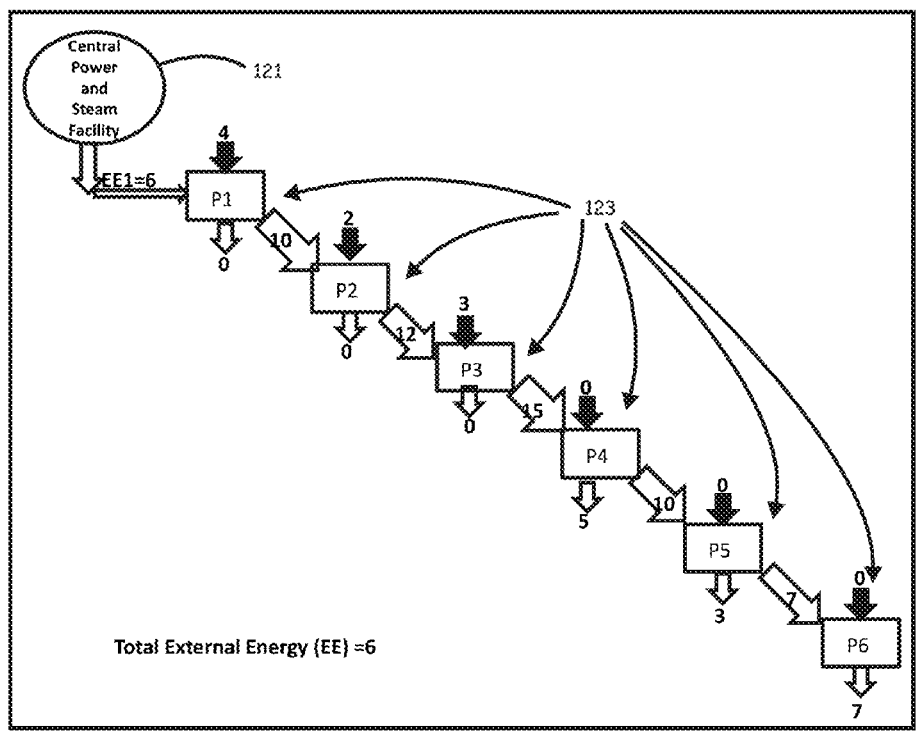
FIG. 24 is a graphical illustration of the domino effect low-pressure steam sharing for results comparison with FIGS. 22 and 23, according to an embodiment of the present invention.

FIG. 22 graphically illustrates a no sharing solution example indicating a requirement of 15 units of external energy from the central power and steam facility 121. FIG. 23 graphically illustrates a next-door only based sharing solution example utilizing the steam supply and demand value scenario of FIG. 21. Although requiring less external energy, the next-door only-based sharing solution still required a total external energy of 12 units. FIG. 24 graphically illustrates a "domino effect" low-pressure steam sharing solution example utilizing the steam supply and demand value scenario of FIGS. 22 and 23. Notably, in this exemplary scenario, the "domino effect" solution requires only 40% of that of the convention no-steam sharing solution, and only 50% of that of the conventional "next-door only" based sharing solution.

Multi-Levels-Multiple Facilities Steam Targeting Module/Method:

This calculation provides multi-level multi-facilities global minimum steam supply and demand targeting under uncertainties for multiple plants for the entire eco-industrial park. This calculation is complementary to the Domino-Effect calculation for low pressure steam integration. The below described calculations can be accomplished via adding steam supply and steam demand of all plants at each level and then executing the cascade calculations described, for example, in U.S. patent application Ser. No. 12/480,415, titled "System, Program Product, and Related Methods for Global Targeting of Process Utilities Under Varying Conditions," using real numbers or intervals. This procedure beneficially enables the user to decide on/select the best allocation of plants in the planning of new eco-industrial parks. The multi-levels multi-facilities steam targeting module/method, described with respect to FIGS. 25-27, can include the following steps:

| Step 1 | Extract all the heating and cooling tasks in the whole eco-industrial park activities and calculate required steam supply and demand levels and loads for all plants. |
| Step 2 | Establish a supply (s)-demand (d)-cascade from steam supply and demand loads at each steam level. |
| Step 3 | Use step # 2 to: (a) Calculate "S" supply and "D" demand at each steam level (HPS, MPS, and LPS) for the whole of the eco-industrial park via cascading supply "s" and demand "d" in space/plant number; (b) Define plants' arrangements which minimize steam transportation; and (c) Identify the amount of steam to be transferred from one plant to another to achieve global minimum steam demand before steam letdowns. |
| Step 4 | Use step # 2 to calculate global minimum steam supply/generation and waste for the whole of the eco-industrial parks industrial and non-industrial activities. |

Figure 25:
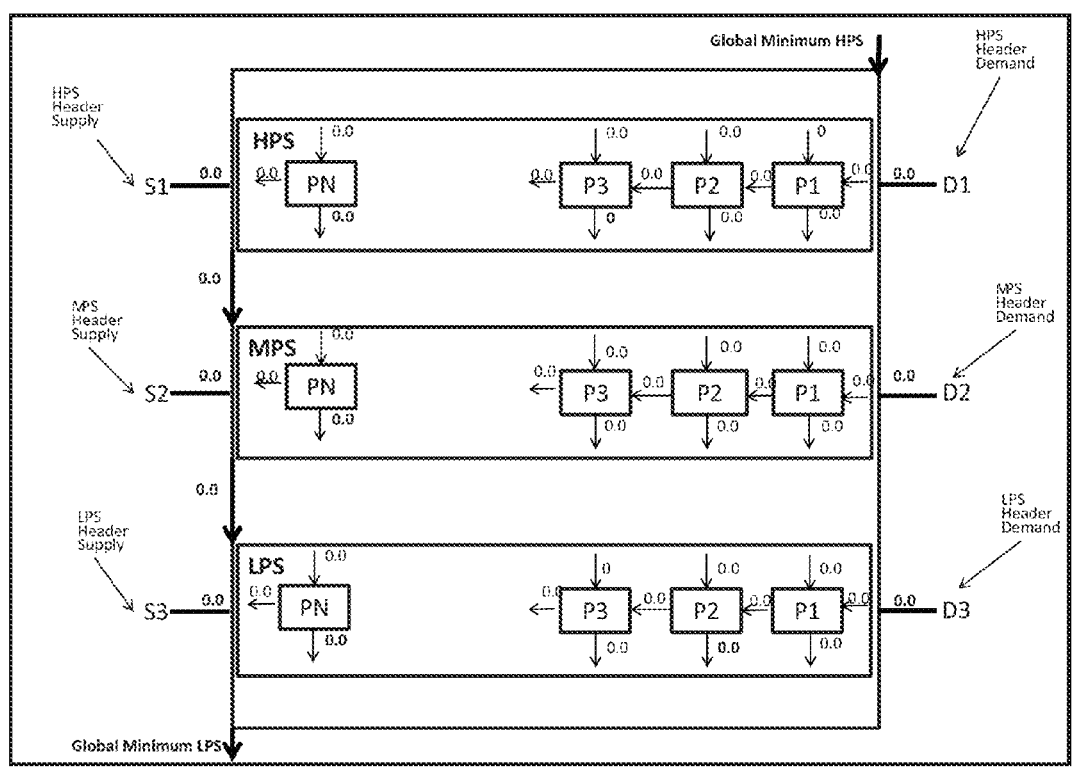
FIG. 25 is a graphical illustration of a model used for formulating a sharing scenario of multi-levels multiple facilities steam targeting according to an embodiment of the present invention.

FIG. 25 provides a graphical illustration of a model for visualizing the calculation of the global minimum steam supply and demand for an eco-industrial park.

In Step 1 includes extracting all significant heating and cooling tasks in the entirety of the eco-industrial park activities and calculating required steam supply and demand levels and loads for all plants. The following table, Table 2, illustrates data for a four-plant example, as follows:

TABLE 2

| Plant/Steam Level | Generation ($10^4$ Lb/h) | Demand ($10^4$ Lb/h) |
|---|---|---|
| P1 | | |
| HPS | 1 | 2 |
| MPS | 3 | 0 |
| LPS | 4 | 0 |
| P2 | | |
| HPS | 3 | 1 |
| MPS | 0 | 5 |
| LPS | 0 | 3 |
| P3 | | |
| HPS | 1 | 4 |
| MPS | 1 | 0 |
| LPS | 2 | 0 |
| P4 | | |
| HPS | 1 | 6 |
| MPS | 0 | 3 |
| LPS | 1 | 0 |

The table lists data for a sharing and non-sharing scenario of multi-levels multiple facilities steam targeting. The scenario includes three steam headers (HPS, MPS, LPS) at plants "P1"-"P4" positioned in order of distance, and having the above steam generations capabilities and demand requirements as listed at each level.

Step 2 includes establishing a supply (s)-demand (d)-cascade from steam supply and demand loads at each steam level such as, for example, using the model illustrated in FIG. 25.

Step 3 includes utilizing the supply (s)-demand (d)-cascade of step #2: (a) to calculate the total header "S" supply and "D" demand at each steam level (HPS, MPS, and LPS) for the whole of the eco-industrial park problem (e.g., S1-S3, D1-D3 in this example) via cascading process-level supply "s" and demand "d" in space/plant number (e.g., P1-P4 in this example); (b) to define the plants' arrangements which minimize steam transportation; and (c) to identify the amount of steam to be transferred from one plant P1-P4 to another to achieve global minimum steam demand before steam letdowns.

Step 4 includes utilizing the supply (s)-demand (d)-cascade of step #2 to calculate the global minimum steam supply/generation and waste for the whole of the eco-industrial park's industrial and non-industrial activities.

Figure 26:
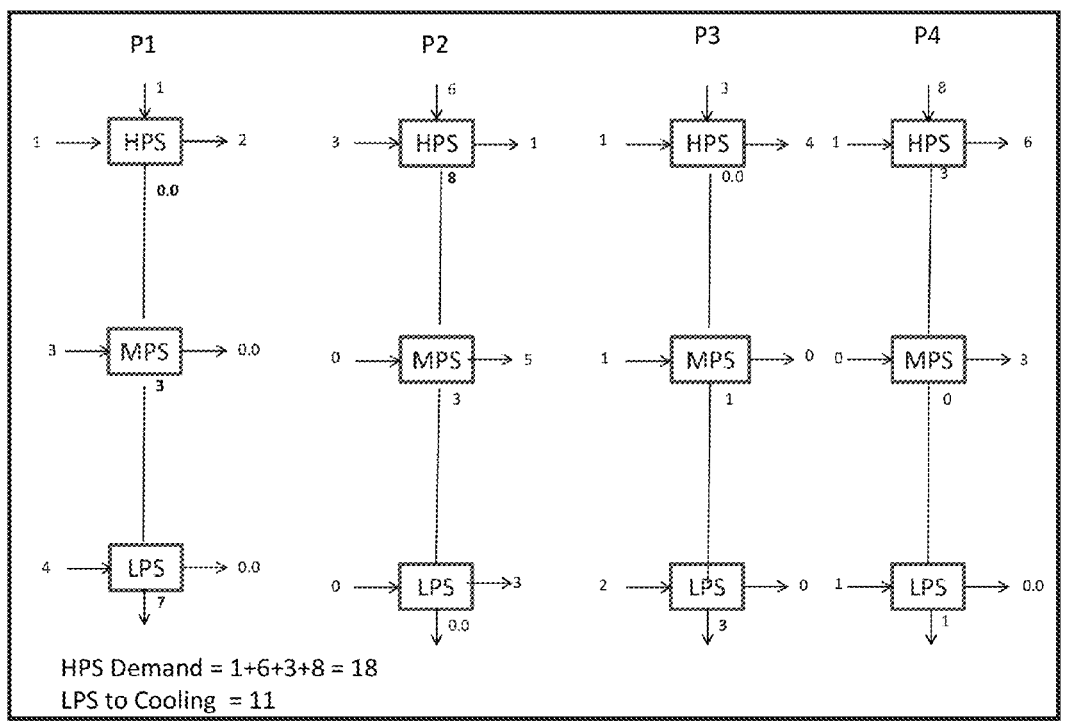
FIG. 26 is a graphical illustration of a non-sharing scenario of multi-levels multiple intra-facilities steam calculation.

FIG. 26 illustrates a non-sharing scenario of multiple steam levels-multiple intra-facilities steam calculation example using the data of Table 2. In this example, it can be seen that the steam demand on the high-pressure steam headers is 18 units and the low-pressure steam generation/waste is 11 units.

Figure 27:
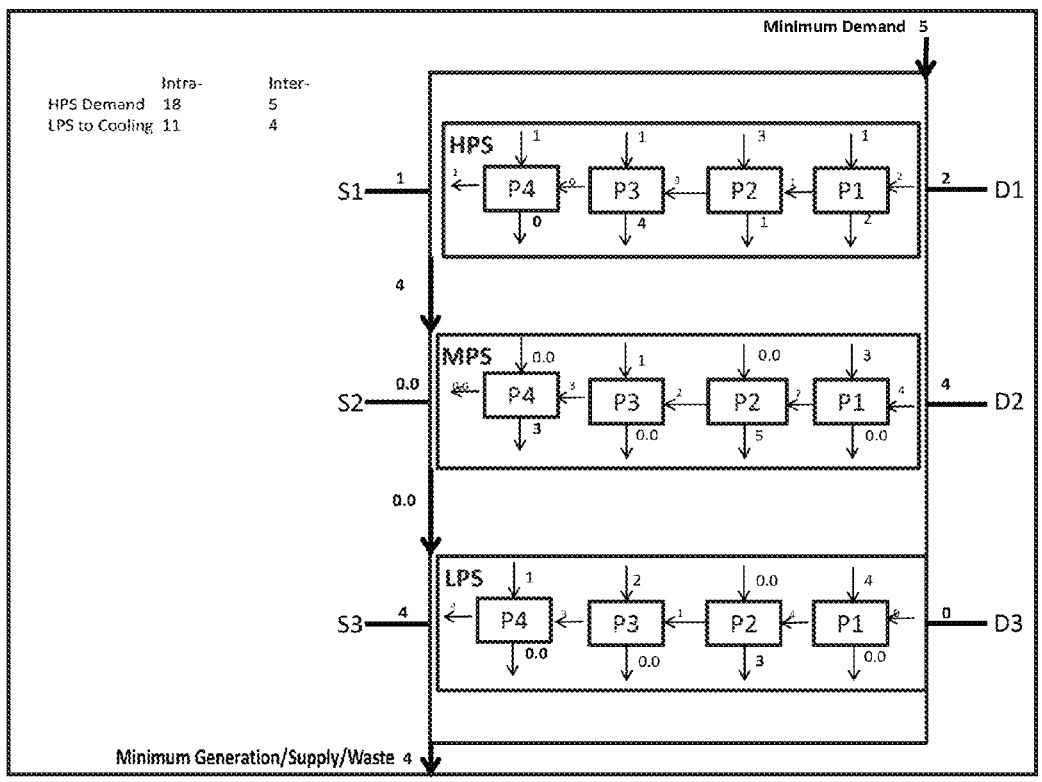
FIG. 27 is a graphical illustration of a sharing scenario of multi-levels multiple inter-facilities steam targeting calculation according to an embodiment of the present invention.

FIG. 27 illustrates a sharing scenario of multi-levels multiple inter-facilities steam targeting calculation example according to an embodiment of the invention, using the data of Table 2. In this example, it can be seen that the high-pressure steam demand is reduced to five units, and the steam generation/waste is reduced to four units.

Eco-Industrial Park Energy Targeting:

FIGS. 28-51 provide a detailed example of eco-industrial park energy targeting according to one or more embodiments of the invention. FIG. 28 illustrates an example of a data table 129 including the task type, stream identification and its initial identity, starting temperature, target temperature, heat capacity flowrate, duration, schedule, and heat capacity. This data can be inputted separately or through an automated process to populate values in a energy consumption calculation webpage/webpage form 130 (see, e.g., FIG. 29) for calculating the global minimum energy consumption.

Figure 29:
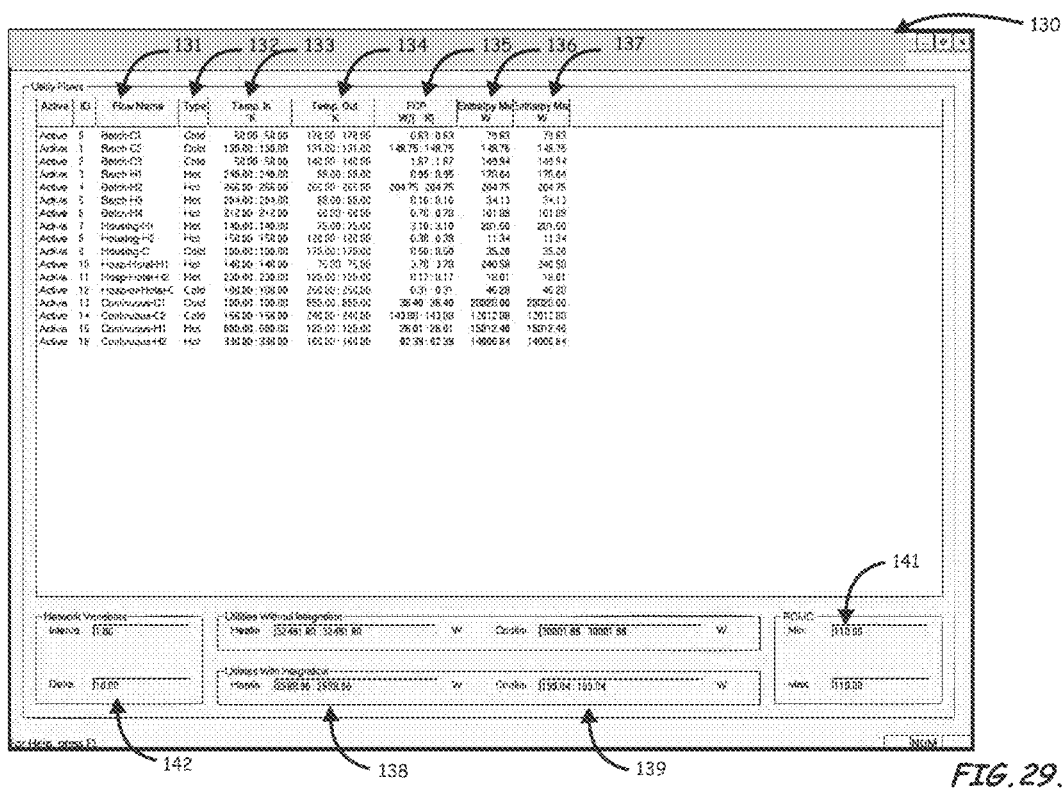
FIG. 29 is a graphical illustration of an energy consumption and pinch location calculation webpage form according to an embodiment of the present invention.

The energy consumption calculation webpage form 130 shown in FIG. 29 includes a list of streams 131, their type 132, their starting temperature interval values 133, their target temperature interval values 134, their heat capacity flow rate interval 135, and their minimum and maximum entropy values 136, 137, the global minimum cooling and heating utilities requirements 138, 139, the pinch location/interval 141, and a global $\Delta T\_min$ 142 and its marching interval.

Figure 30:
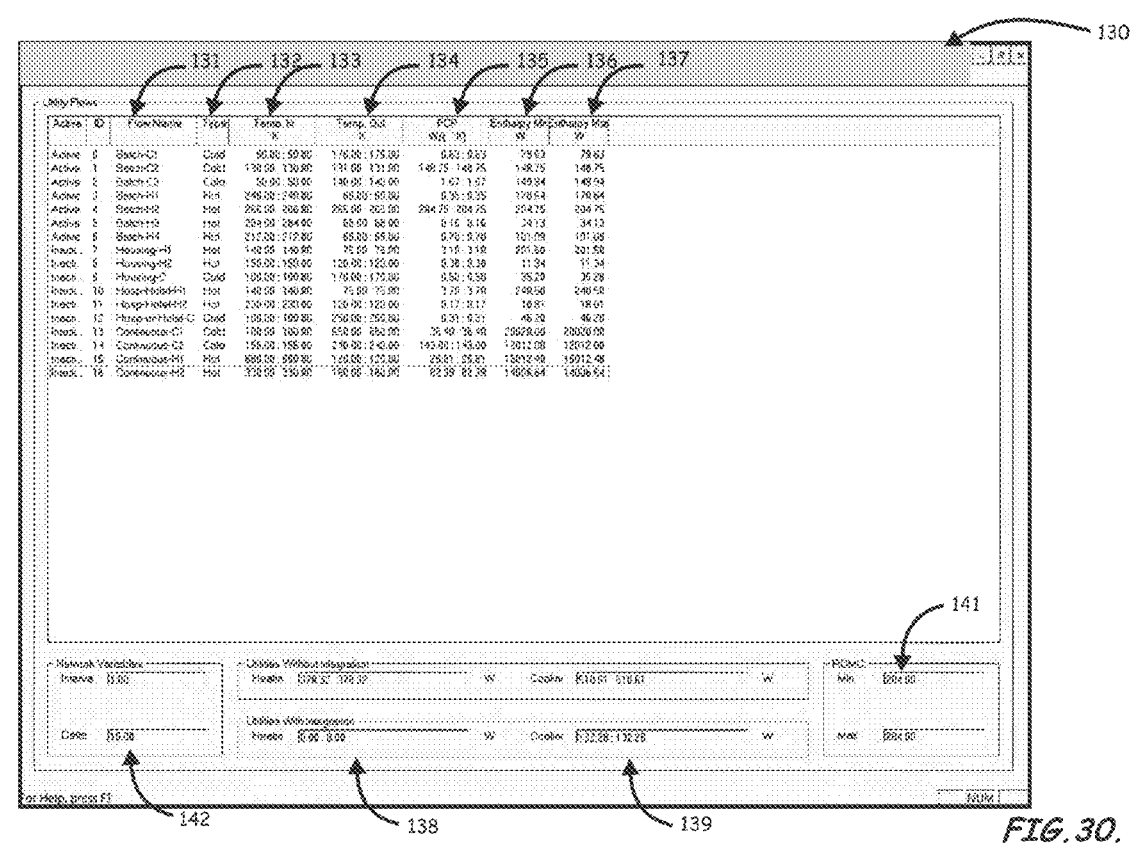
Figure 31:
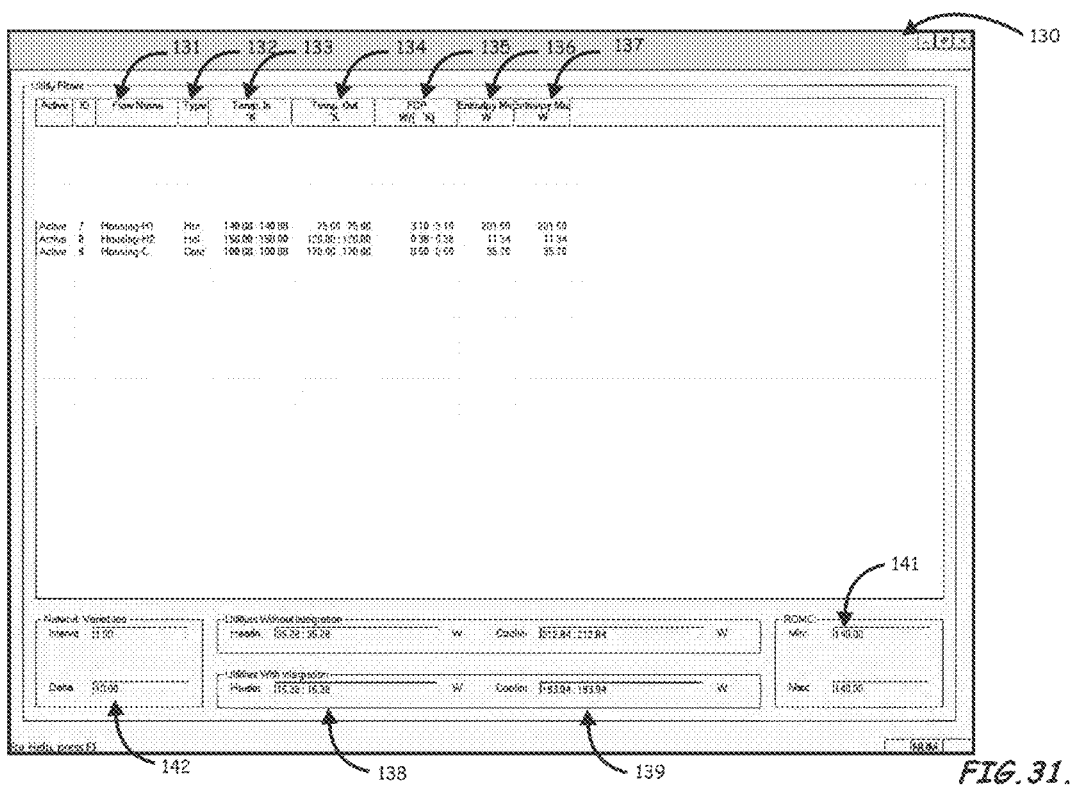
FIG. 31 is a graphical illustration of an energy consumption and pinch location calculation webpage form restricted to standalone housing compound energy targeting calculations according to an embodiment of the present invention.
Figure 32:
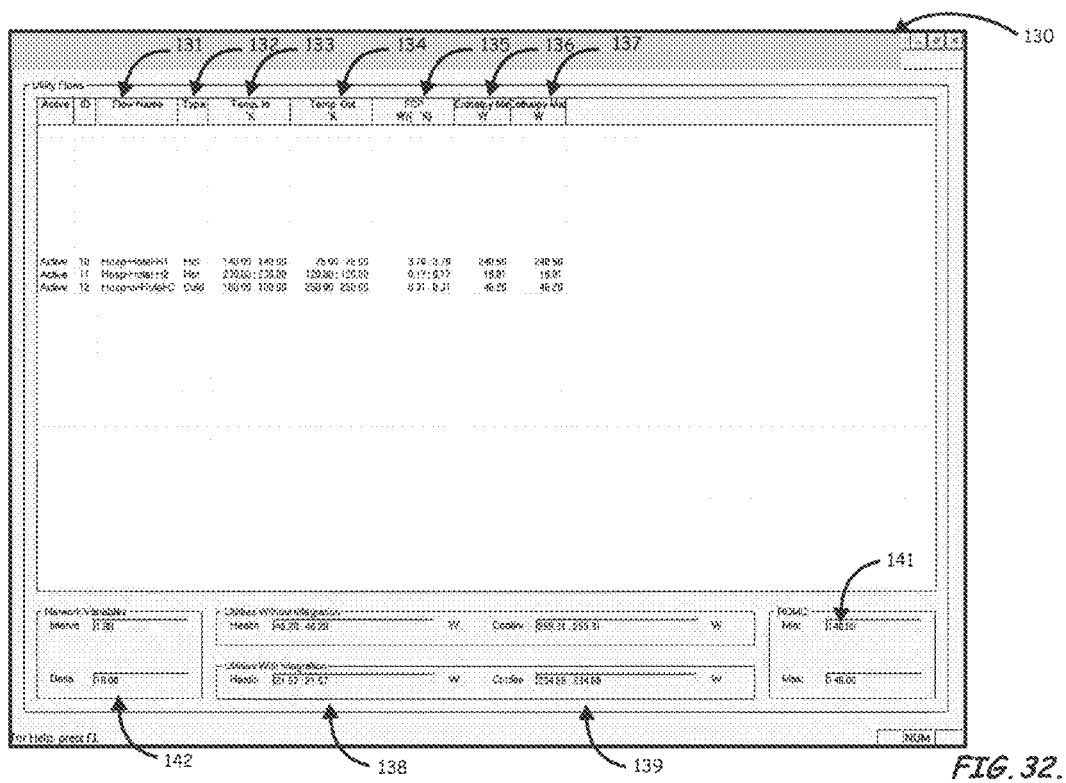
FIG. 32 is a graphical illustration of an energy consumption and pinch location calculation webpage form restricted to standalone hospital compound energy targeting calculations according to an embodiment of the present invention.
Figure 33:
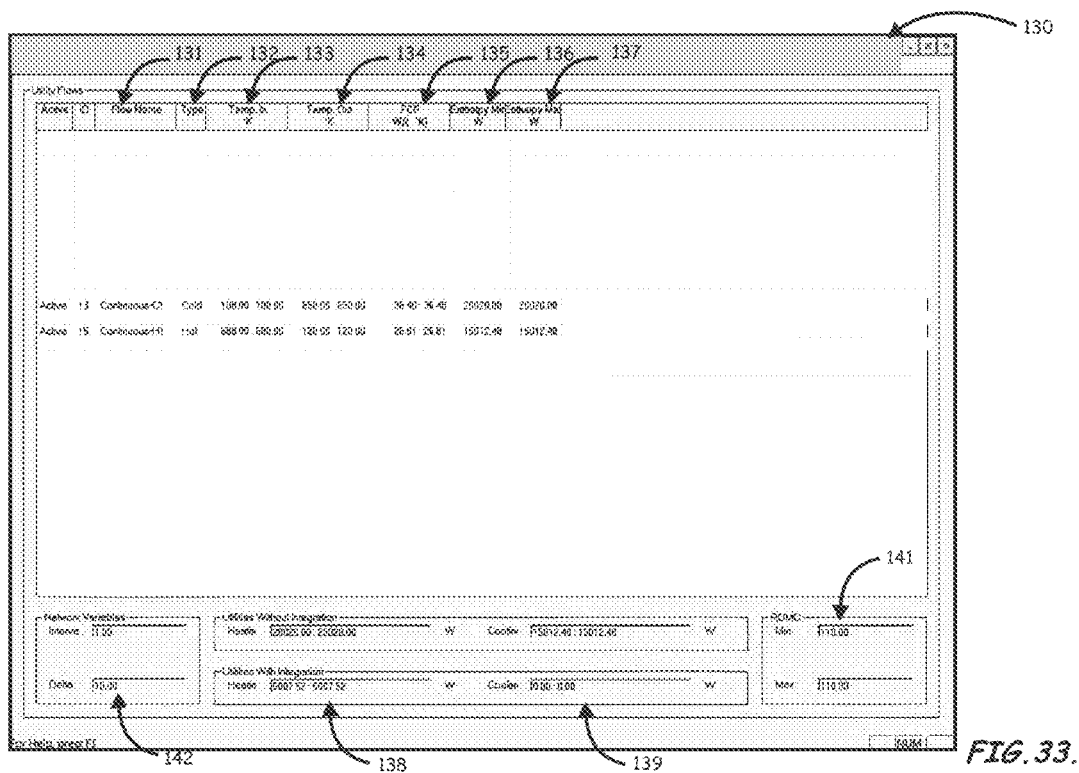
FIG. 33 is a graphical illustration of an energy consumption and pinch location calculation webpage form restricted to standalone chemical process I (continuous) energy targeting calculations according to an embodiment of the present invention.
Figure 34:
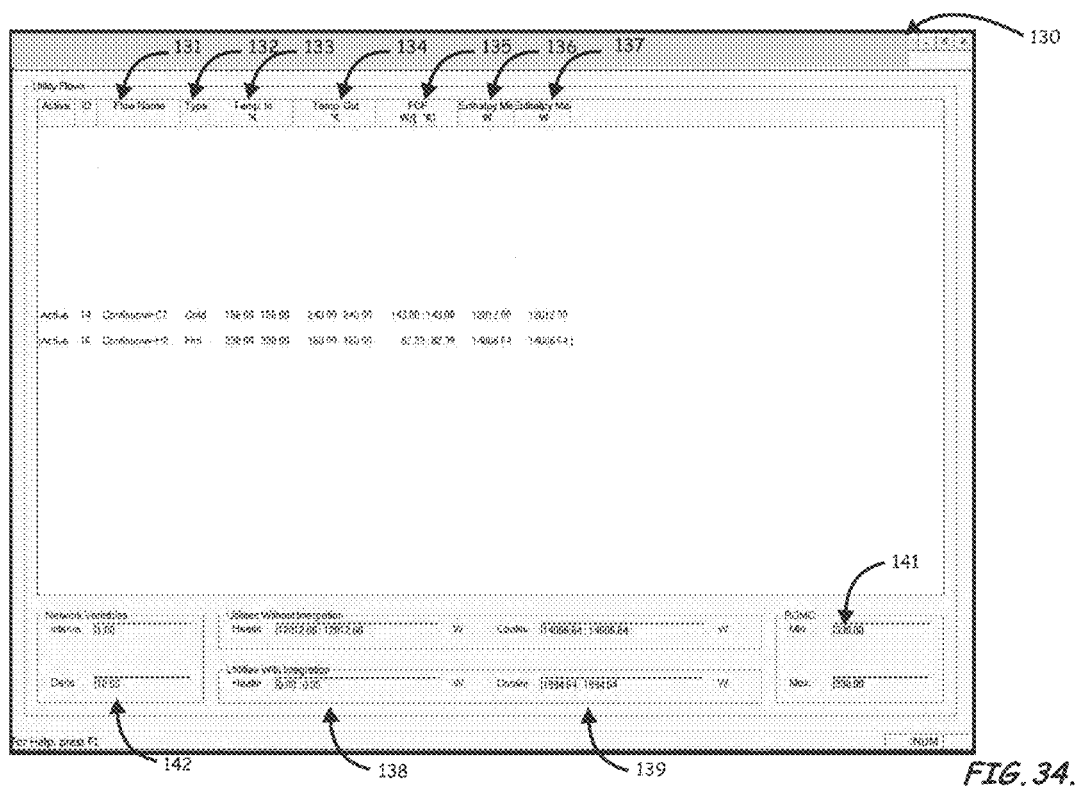
FIG. 34 is a graphical illustration of an energy consumption and pinch location calculation webpage form restricted to standalone chemical process II (continuous) energy targeting calculations according to an embodiment of the present invention.
Figure 35:
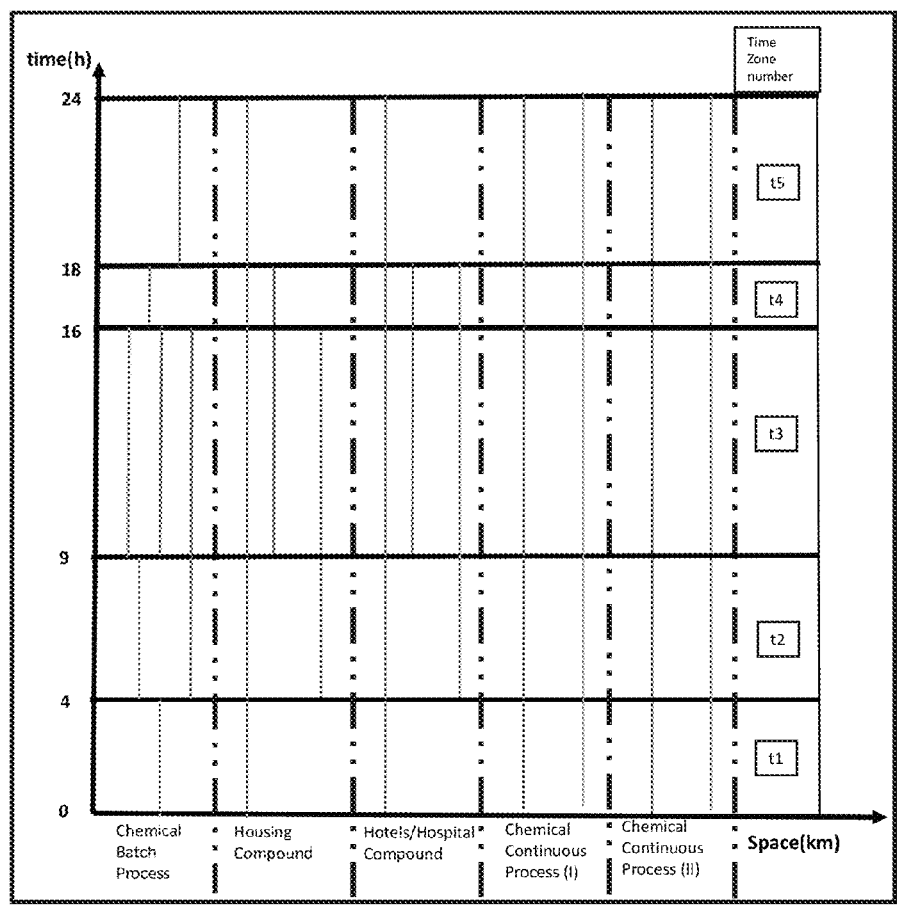
FIG. 35 is a graphical illustration of a time interval graph for an eco-industrial park time space zones example according to an embodiment of the present invention.

FIG. 30 provides a graphical illustration of the energy consumption calculation webpage form 130 restricted to provide stand-alone batch plant energy targeting calculations such as, for example, minimum cooling and heating utilities and pinch location/interval values. FIG. 31 provides a graphical illustration of the energy consumption calculation webpage form 130 restricted to provide stand-alone housing compound energy targeting calculations. FIG. 32 provides a graphical illustration of the energy consumption calculation webpage form 130 restricted to provide stand-alone hospital compound energy targeting calculations. FIG. 33 provides a graphical illustration of the energy consumption calculation webpage form 130 restricted to provide stand-alone chemical process I, continuous, energy targeting calculations. FIG. 34 provides a graphical illustration of the energy consumption calculation webpage form 130 restricted to provide stand-alone chemical process II, continuous, energy targeting calculations. FIG. 35 provides a time interval graph of the data provided in data table 129 (FIG. 28) used for graphically identifying streams in both time and space for inter-time-zones energy integration. FIG. 36 provides another example of a data table 149 having the stream name pre-organized to reflect stream type and associated time zone. FIG. 37 provides an example of time zones stream data mapping of the data provided in data table 149 (FIG. 36).

Figure 38:
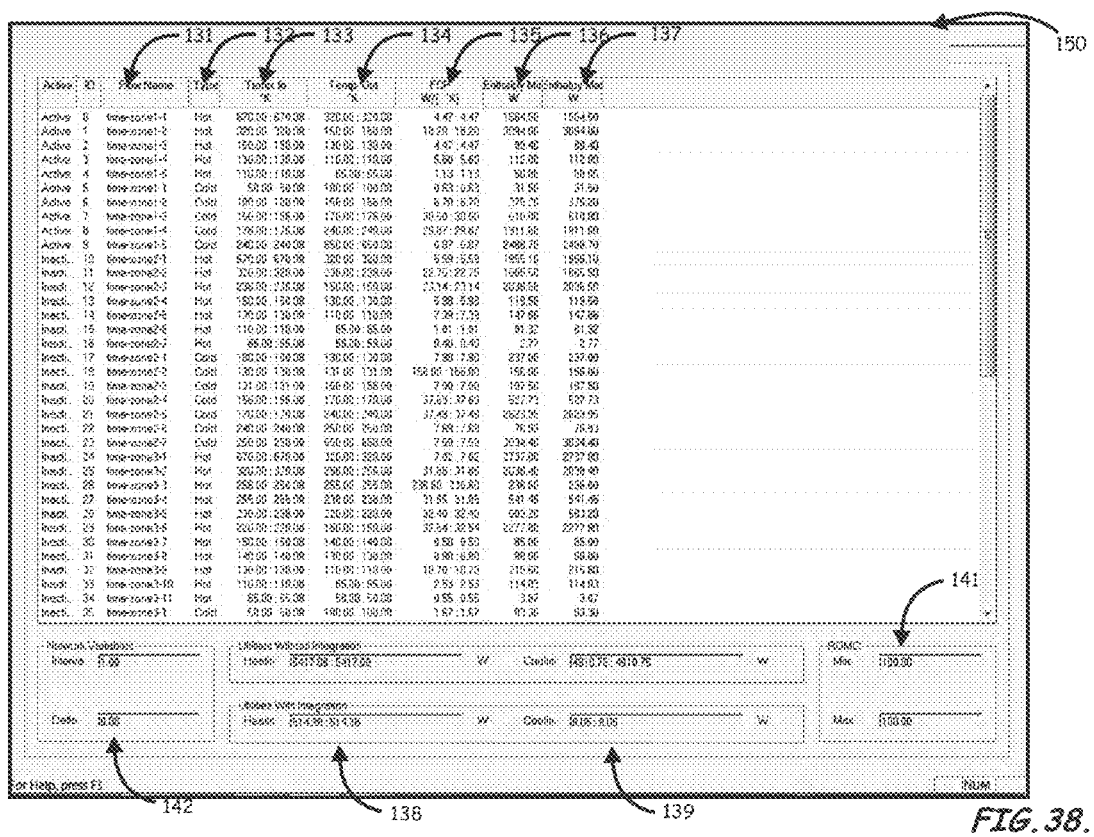
FIG. 38 is a graphical illustration of an energy consumption calculation webpage form illustrating eco-industrial park intra-time zone energy targeting (Zone 1) according to an embodiment of the present invention.
Figure 39:
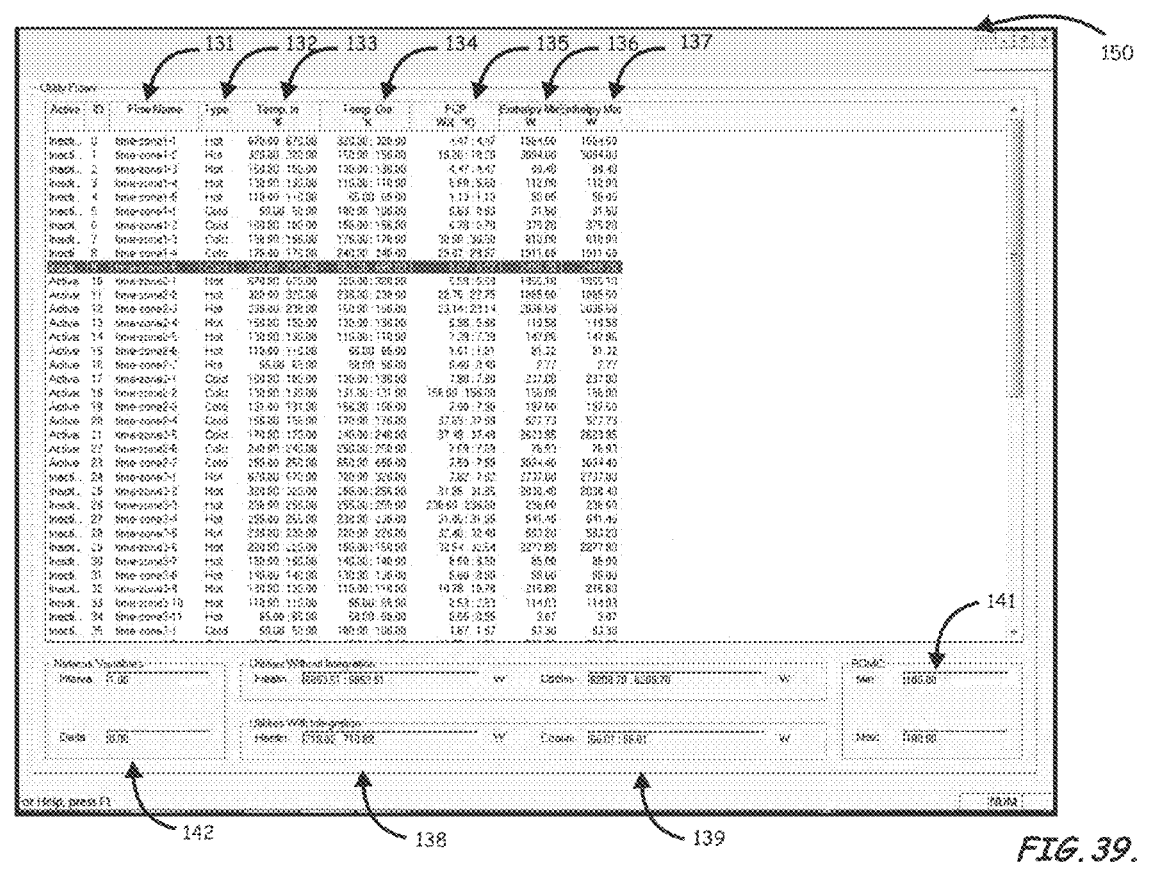
Figure 40:
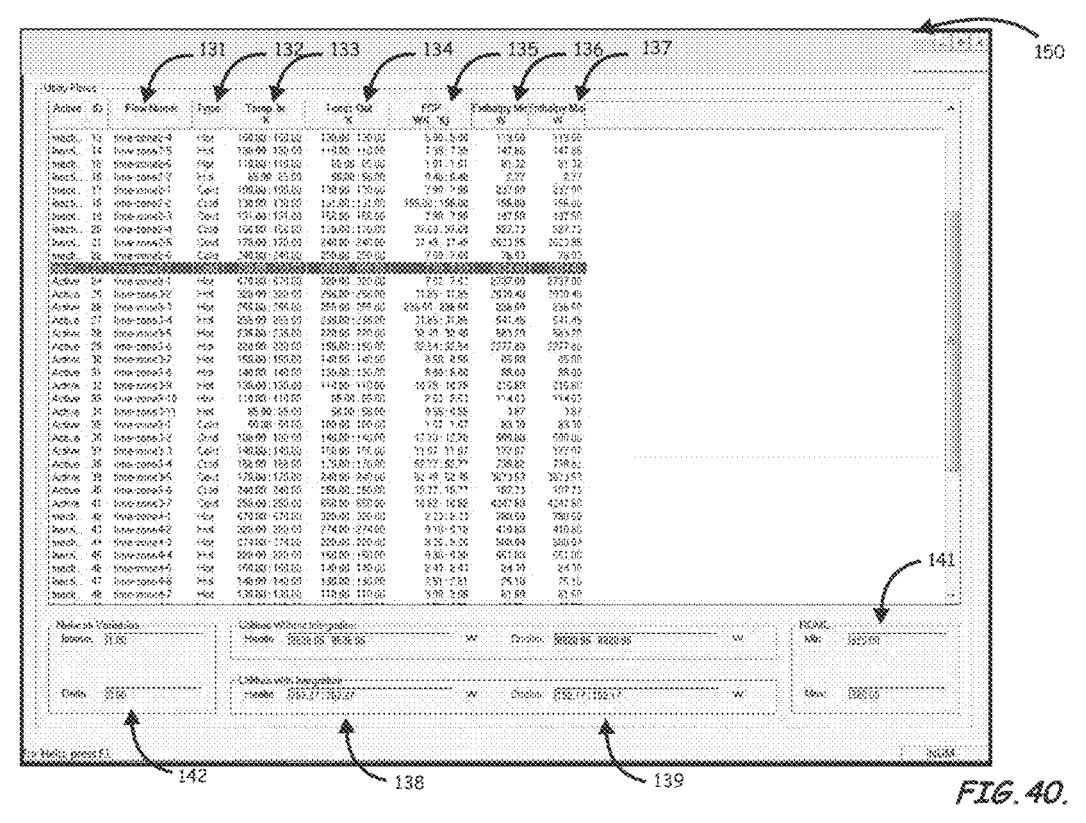
Figure 41:
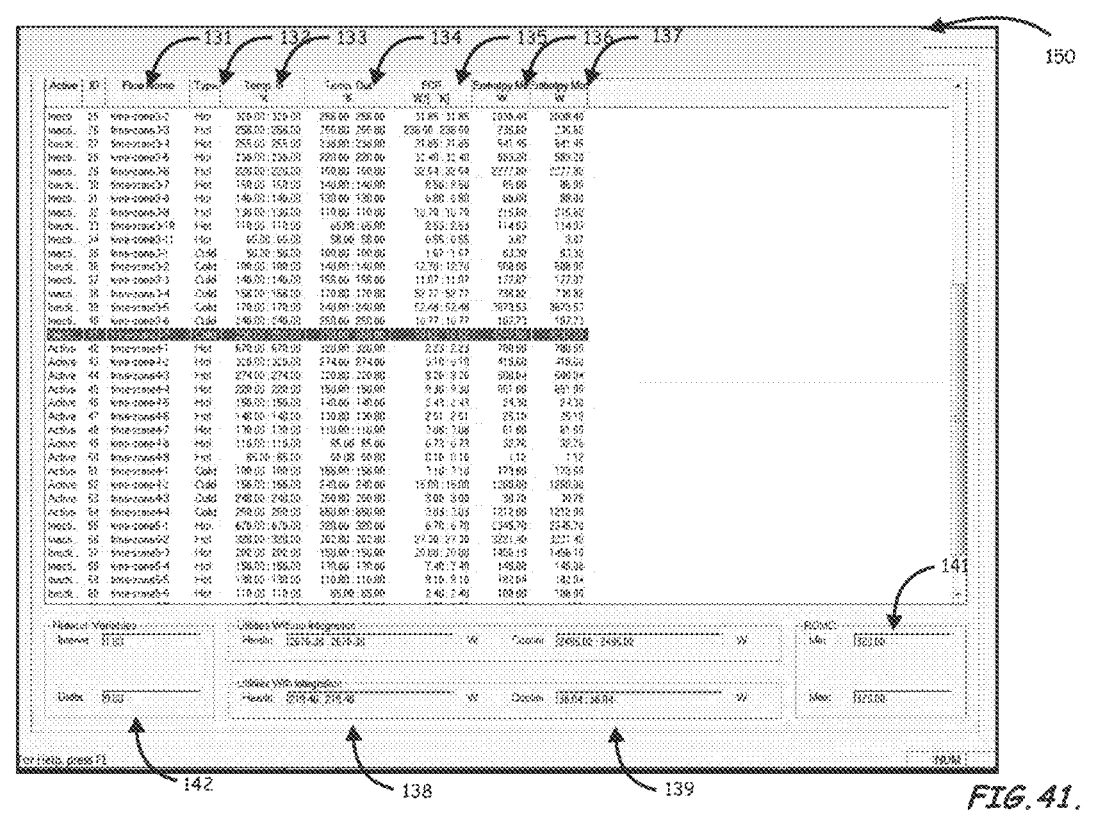
Figure 42:
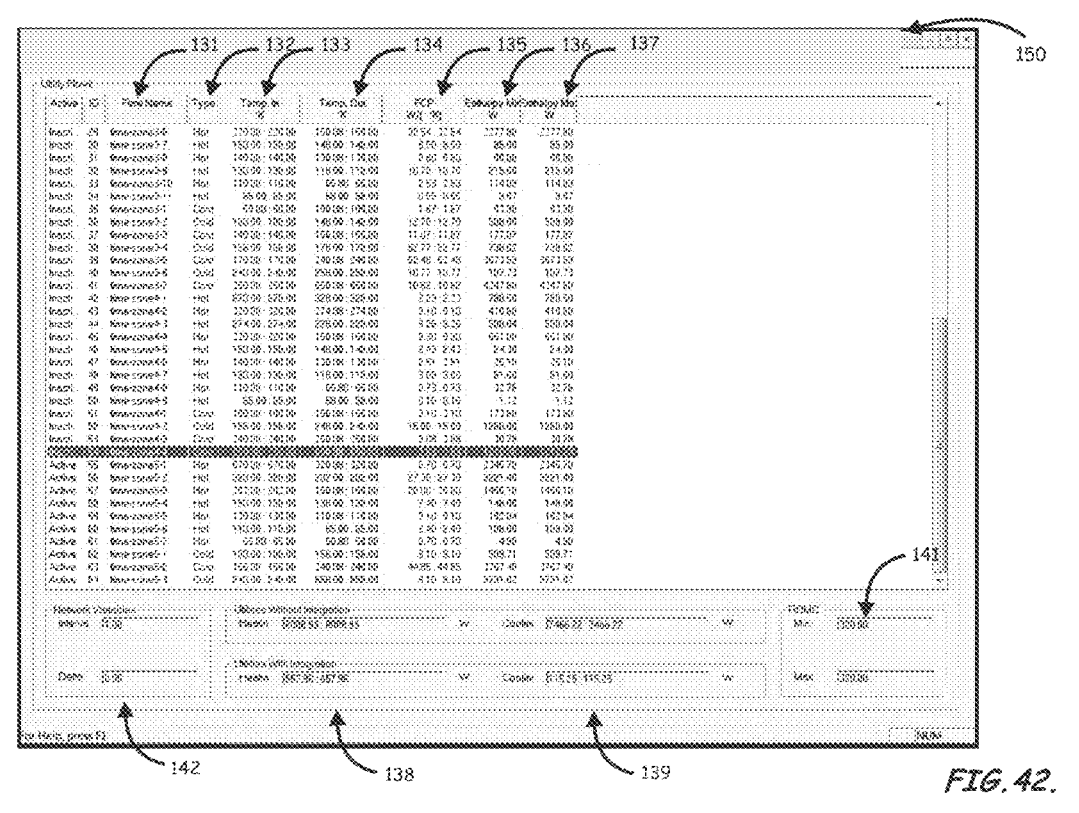
Figure 43:
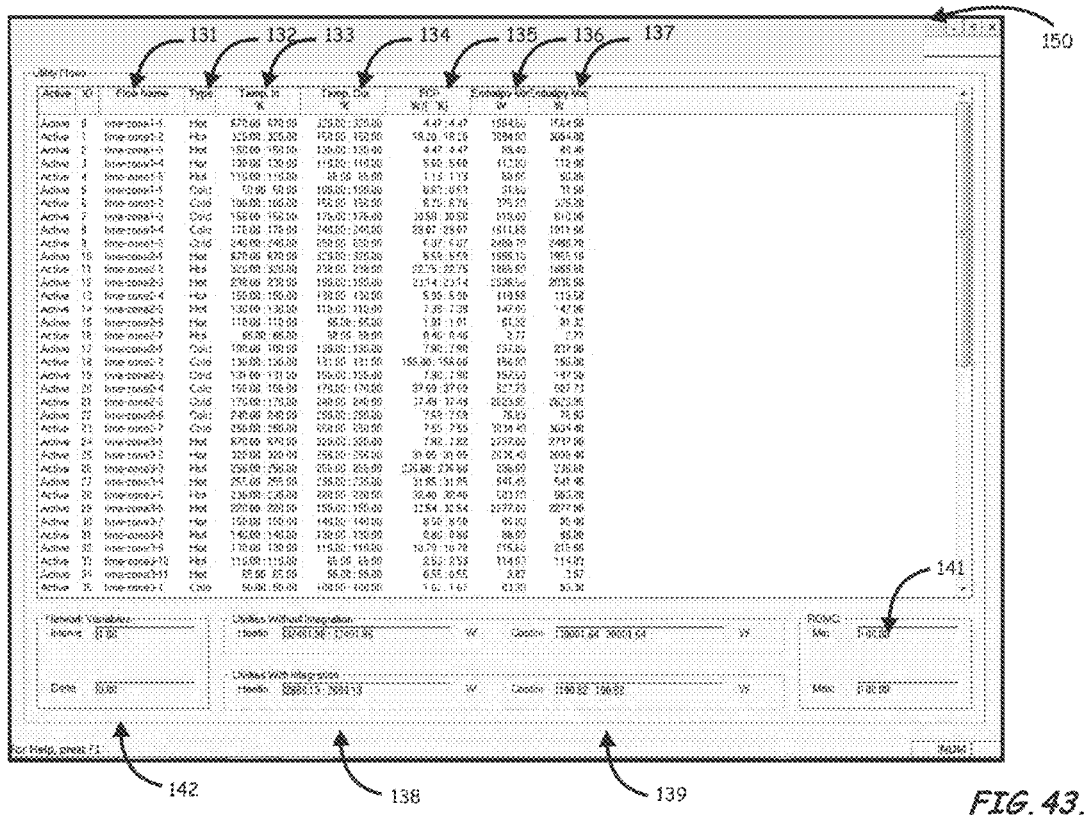
FIG. 43 is a graphical illustration of an energy consumption calculation webpage form illustrating eco-industrial park inter-time zones targeting calculations according to an embodiment of the present invention.

FIG. 38 provides an example of an energy consumption calculation webpage form 150 illustrating intra-time zone energy targeting for space zone 1. FIG. 39 provides an example of the energy consumption calculation webpage form 150 illustrating intra-time zone energy targeting for space zone 2. FIG. 40 provides an example of the energy consumption calculation webpage form 150 illustrating intra-time zone energy targeting for space zone 3. FIG. 41 provides an example of the energy consumption calculation webpage form 150 illustrating intra-time zone energy targeting for space zone 4. FIG. 42 provides an example of the energy consumption calculation webpage form 150 illustrating intra-time zone energy targeting for space zone 5. FIG. 43 provides an example of the energy consumption calculation webpage form 150 illustrating inter-time zone energy targeting.

FIGS. 44-51 provide an example of an inter-area, inter-time targeting webpage form 160, which provides for the calculation of best and next best coupling between two or more zones in one or more groups. The webpage form 160 includes an input field 161 allowing input of the number of groupings of zones (number of tuples) and the number of zones to be matched (tuple cardinality). The webpage form 160 also includes input fields such as, for example, buttons 162-165 which allow for selecting an automated solvent of the problem, button 162, the provision of the next best solution, button 163, a reset, button 164, and a pinch zone identification, button 165. The webpage form 160 also includes output fields including an output field 167 which outputs an identification of the best or next best matched zones and one or more groups, and output field 168 which outputs an energy consumption objective, or alternatively, an energy savings objective.

Figure 44:
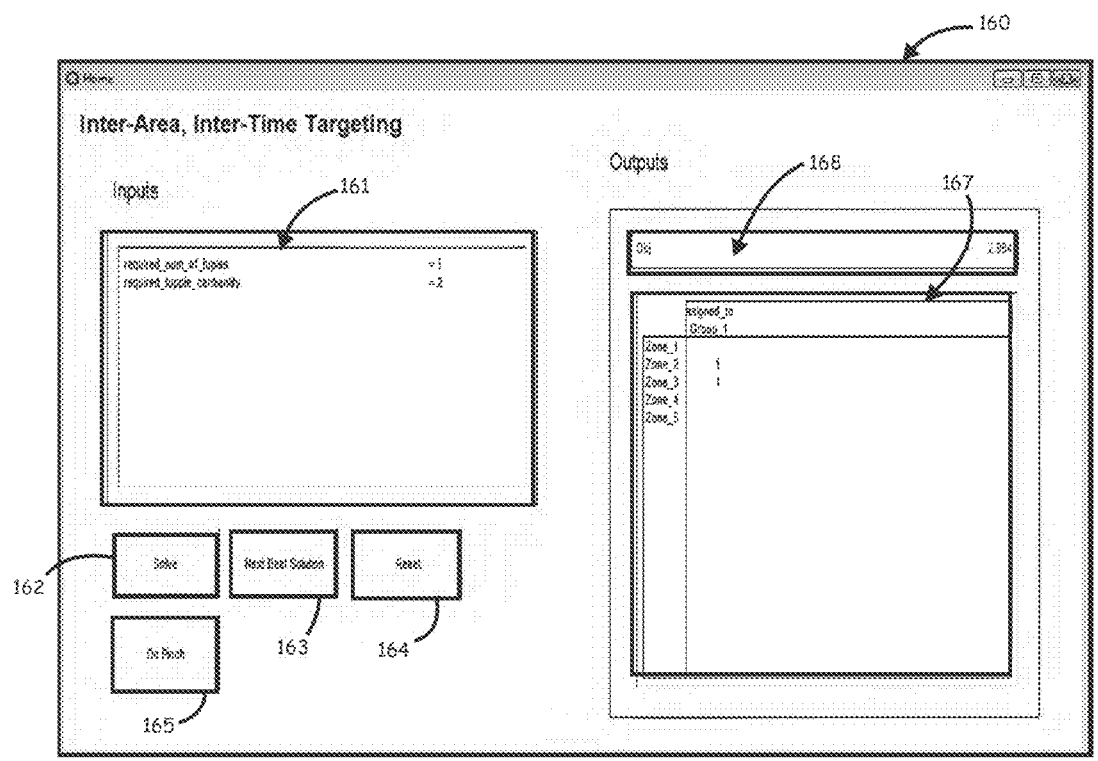
FIG. 44 is a graphical illustration of an eco-industrial park best coupling between two time zones according to an embodiment of the present invention.
Figure 45:
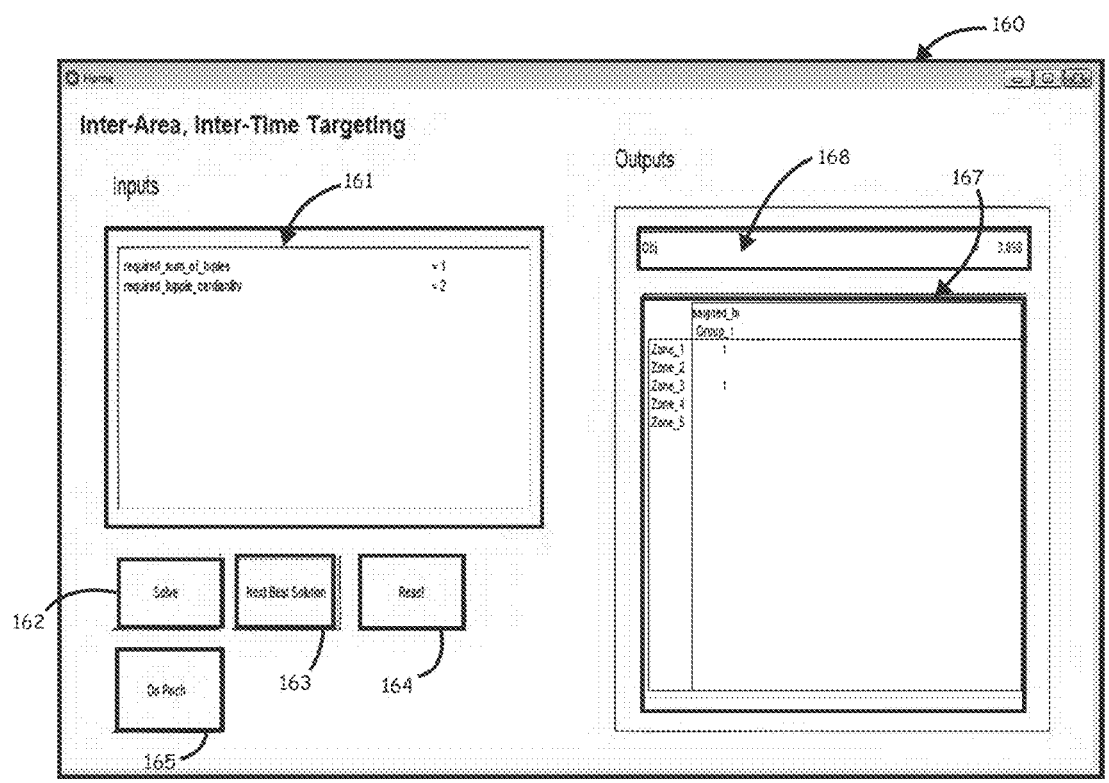
FIG. 45 is a graphical illustration of an eco-industrial park second best coupling between two time zones according to an embodiment of the present invention.
Figure 46:
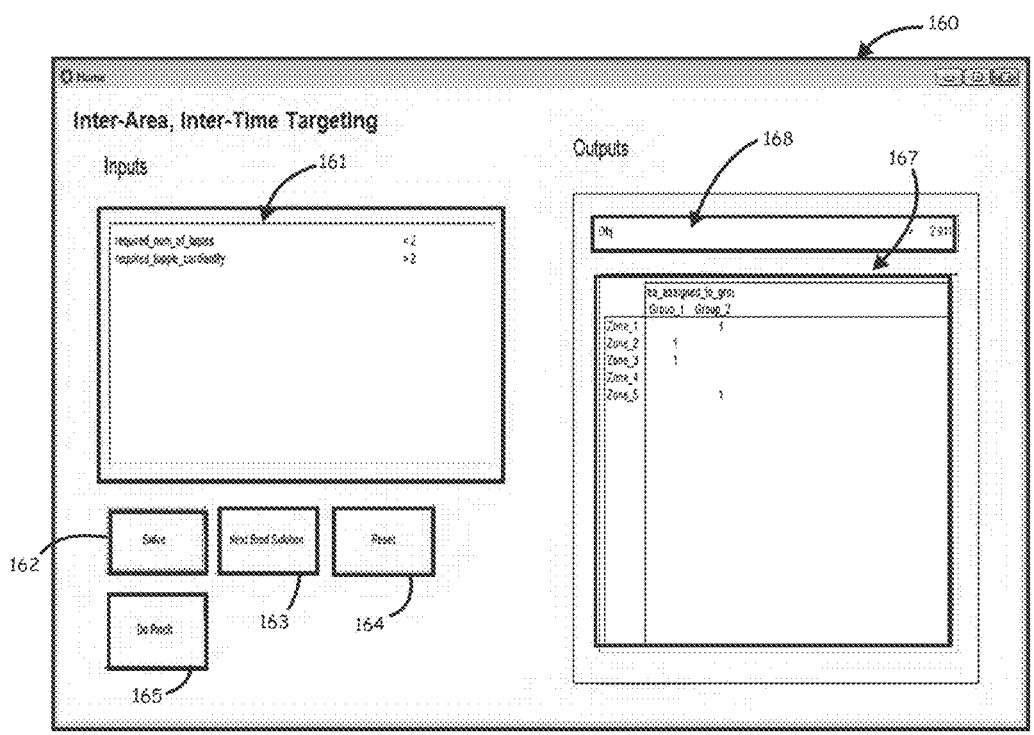
FIG. 46 is a graphical illustration of an eco-industrial park best two couplings between two time zones according to an embodiment of the present invention.
Figure 47:
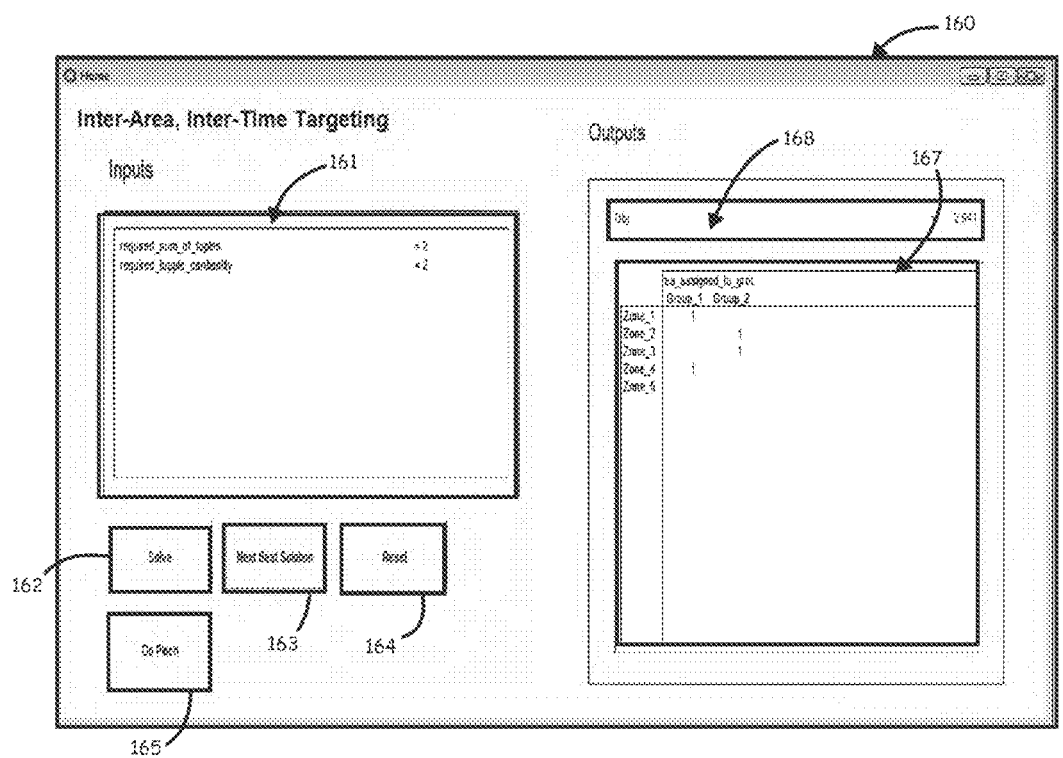
FIG. 47 is a graphical illustration of an eco-industrial park second best two couplings between two time zones according to an embodiment of the present invention.
Figure 48:
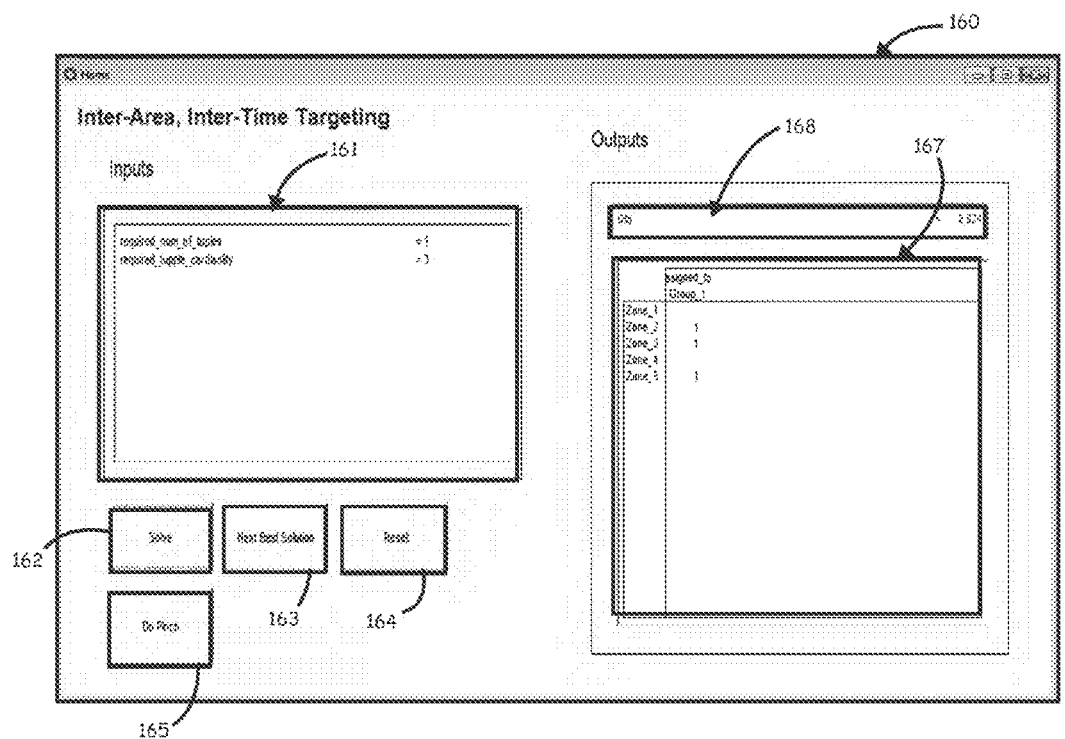
FIG. 48 is a graphical illustration of an eco-industrial park best integration between three time zones according to an embodiment of the present invention.
Figure 49:
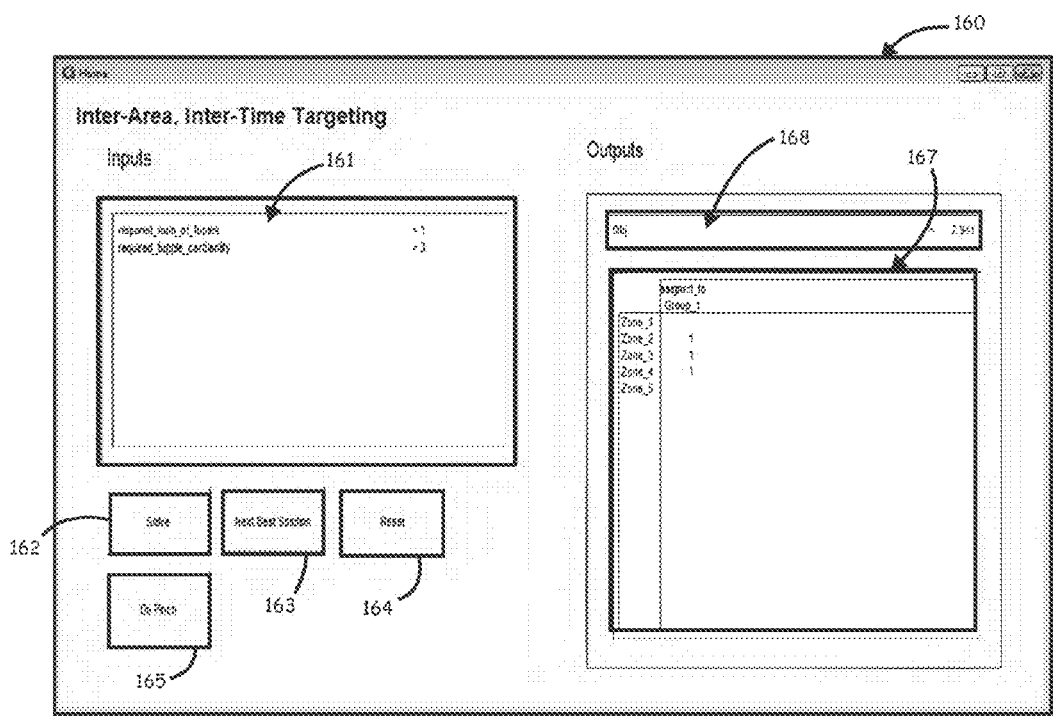
FIG. 49 is a graphical illustration of an eco-industrial park second best integration between three time zones according to an embodiment of the present invention.
Figure 50:
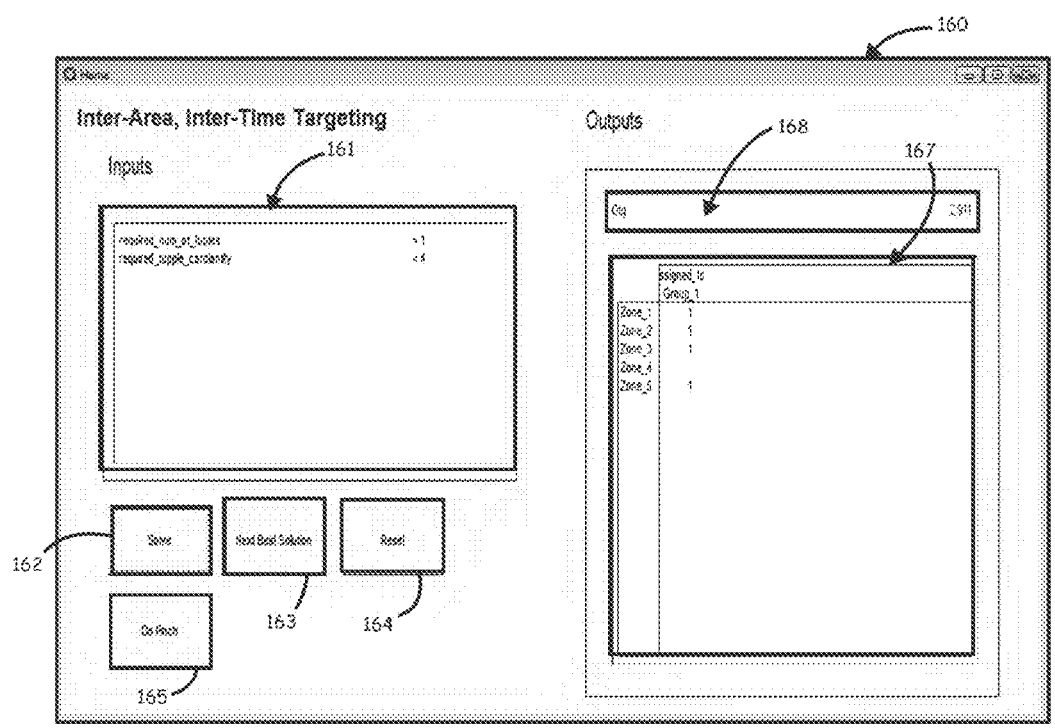
FIG. 50 is a graphical illustration of an eco-industrial park best integration between four time zones according to an embodiment of the present invention.
Figure 51:
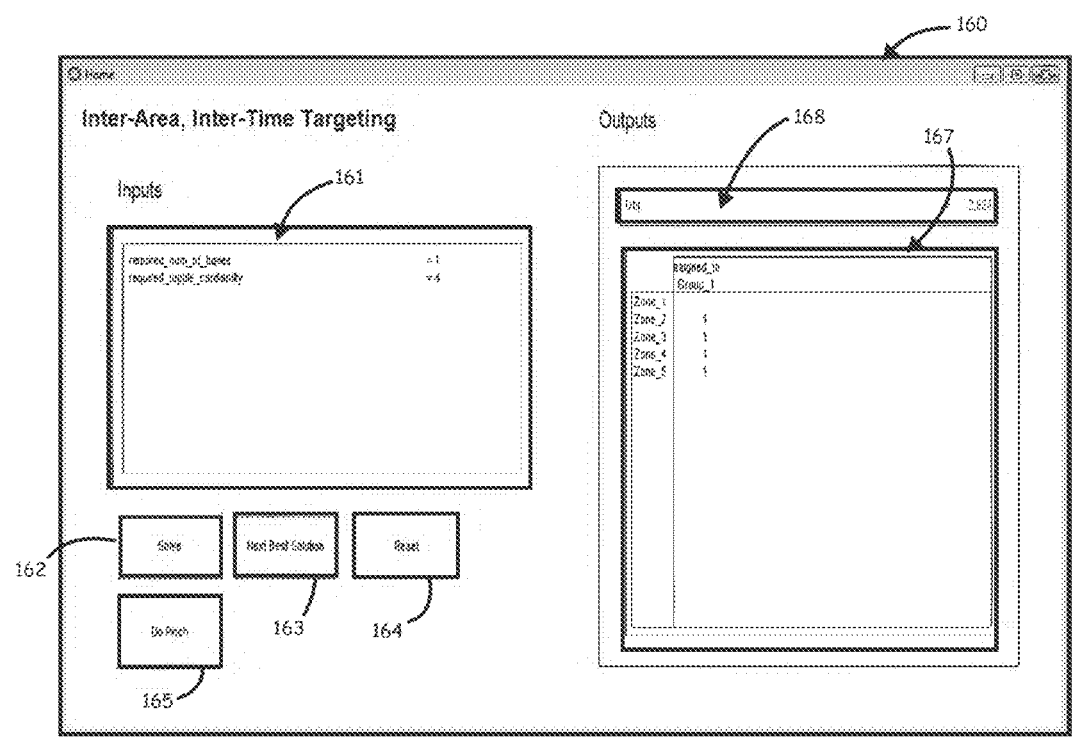
FIG. 51 is a graphical illustration of an eco-industrial park second best integration between four time zones according to an embodiment of the present invention.

Particularly, FIG. 44 illustrates a best coupling between two time zones determination identifying the zones providing the best coupling. FIG. 45 illustrates a second best coupling between two time zones determination. FIG. 46 illustrates best two couplings between two time zones. FIG. 47 illustrates second best two couplings between two time zones. FIG. 48 illustrates integration between three time zones. FIG. 49 illustrates second best integration between three time zones. FIG. 50 illustrates integration between four time zones. FIG. 51 illustrates second best integration between four time zones. One of ordinary skill in the art will recognize that there can be as many times zones as required to provide for readily matching the zones both temporally and spatially.

Eco-Industrial Park Inter-Time Zones (Temporal) Integration Solutions Finding:

FIGS. 52-62 provide a detailed description of eco-industrial park inter-time zones integration solution finding via temporal and spatial systems matching. According to an exemplary embodiment, this process can include application of the energy integration via temporal and spatial system matching module 55 to provide integration and matching options, an employment of the temperature time duty diagram (T2D2) to provide visualization to enhance finding the inter-time zones integration solution, and a temperature duty diagram (TD2) to provide visualization of spatial integration in the time zones.

Figure 52:
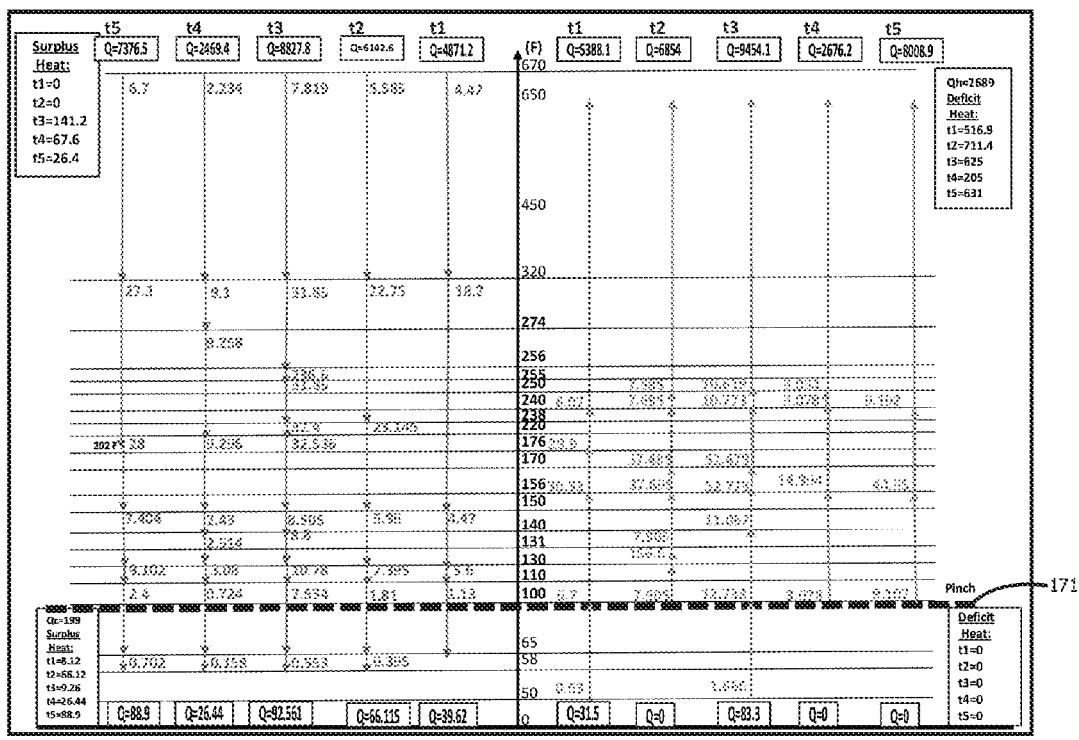
FIG. 52 is a graphical illustration of a temperature time duty diagram for inter-time zones (temporal) integration solutions finding according to an embodiment of the present invention.
Figure 53:
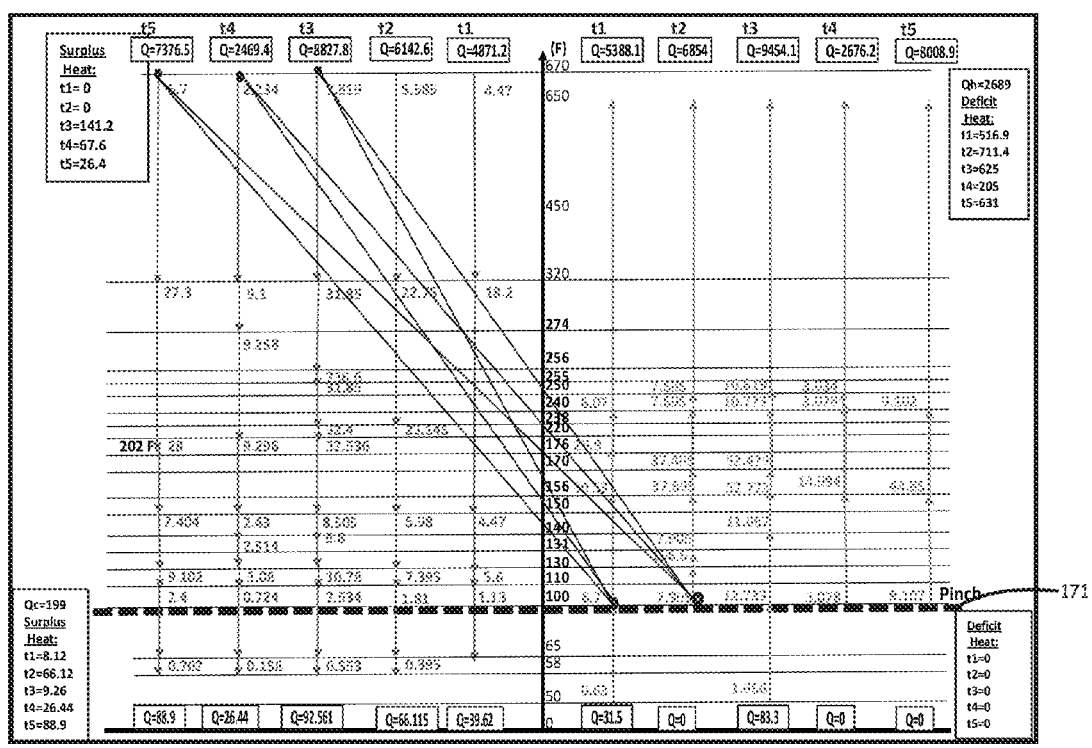
FIG. 53 is a graphical illustration of a temperature time duty diagram illustrating an option for inter-time zones matching according to an embodiment of the present invention.
Figure 54:
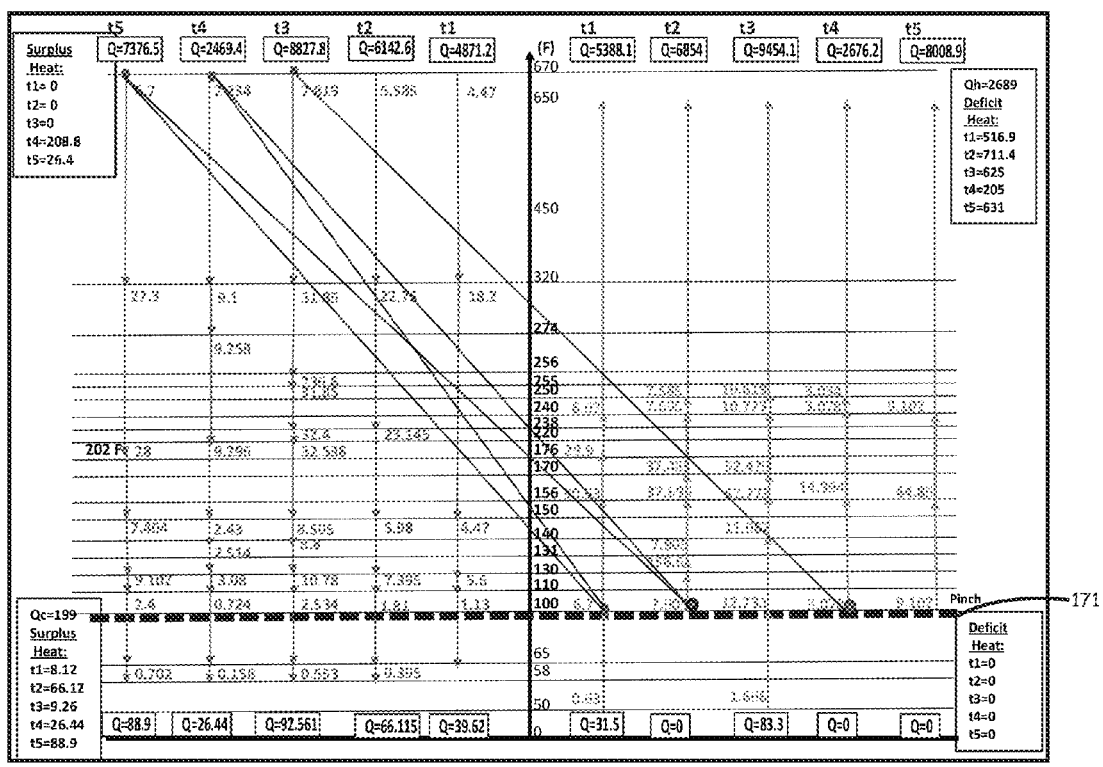
FIG. 54 is a graphical illustration of a temperature time duty diagram illustrating an option for inter-time zones matching according to an embodiment of the present invention.
Figure 55:
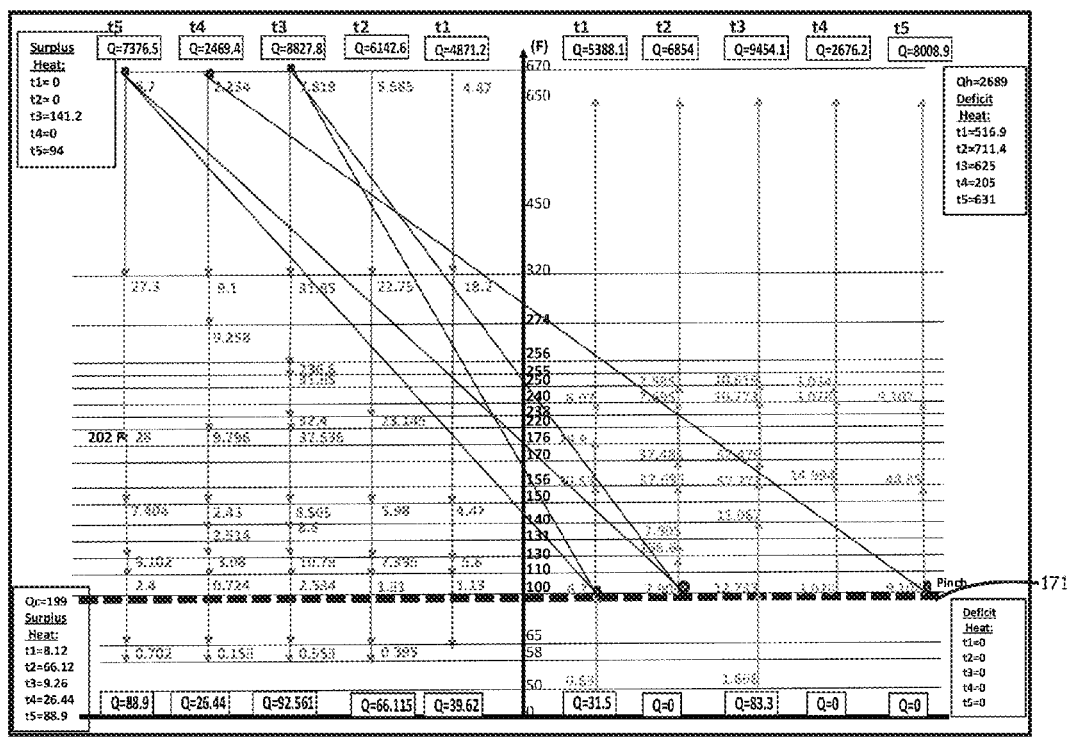
FIG. 55 is a graphical illustration of a temperature time duty diagram illustrating an option for inter-time zones matching according to an embodiment of the present invention.
Figure 56:
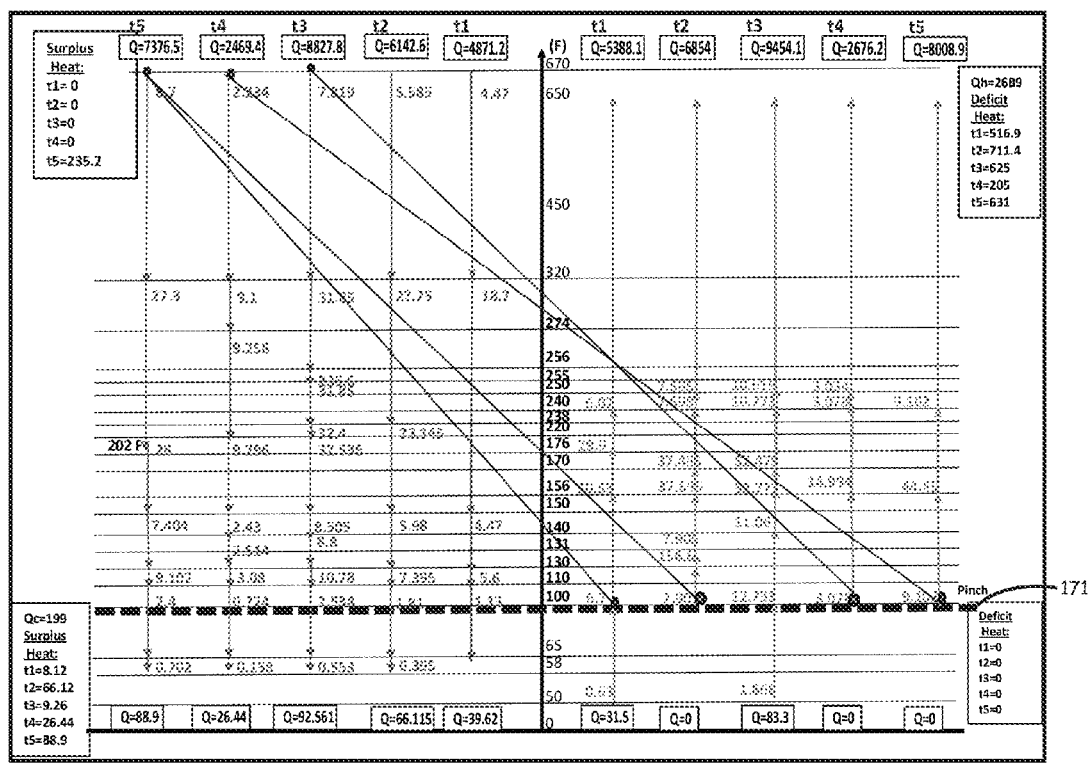
FIG. 56 is a graphical illustration of a temperature time duty diagram illustrating an option for inter-time zones matching according to an embodiment of the present invention.

Particularly, FIG. 52 illustrates a temperature time duty diagram (T2D2) containing the data listed in data table 149 (see, e.g., FIGS. 36-37), above and below the controlling pinch (100° F.) shown at 171. FIG. 53 illustrates the T2D2 displaying an above-the-pinch inter-time zone (temporal) integration option in which zones t1 and t2 cold are integrated with t3, t4, and t5 hot. FIG. 54 illustrates an alternate integration option in which t3 hot is instead integrated with t4 cold. FIG. 55 illustrates another alternate integration option in which t4 hot is instead integrated with t5 cold. FIG. 56 illustrates another alternative integration option in which t4 hot is instead integrated with t5 cold and t3 hot is integrated with t4 cold.

Figure 57:
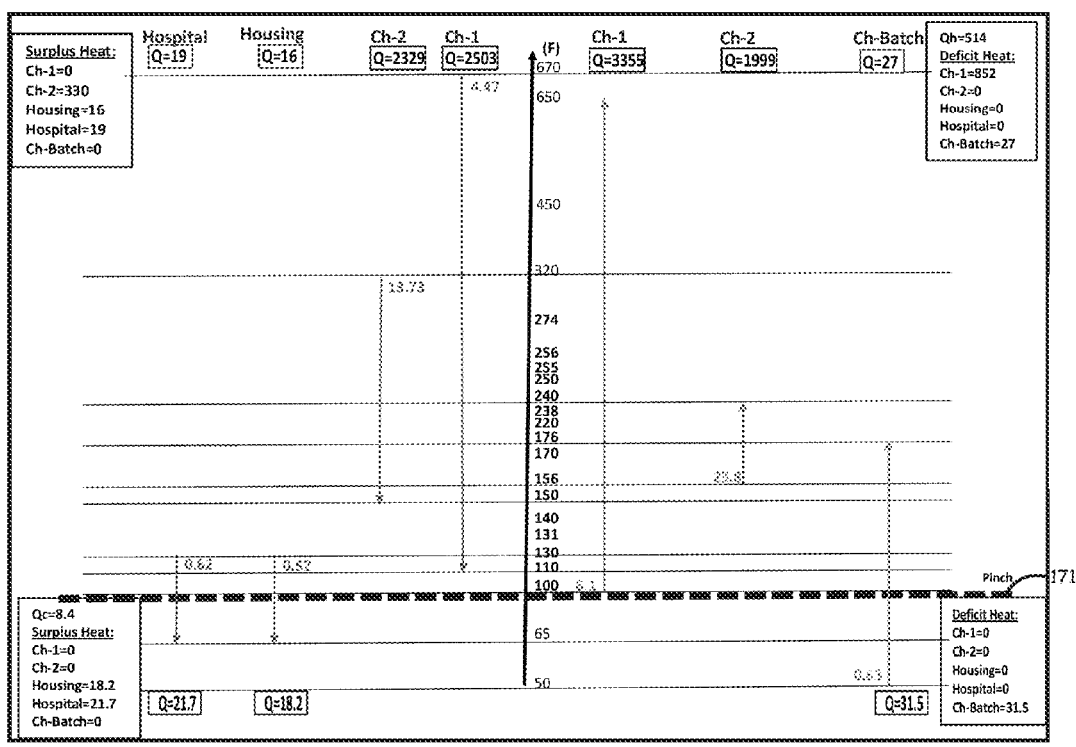
FIG. 57 is a graphical illustration of a temperature duty diagram for inter-processes (spatial) integration in time zone t1 example according to an embodiment of the present invention.
Figure 58:
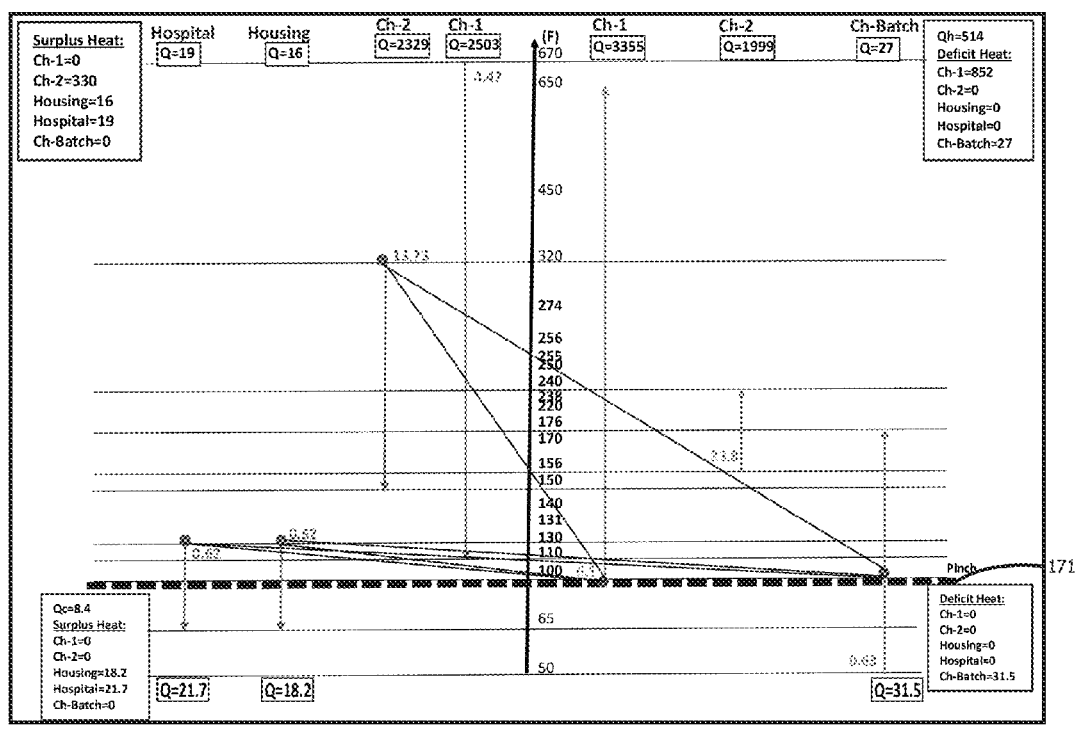
FIG. 58 is a graphical illustration of a temperature duty diagram illustrating all possible options for inter-processes (spatial) matching above pinch according to an embodiment of the present invention.
Figure 59:
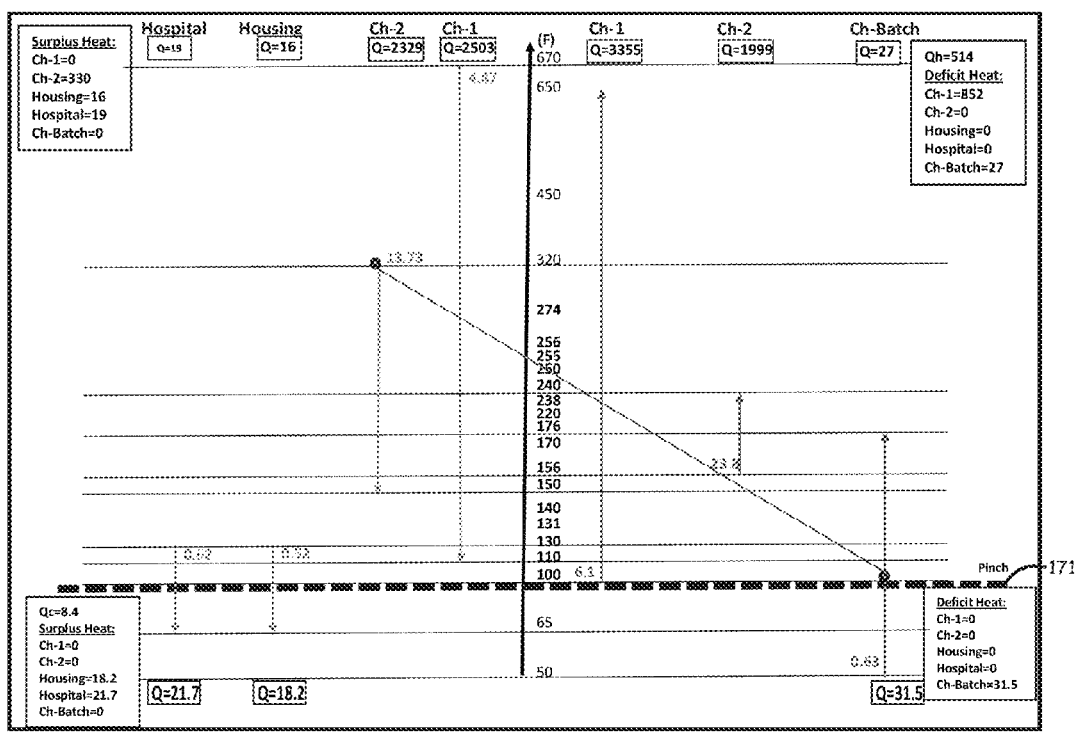
FIG. 59 is a graphical illustration of a temperature duty diagram (option 1) for inter-processes (spatial) integration in time zone t1 according to an embodiment of the present invention.
Figure 60:
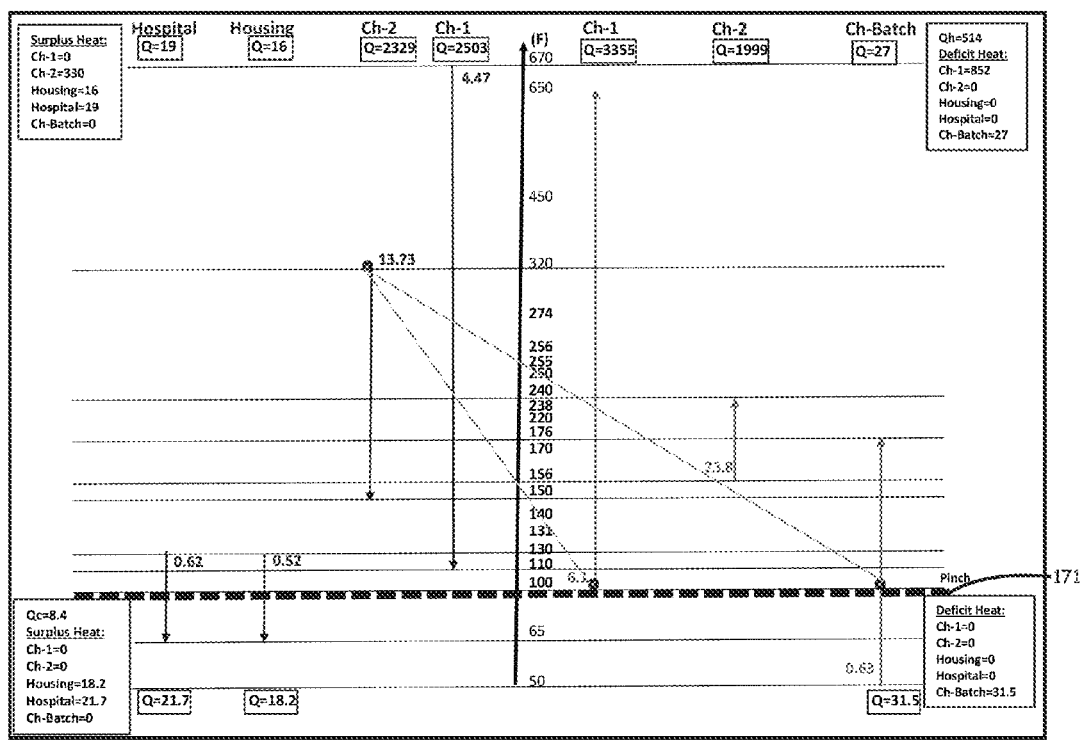
FIG. 60 is a graphical illustration of a temperature duty diagram (option 2) for inter-processes (spatial) integration in time zone t1 according to an embodiment of the present invention.
Figure 61:
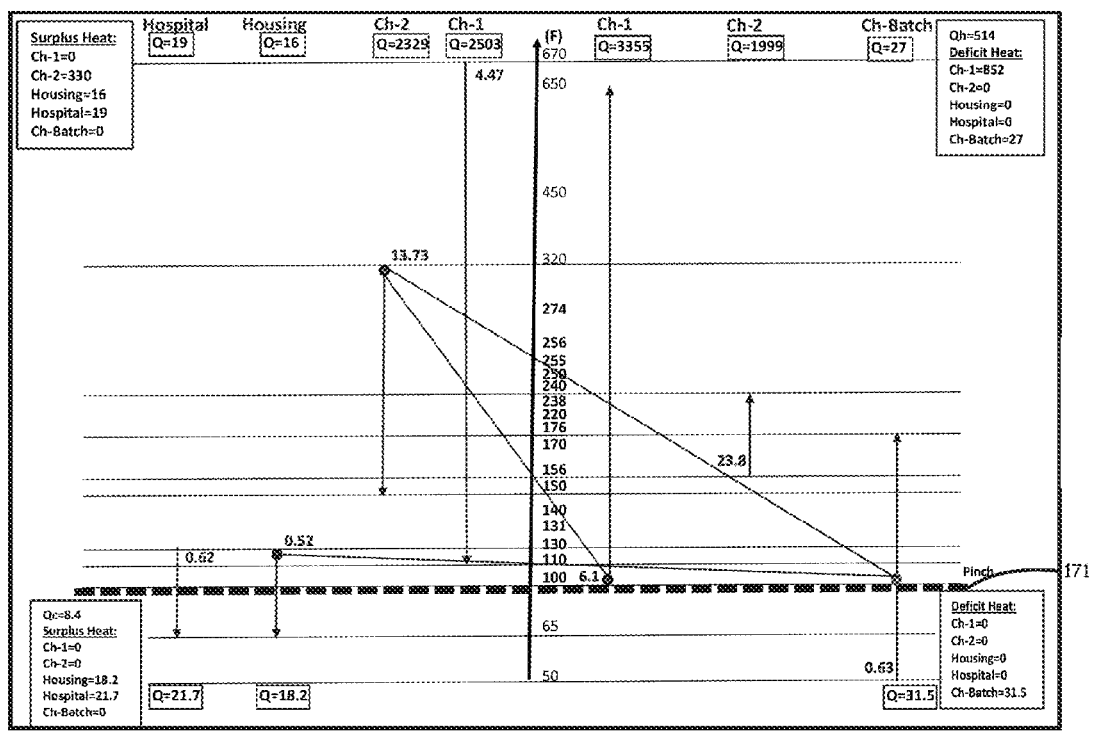
FIG. 61 is a graphical illustration of a temperature duty diagram (option 3) for inter-processes (spatial) integration in time zone t1 according to an embodiment of the present invention.
Figure 62:
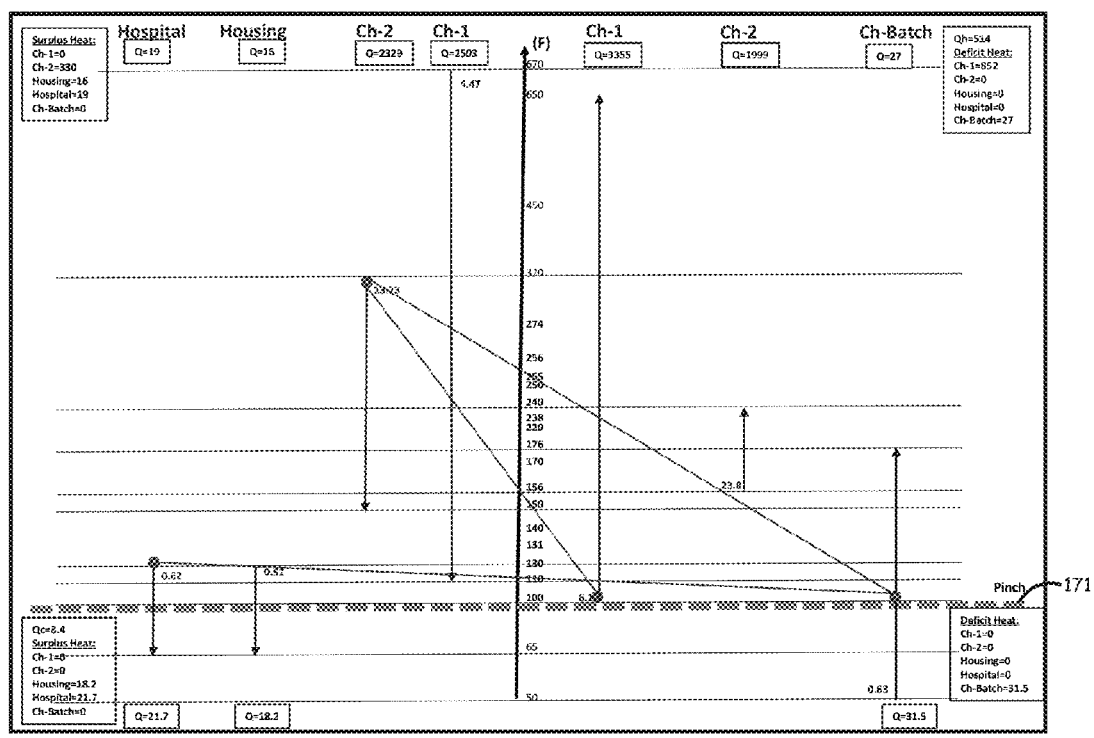
FIG. 62 is a graphical illustration of a temperature duty diagram (option 4) for inter-processes (spatial) integration in time zone t1 according to an embodiment of the present invention.

FIG. 57 illustrates a time duty diagram (TD2) containing the data listed in data table 149 for time zone t1, above and below the controlling pinch. FIG. 58 illustrates the TD2 of FIG. 57 displaying an above-the-pinch inter-processes (spatial) integration option in which Chemical Continuous Process (CH)-2 hot process integrates with CH-1 and CH-Batch cold process and the Housing and Hospital hot processes each integrate with CH-1 and CH-Batch processes. FIG. 59 illustrates an alternative spatial integration option in which CH-2 hot integrates with CH-Batch cold. FIG. 60 illustrates another spatial integration option in which CH-2 hot integrates with CH-1 and CH-Batch cold. FIG. 61 illustrates another spatial integration option similar to that shown in FIG. 60 but with the Housing hot process further integrating with the CH-Batch cold process. FIG. 62 illustrates another spatial integration option similar to that shown in FIG. 61 but with the Hospital hot process further integrating with the CH-Batch cold process.

Multi-Time-Period Combined Heat and Power Model for Eco-Industrial Park Utility System Synthesis and Planning Under Uncertainty:

One or more embodiments of the invention provide a multi-time-period (MTP) combined heat and power (CHP) model (MTP_CHP) for the eco-industrial park utility system synthesis and planning under uncertainty. The MTP_CHP for eco-industrial park utility system synthesis provides an advancement over the methods, systems, and program code for enhancing energy efficiency via systematic hybrid inter-processes integration described in U.S. patent application Ser. No. 13/858,731 and U.S. patent application Ser. No. 13/858,718, and expands upon the methods, systems, and program code for simultaneous process and utilities syntheses in partially and fully decentralized environments described in U.S. patent application Ser. No. 13/757,467 and U.S. patent application Ser. No. 13/757,491. According to one or more embodiments, the model is not only limited in its analysis to a single facility, but rather, can provide the optimum configuration of utilities system for an industrial city(s), including several industries, buildings, communities. The total energy demand and in-plants generation is significantly and substantially different than that in one plant/facility. Additionally, the model accounts for the demand and/or in-plants generation which can be composed of continuous and batch processes/tasks which provide a wide range of operating windows, and the utilities complex can provide this demand all the time in the most efficient and capital cost effective way.

Figure 63:
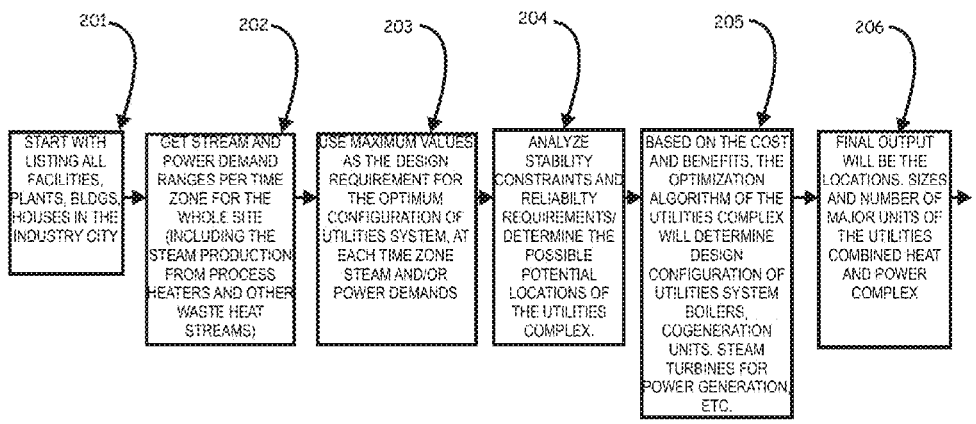
FIG. 63 is a block flow diagram illustrating a process of determining the sizes and number of major units of a utilities combined heat and power complex at their respective locations according to an embodiment of the present invention.

FIG. 63 illustrates a process developed to accompany the optimum synthesis and planning of the eco-industrial park utilities complex. Several new constraints are considered such as, for example, the stability of supply for both power and steam. During the loss of one major unit supplying power or steam, the demands should be met at any point of time. Hence, according to one or more embodiments, to formulate the most optimum configuration, the location, number and sizes of major equipment of the utilities system are to be addressed globally for the synthesis and not at the same time zone, independently. Once the synthesis decision/task is satisfied, another important consideration to be addressed is then the optimum operation at each time zone.

Specifically, the process includes beginning with a listing of all facilities, plants, buildings, houses, etc. in the eco-industrial park (block 201), followed by gathering/retrieving steam and power demand ranges for the whole site (block 202), which can include gathering the steam production from process heaters and other waste heat streams. The process can also include utilizing maximum values as the design requirements for the optimum configuration of utilities system at each time zone steam and/or power demands (block 203), and analyzing the stability constraints and reliability requirements and/or determining potential location utilities complex (block 204). The stability index would be given at each possible site, at which the configuration has to satisfy this index at all times. Based upon the cost and benefits, the optimization algorithm of the utilities complex will determine the design configuration of the utility system boilers, cogeneration units, and steam turbines or power generation, among others (block 205). According to the exemplary configuration, the process includes determining the sizes and number of major units of the utilities combined heat and power complex at their respective locations as the final output (block 207).

Figure 64:
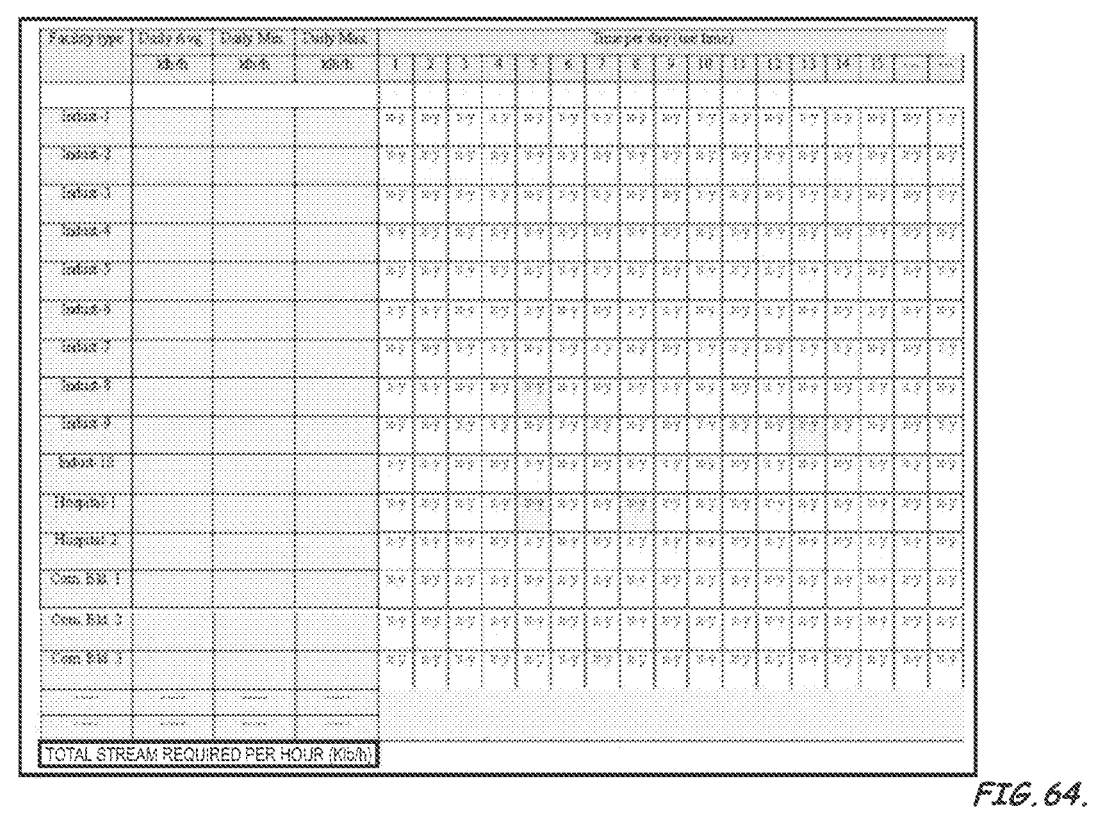
Figure 65:
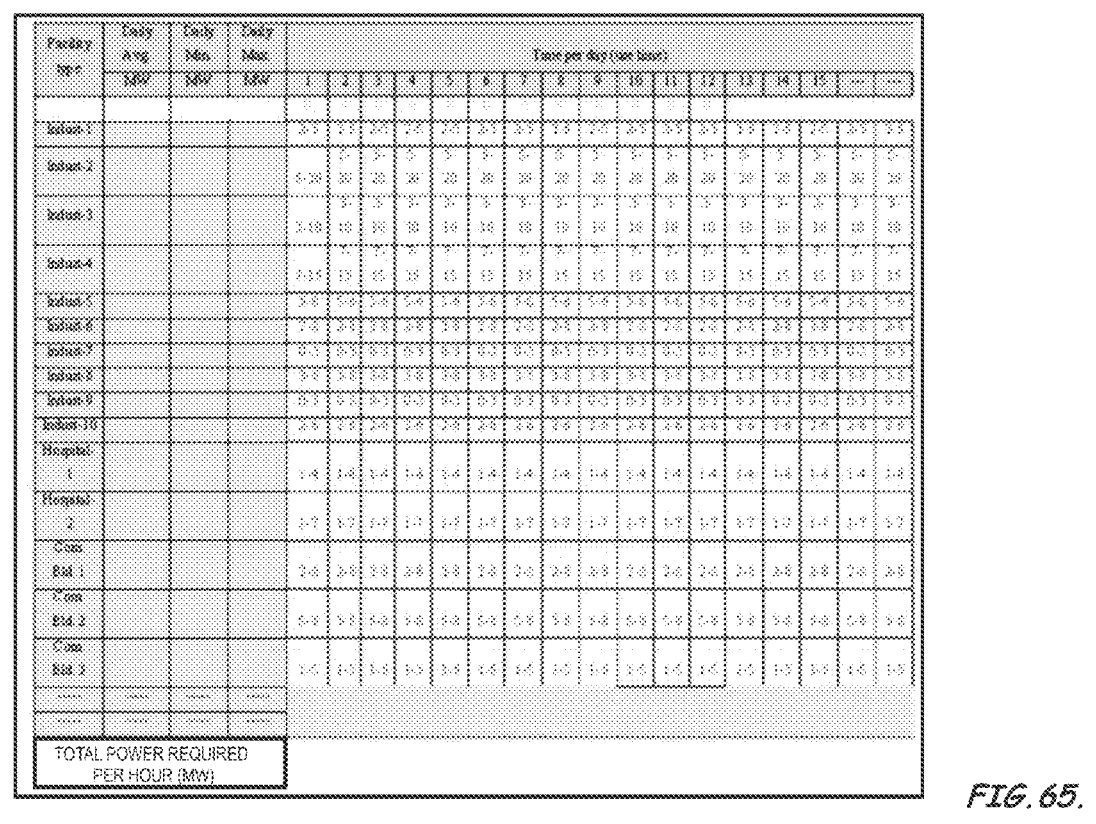

FIG. 64 includes an exemplary industrial city total steam demand table including range data representing hourly consumption for a typical day for multiple facilities including industrial plants, hospitals, and commercial buildings. FIG. 65 includes an exemplary industrial city total power demand table including range data also representing hourly consumption for a typical day. Note, although described as being provided hourly, the time period can be shorter or larger depending upon the needs of the user as would be understood by one of ordinary skill in the art.

1. CHP Design Formulation:

According to one or more embodiments, for effective eco-industrial park utility system synthesis, the utilities design considers the major components of the eco-industrial parks and is not limited to any one facility/complex. In the context of the eco-industrial park utility system, the steam and power demands generated per hour as a summation of independent users. Users include other industrial plants, buildings, residential houses, hospital and others. Some of the demand is batch processing, whereby the demand is not continuous. The utilities design can beneficially consider the entire complex requirements and try to satisfy the peak demands, while at the same time, remaining lien enough to satisfy low and average demand requirements without retaining an unreasonable amount of excess capacity.

Appendix 3 includes an exemplary model structure including: data sets (original and derived); parameters; variables; and process cooling demand and objectives (minimum total cost and minimum total operating costs) calculations.

2. CHP Number of Headers Selection:

According to an exemplary configuration, steam headers loads identification utilizes the CHP algorithm to calculate the utility system total annualized cost (USTAC) for 2, 3, 4, 5, 6 and 7 headers under all possible combinations of process design changes. This is described, for example, with respect to FIGS. 10A-11 of U.S. patent application Ser. No. 13/757,467 and accompanying text, incorporated by reference.

3. CHP Data Input:

According to one or more embodiments, the typical model input data includes: the equipment name and minimum/maximum operating capabilities (FIG. 66); number of steam headers definition (FIG. 67); listing and type of motor, rating, and efficiency, and listing and type of steam turbine, rating, and steam rate (FIG. 68); along with CHP model input data describing process stream demand intervals, process stream generation intervals, power demand intervals, available fuel and operating cost, and power export intervals (FIG. 69).

4. CHP Output:

According to one or more embodiments, the output from the CHP sub-model can include: the number of headers and its operating conditions; the number of cogeneration units and its sizes; the number of boilers and sizes; the number of steam turbine generators and its capacities; the number of motors and steam turbines (for process equipment driving) and its sizes; the size and location of solar system; the at least close to optimal utility subsystem steam and power generation and allocation; and the at least close to optimal in-process steam demand and generation. Other output model features as understood by those of ordinary skill in the art can also be included.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions, with the exception of those considered to be non-statutory subject matter. Such media can contain, for example, both operating instructions and the operations instructions related to the program code 51, and the computer executable portions of the method steps according to the various embodiments of methods of providing enhanced energy efficiency and reduced greenhouse gas emissions for an eco-industrial park through, for example, advanced hybrid inter-time zone inter-systems/processes energy integration targeting and solutions generation, among others, described above.

The terms "substantially" and "approximate" with reference to values generally refer to reasonably proximate or exact values.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

APPENDIX 1

The following include related patents and patent applications each incorporated herein by reference in its entirety:

U.S. Pat. No. 7,698,022, System, Method, and Program Product for Targeting and Optimal Driving Force Distribution in Energy Recovery Systems; U.S. Pat. No. 7,873,443, System, Method and Program Product for Targeting and Optimal Driving Force Distribution in Energy Recovery Systems; U.S. Ser. No. 12/480,415, Method and Software for Global Targeting of Process Utilities under Varying Condition; U.S. Pat. No. 8,032,262, System, Method, and Program Product for Synthesizing Non-Constrained and Constrained Heat Exchanger Networks; U.S. Pat. No. 7,729,809, System, Method, and Program Product for Targeting and Identification of Optimal Process Variables in Constrained Energy Recovery Systems; U.S. Ser. No. 12/898,461, Systems, Program Product, and Methods for Synthesizing Heat Exchanger Networks that Exhibit Life-Cycle Switchability and Flexibility under all Possible Combinations of Process Variations; U.S. Ser. No. 61/256,754, System, Method, and Program Product for Synthesizing Non-Thermodynamically Constrained Heat Exchanger Networks; U.S. Ser. No. 61/256,754, System, Method, and Program Product for Synthesizing Heat Exchanger Networks and Identifying Optimal Topography for Future Retrofit; U.S. Ser. No. 12/898,484, Systems, Program Product, and Methods for Targeting Optimal Process Conditions that Render an Optimal Heat Exchanger Network Design Under Varying Conditions; U.S. Ser. No. 12/898,475, Systems, Program Product, and Methods for Synthesizing Heat Exchanger Networks that Account for Future Higher Levels of Disturbances and Uncertainty, and Identifying Optimal Topology for Future Retrofit.

APPENDIX 2

```
SECTION /* _Model */
  DECLARATION SECTION Problem_Configurations
    ELEMENT PARAMETER:
      identifier   : required_num_of_tuples
      range        : Integers
      initial data : 1 ;
    ELEMENT PARAMETER:
      identifier   : required_tupple_cardianlity
      range        : Integers
      initial data : 2 ;
  ENDSECTION ;
  DECLARATION SECTION Math_Program
    VARIABLE:
      identifier   : Obj
      range        : free
      definition   : sum(a , ( area_qh(a) + area_qc(a)) * ( 1- sum( g,
area_assigned_to_group(a, g))) )
                   + sum(g, period_feed(max_temp, g))
                   + sum(g, period_surplus(min_temp + 1 , g)) ;
    MATHEMATICAL PROGRAM:
      identifier   : minimize_obj
      objective    : Obj
      direction    : minimize
      constraints  : AllConstraints
      variables    : AllVariables
      type         : Automatic ;
  ENDSECTION ;
  DECLARATION SECTION Calculated_Parameters
    PARAMETER:
      identifier   : stream_count_in
      index domain : (a)
      definition   : count(s in streams_in(a)) ;
    PARAMETER:
      identifier   : max_temp
      range        : integer
      definition   : max(max(hs,supply_temp(hs)-dtmin(hs)),
max(cs,target_temp(cs))) ;
    PARAMETER:
      identifier   : min_temp
      range        : integer
      definition   : min(min(hs ,target_temp(hs)-dtmin(hs)),
```

APPENDIX 2-continued

```
      min(cs,supply_temp(cs))) ;
   ENDSECTION ;
   DECLARATION SECTION Calculated_Sets
      SET:
         identifier   : streams_in
         index domain : (a)
         subset of    : streams
         definition   : {s | stream_in_area(s, a)} ;
      SET:
         identifier   : periods
         subset of    : Integers
         indices      : t, t_1
         order by     : −t
         definition   : { min_temp+1 .. (max_temp)} ;
      SET:
         identifier   : groups
         index        : g
         definition   : elementrange(1,required_num_of_tuples, 1,
         "Group_") ;
   ENDSECTION ;
   DECLARATION SECTION Problem_Vars
      VARIABLE:
         identifier   : period_demand
         index domain : (t,g)
         range        : free
         definition   : sum(cs| t > supply_temp(cs) and t <=
         target_temp(cs) ,
                        sum(a | stream_in_area(cs, a),
                              area_assigned_to_group(a, g)) *
   fcp(cs)
               ) ;
      VARIABLE:
         identifier   : period_supply
         index domain : (t,g)
         range        : free
         definition   : sum(hs| t > target_temp(hs)−dtmin(hs) and t <=
         supply_temp(hs)
                        sum(a | stream_in_area(hs, a),
                              area_assigned_to_group(a, g)) *
   fcp(hs)
               ) ;
      VARIABLE:
         identifier   : period_feed
         index domain : (t,g)
         range        : nonnegative ;
      VARIABLE:
         identifier   : period_surplus
         index domain : (t,g)
         range        : nonnegative ;
      VARIABLE:
         identifier   : area_assigned_to_group
         index domain : (a,g)
         range        : binary ;
   ENDSECTION ;
   DECLARATION SECTION Problem_Constraints
      CONSTRAINT:
         identifier   : one_group_for_area
         index domain : (a)
         definition   : sum(g, area_assigned_to_group(a, g)) <= 1 ;
      CONSTRAINT:
         identifier   : group_size_match_tuple_cardinality
         index domain : (g)
         definition   : sum(a , area_assigned_to_group(a, g)) =
   required_tupple_cardianlity ;
      CONSTRAINT:
         identifier   : period_feed_surplus_link
         index domain : (t,g) | t <> max_temp
         definition   : period_feed(t,g) = period_surplus(t−1, g) ;
      CONSTRAINT:
         identifier   : period_balance
         index domain : (t,g)
         definition   : period_feed(t,g) + period_supply(t,g)=
                        period_surplus(t,g) + period_demand(t,g) ;
   ENDSECTION ;
   DECLARATION SECTION Cutting_Constraints
   ENDSECTION ;
ENDSECTION /* _Model */ ;
SECTION /* Main_Data */
   DECLARATION SECTION Main_Parameters
      PARAMETER:
         identifier   : dtmin
         index domain : hs ;
      PARAMETER:
         identifier   : BigM
         range        : nonnegative
         definition   : 1.2*max_temp ;
      PARAMETER:
         identifier   : supply_temp
         index domain : (s) ;
      PARAMETER:
         identifier   : target_temp
         index domain : (s) ;
      PARAMETER:
         identifier   : fcp
         index domain : (s) ;
      PARAMETER:
         identifier   : stream_in_area
         index domain : (s,a)
         range        : binary ;
   ENDSECTION ;
   DECLARATION SECTION Main_Sets
      SET:
         identifier : hot_streams
         subset of  : streams
         index      : hs
         definition : {s | target_temp(s) <= supply_temp(s)} ;
      SET:
         identifier : cold_streams
         subset of  : streams
         index      : cs
         definition : {s | target_temp(s) >= supply_temp(s)} ;
      SET:
         identifier : areas
         index      : a ;
      SET:
         identifier : streams
         index      : s ;
   ENDSECTION ;
ENDSECTION /* Main_Data */ ;
PROCEDURE
   identifier : MainExecution
   body       :
      solve minimize_obj
ENDPROCEDURE ;
```

APPENDIX 3

Original Sets:
HDR: Steam headers.
BLR: Boilers.
COGEN: Cogeneration Units.
SOLAR: Solar thermal units
STG: Steam turbine generator units.
CSTG: Condensing steam turbine generator units.
BOS: Break over stations.
COND: Condensers
PST: Process steam turbines.
MSwitch: Motors switchable to process steam turbines
PSGen: Process steam generators.
PCDem: Process cooling demand
FUEL: Fuel types
   Derived Sets:
BLRHDR[BLA×HDR]: Matching between each boiler and the header it is connected to.
COGENHDR[COGEN×HDR]: Matching between each cogen and the header connected to.
SOLARHDR[SOLAR×HDR]: Matching between each Solar thermal unit and the header connected to.
STGInHDR[STG×HDR]: Input steam header to the STG.
STGOutHDR[STG×HDR]: Output steam header from the STG.

CSTGHDR[CSTG×HDR]: Input steam header to the CSTG.
BOSIn[BOS×HDR]: Input steam header to the breakover station.
BOSOut[BOS×HDR]: Output steam header of the breakover station.
CONDHDR[COND×HDR]: Condenser Input steam header.
DEAStmHDR[HDR]: Deaerator steam header.
PSTInHDR[PST×HDR]: Inlet steam header to process steam turbine.
PSTOutHDR[PST×HDR]: Outlet header from process steam turbine.
PSGenHDR[PSGen×HDR]: Outlet header from process steam generator.

Parameters
Seam Headers:

HDRPres[i∈HDR]: Header pressure.
HDRTemp[i∈HDR]: Header temperature.
HDRLoss[i∈HDR]: % loss of steam from header.
HDRRet[i∈HDR]: Steam returning from process to header (flash recovery).
HDRBfw[i∈HDR]: BFW to a steam header
HDRMaxDem[i∈HDR]: Maximum process steam demand on a header
HDRMinDem[i∈HDR]: Minimum process steam demand on a header
HDREnth[i∈HDR]: Enthalpy of a steam header.
HDRCost[i∈HDR]: Cost of header Boilers:

BLRCap[i∈BLR]: Steam generation capacity of boiler.
BLRnMin[i∈BLR]: Minimum allowable steam generation rate for an operating boiler.
BLRc0[i∈BLR]: Boiler fuel consumption constant coefficient.
BLRc1[i∈BLR]: Boiler fuel consumption linear coefficient.
BLRc2[i∈BLR]: Boiler fuel consumption quadratic coefficient.
BLRCC[i∈BLR]: Boiler's cycle of concentration.
BLRLoss[i∈BLR]: Boiler's % loss of boiler feed water.
BLRPrice[i∈BLR]: Annualized capital cost of boiler of the given specs.

Cogeneration:

COGENCap[i∈COGEN]: Power generation capacity of the cogen unit.
COGENMin[i∈COGEN]: Minimum power generation of an operational cogen unit.
COGENStmRatio[i∈COGEN]: Steam to power ratio of the cogen unit.
COGENc0[i∈COGEN]: Fuel consumption constant coefficient.
COGENc1[i∈COGEN]: Fuel consumption linear coefficient.
COGENc2[i∈COGEN]: Fuel consumption quadratic coefficient.
COGENCC[i∈COGEN]: Cogen's cycle of concentration parameter for the HRSG.
COGENLoss[i∈COGEN]: Water loss from cogen unit as a % of BFW.
COGENPrice[i∈COGEN]: Annualized capital cost of a cogen units of the given specs.

Steam Turbine Generator:

STGEff[i∈STG]: Isentropic efficiency of the steam turbine generator.
STGCap[i∈STG]: Steam capacity of STG.
STGLoss[i∈STG]: % of steam loss from STG.
STGEnthIn[i∈STG]: STG input steam enthalpy from input steam header.
STGEnthOut[i∈STG]: STG output steam enthalpy.

STPrice[i∈STG]: Annualized capital cost of an STG unit of the given specs.

Condensing Steam Turbine Generator:

CSTGEff[i∈CSTG]: Isentropic efficiency of the condensing steam turbine generator.
CSTG[i∈CSTG]: Steam flow capacity through the CSTG.
CSTGLoss[i∈CSTG]: % of steam loss from CSTG.
CSTGStmEnthIn[i∈CSTG]: Enthalpy of input steam to the CSTG.
CSTGStmEnthOut[i∈CSTG]: Enthalpy specs of the steam out of the CSTG (out of the STG stage).
CSTGWtrEnth[i∈CSTG]: Enthalpy specs of condensate water of CSTG.
CSTGDutyEnth[i∈CSTG]: Enthalpy of duty of condensed water of CSTG.
CSTGPrice[i∈CSTG]: Annualized capital cost of CSTG.

Breakover Station:

BOSCap[i∈BOS]: Seam capacity of the breakover station.
BOSLoss[i∈BOS]: % of steam loss from the BOS.
BOSStm[i∈BOS]: Steam flow to BOS
BOSEnth[i∈BOS]: Enthalpy of BOS steam.
BOSPRice[i∈BOS]: Annualized capital cost of a BOSS of the given specs.

Condenser:

CONDCap[i∈COND]: Capacity of steam flow through the condenser.
CONDLoss[i∈COND]: % loss of steam flow through the condenser.
CONDStm_x[i∈COND]: Steam quality at the condenser output.
CONDEnth[i∈COND]: Enthalpy of condenser output.
CONDEnthDuty[i∈COND]: Enthalpy of condenser duty.
CONDPrice[i∈COND]: Annualized capital cost of a condenser unit with the given specs.

Process Steam Turbine:

PSTLoss[i∈PST]: % loss of steam flow through PST.
PSTDem[i∈PST]: Steam demand for the PST.
PSTEnth[i∈PST]: Enthalpy of the outlet steam from the PST.

Switchable Motors to Process Steam Turbines:

MSwitchHp[i∈MSwitch]: HP required by process driven by switchable motors
MSwitchEff[i∈MSwitch]: Efficiency of switchable motors
MSwitchMWToPST[i∈MSwitch]: Power demand in motors switchable to Process Steam Turbines
MSwitchStmToPST[i∈MSwitch]: Steam flow to process steam turbines switchable with motor Process Steam Generator:

PSGenEnth[i∈PST]: Enthalpy of outlet steam from process steam generator.
PSGenMaxProd[i∈HDR]: Maximum Steam production rate of process steam generator.
PSGenMinProd[i∈HDR]: Minimum Steam production rate of process steam generator.

Solar Thermal Unit:

SOLARfwEnth[i∈SOLAR]: BFW Enthalpy to solar thermal unit
SOLAROutEnth[i∈SOLAR]: Enthalpy of Hot water or steam generated from solar thermal unit
SOLARStm_x[i∈SOLAR]: Quality of steam generated from solar thermal unit
SOLAREff[i∈SOLAR]: Efficiency of Solar thermal unit
SOLARRad[i∈SOLAR]: Avg. Daily heat radiation from sun (kwh)
SOLARCost[i∈SOLAR]: Annualized cost of Solar thermal unit Condensate System:
SkimTankLoss: % losses from skim tank.
MWWtrEnth: Enthalpy of the makeup water.
CondRetFlow: Flow rate of the return condensate.
CondCoolerLoss: % loss of condensate from condensate coolers.
CondRetTargEnth: The target enthalpy of the return condensate.
  Deaerator:
DEAStm: Steam flow to the deaerator.
DEAStmEnth: Enthalpy of the steam used in the deaerator.
DEAOutWtrEnth: Enthalpy of the water leaving the deaerator.
DEALoss: % loss of water from dearator.
DEAVentFlow: Flow rate of steam vented from the deaerator.
DEAVentEnth: Enthalpy of the steam vented from the deaerator.
  Power:
TotPwrDem: Power demand from the process (fixed and variable loads).
OtherPwrDem: Power demand for other than process (other industrial power demands buildings, hospital, residential houses, masgid, etc)
  Fuel:
FuelType[i∈Fuel]: Type of fuels
FuelMaxAv[i∈Fuel]: Maximum quantity of a fuel type
FuelHV[i∈Fuel]: Heating value of a fuel type
FuelPrice[i∈Fuel]: Price of a fuel type
  Economics:
PriceImpPwr: Imported power price.
PriceExpPwr: Exported power price.
PriceMUWtr: Make up water price.
  Variables:
  Steam Headers:
HDRIn[i∈HDR]: Steam flow into header.
HDROUT[i∈HDR]: Steam flow out of header.
HDRBFW[i∈HDR]: Boiler feed water injected into header to maintain header enthalpy specs.
HDRDem[i∈HDR]: Process & all other steam demand on a header; Determine optimal values of Steam for heating demand at different headers within a given intervals
  Boilers:
BLROn[i∈BLR]: Binary variable to determine whether the size of a boiler selected (on/off) (Binary).
BLRBFW[i∈BLR]: Boiler feed water into boiler.
BLRSTM[i∈BLR]: Boiler steam generation rate.
BLRBD[i∈BLR]: Blowdown from boiler.
BLRFuel[i∈BLR]: Boiler's fuel consumption rate.
BLRNo[i∈BLR]: Number of installed units of the boiler (Nonnegative integer.
  Cogeneration:
COGENOn[i∈COGEN]: Binary variable to determine whether a cogen unit is on or off (Binary).
COGENPwr[i∈COGEN]: Power generation rate from cogen unit.
COGENBFW[i∈COGEN]: Boiler feed water to cogen unit.
COGENStm[i∈COGEN]: Steam generation rate from cogen unit.
COGENBD[i∈COGEN]: Water blowdown rate from cogen unit.
COGENFuel[i∈COGEN]: Fuel consumption rate of cogen unit.
COGENNo[i∈COGEN]: Number of installed cogen units (Nonnegative integer)

Solar Steam Generator:
SOLARStm[so]: Steam flow from solar thermal unit
SOLARo[so]: Binary variable of solar thermal unit
  Steam Turbine Generator:
STGStm[i∈STG]: Steam flow through the STG.
STGPwr[i∈STG]: Power generation from the STG.
STGNo[i∈STG]: Number of installations of the STG.
  Condensing Steam Turbine Generator:
CSTGStm[i∈CSTG]: Steam flow rate through CSTG.
CSTGPwr[i∈CSTG]: Power generated from CSTG.
CSTGDuty[i∈CSTG]: Duty of CSTG condenser.
CSTGNo[i∈CSTG]: Number of installed units of CSTG of the given specs.
  Switchable Motors to Process Steam Turbines:
MSwitchOnOff[i∈MSwitch]: binary variable (0/1) of a switchable motor
PSTSwitchStm[i∈MSwitch]: steam flow to process steam turbines switchable with motors
  Breakover Station:
BOSStm[i∈BOS]: Steam flow through the BOS.
BOSNo[i∈BOS]: Number of installed BOS units.
  Condenser:
CONDStm[i∈COND]: Steam flowrate through the condenser.
CODDuty[i∈COND]: Duty of the condenser.
CONDNo[i∈COND]: Number of installed condenser units.
  Condensate System:
SkimTankInFlow: Input flowrate to skim tank.
SkimTankOutFlow: Output flowrate from skim tank.
SkimTankOutEnth: Enthalpy of skim tank outlet.
MUWtrFlow: Flow rate of makeup water to the system.
  Dearator:
DEAStmFlow: Dearator team flow rate.
DEAOutWtrFlow: Dearator output water flow rate.
  Process Steam Generator:
PSGenProd[i∈PST]: Steam production rate of process steam generator.
  Boiler Feedwater System:
BFWFlow: Boiler feedwater flow rate.
  Process Cooling Demand:
PCoolingDem[i∈PCDem]: Determine optimal values of: steam for cooling demand, water cooling, air-cooling and refrigeration cooling demands
  Steam Headers:
  Header Inlet Flow.

$$HDRIn[h] = \qquad \forall h$$

$$HDRRet[h] + HDRBFW[h] + \sum_{(b,h)\in BLRHDR} BLRSTM[b] \cdot BLRNo[b] +$$

$$\sum_{(so,h)\in SOLARHDR} SOLARSTM[so] \cdot SOLARNo[so] +$$

$$\sum_{(c,h)\in COGENHDR} COGENStm[c] \cdot COGENNo[c] +$$

$$\sum_{(x,h)\in STGOutHDR} STGStm[s] \cdot (1 - STGLoss[s]) \cdot STGNo[s] +$$

$$\sum_{(b,h)\in BOSOut} BOSStm[b] \cdot (1 - BOSLoss[b]) \cdot BOSNo[b] +$$

$$\sum_{(p,h)\in PSTOutHDR} PSTStm[p] \cdot (1 - PSTLoss[p]) +$$

$$\sum_{(p,h)\in PSGenHDR} PSGenProd[p] \in HDR$$

Header Outlet Flow.

$$HDROut[h] = \sum_{(x,h)\in SDemHDR} HDRDem[h] + \sum_{(x,h)\in STGInHDR} STGStm[s]\cdot STGNo[s] +$$
$$\sum_{(x,h)\in STGInHDR} PSTSwitchStm\cdot PSTNo[s] +$$
$$\sum_{(c,h)\in CSTGHDR} CSTGStm[c]\cdot CSTGNo[c] +$$
$$\sum_{(s,h)\in PSTInHDR} PSTStm[s]\cdot PSTNo[s] +$$
$$\sum_{(b,h)\in BOSIn} BOSStm[b]\cdot BOSNo[b] +$$
$$\sum_{(c,h)\in CONDHDR} CONDStm[c]\cdot CONDNo[c] +$$
$$\sum_{h\in DEAStmHDR} DEAStmFlow + \sum_{(p,h)\in PSTInHDR} PSTDem[p] \in HDR \quad \forall h$$

Material Balance.

$HDRIn[h]\cdot(1-HDRLoss[h])=HDROut[h]$ $\forall h \in HDR$

Energy Balance.

$$HDRIn[h]\cdot HDREnth[h] = \quad \forall h$$
$$HDRRet[h]\cdot HDREnth[h] + HDRBFW[h]\cdot BFWEnth[h] +$$
$$HDREnth[h]\cdot \sum_{(xo,h)\in SOLARHDR} SOLARSTM[so]\cdot SOLARNo[so] +$$
$$HDREnth[h]\cdot \sum_{(b,h)\in BLRHDR} BLRSTM[b]\cdot BLRNo[b] +$$
$$\sum_{(s,h)\in STGInHDR} PSTSwitchStm\cdot PSTNo[s]\cdot PSTEnthOut +$$
$$HDREnth[h]\cdot \sum_{(e,h)\in COGENHDR} COGENStm[c]\cdot COGENNo[c] +$$
$$\sum_{(s,h)\in STGOutHDR} STGStm[s]\cdot(1-STGLoss[s])\cdot$$
$$STGNo[s]\cdot STGEnthOut[s] + \sum_{(b,h)\in BOSOut}$$
$$BOSStm[b]\cdot(1-BOSLoss[b])\cdot BOSNo[b]\cdot BOSEnth[b] +$$
$$\sum_{(p,h)\in PSTOutHDR} PSTDem[p]\cdot(1-PSTLoss[p])\cdot PSSTEnth[p] +$$
$$\sum_{(p,h)\in PSGenHDR} PSGenProd[p]\cdot PSGenEnth[p] \in HDR$$

Boilers:

Material Balance.

$BLRBFW[b]\cdot(1-BLRLoss)=BLRStm[b]+BLRBD[b]$ $\forall b \in BLR$

Boiler Blowdown Calculation.

$BLRBD[b]\cdot(BLRCC[b]-1)=BLRStm[b]$ $\forall b \in BLR$

Boiler Fuel Use Calculation.

$BLRFuel[b]=BLRc0[b]+BLRc1[b]\cdot BLRStm[b]+BLRc2\cdot BLRStm[b]^2$ $\forall b \in BLR$ Boiler Capacity Constraints.

$BLRStm[b]\geq BLRMin[b]\cdot BLROn[b]$ $\forall b \in BLR$ $BLRStm[b]\leq BLRCap[b]\cdot BLROn[b]$ $\forall b \in BLR$ Boiler Steam Reserves.

$$\sum_{b\in BLR} BLROn[b]\cdot(BLRCap[b]-BLRStm[b])\cdot BLRNo[b]$$

Cogeneration:

Steam Production.

$COGENStm[c]=COGENPwr[c]\cdot COGENStmRatio[c]$ $\forall c \in COGEN$

Material Balance.

$COGENBFW[c]\cdot(1-COGENLoss)=COGENStm[c]+COGENBD[c]$ $\forall c \in COGEN$

Blowdown Calculation.

$COGENBD[c]\cdot(COGENCC[c]-1)=COGENStm[c]$ $\forall c \in COGEN$

Cogen Fuel Use.

$$COGENFuel[c] = \quad \forall c$$
$$\begin{cases} COGENc0[c]+COGENc1[c]\cdot & \text{if } COGENStm[c]>0 \\ COGENPwr[c]+COGENc2[c]\cdot & \\ COGENPwr[c]^2, & \\ 0, & \text{if } COGENStm[c]=0 \end{cases}$$
$$\in COGEN$$

Capacity Constraints.

$COGENPwr[c]\geq COGENMin[c]\cdot COGENOn[c]$ $\forall c \in COGEN$ $COGENPwr[c]\leq COGENCap[c]\cdot COGENOn[c]$ $\forall c \in COGEN$ Solar Thermal Steam Generation/Heating:

Material Balance:

$SOLARBFW[so]\cdot(1-SOLARLoss)=SOLARStm[so]$ $\forall so \in SOLAR$

Steam Production:

$SOLARStm[SO]=SOLARon[so]\cdot SOLAREff[so]\cdot SOLARRad$ $\forall so \in SOLAR$ Steam Turbine Generator:

Power Generation calculation.

$STGPwr[s]\cdot 3412=STGStm[s]\cdot(STGEnthIn[s]-STGEnthOut[s])$ $\forall s \in STG$ Capacity.

$STGStm[s]\geq 0$ $\forall s \in STG$ $STGStm[a]\leq STGCap[s]$ $\forall s \in STG$

Condensing Steam Turbine Generator:

Power Generation Calculation.

$$CSTGPwr[c] \cdot 3412 = CSTGStm[c] \cdot (CSTGEnthIn[c] - CSTGEnthOut[c])\ \forall c \in CSTG$$

Capacity.

$$CSTGStm[c] \geq 0\ \forall c \in CSTG$$

$$CSTGStm[c] \leq CSTGCap[c]\ \forall c \in CSTG$$

Steam Demands:
Demand Ranges in a Header for Each (2 Hrs):

$$PSDem[h] \geq HDRMinDem\ \forall h \in HDR$$

$$PSDem[h] \leq HDRMaxDem\ \forall h \in HDR$$

Note:

$$PSDem = \Sigma_{i=0}^{24} PSDem_{Indst} + PSDem_{hospital} + PSDem_{commercial}$$

Breakover Stations:

Capacity.

$$BOSStm[b] \geq 0\ \forall b \in BOS$$

$$BOSStm[b] \leq BOSCap[b]\ \forall b \in BOS$$

Condenser:

Duty Calculation.

$$CONDDuty[c] \cdot 1000 = CONDStm[c] \cdot CONDEnthDuty[c]\ \forall c \in COND$$

Capacity.

$$CONDStm[c] \geq 0\ \forall c \in COND$$

$$CONDStm[c] \leq CONDCap[c]\ \forall c \in COND$$

Skim Tank:
Material Balance.

$$SkimTankInFlow \cdot (1 - SkimTankLoss) = SkimTankOutFlow$$

$$SkimTankInFlow = CondRetFlow + MUWtrFlow + \sum_{c \in CSTG} CSTGStm[c] \cdot (1 - CSTGLoss[c]) \cdot CSTGNo[c] + \sum_{c \in COND} CONDStm[c] \cdot (1 - CONDLoss[c]) \cdot CONDNo[c]$$

Energy Balance.

$$SkimTankOutFlow \cdot SkimTankOutEnth = CondRetFlow \cdot CondRetTargEnth + MUWtrFlow \cdot MUWtrEnth + \sum_{c \in CSTG} CSTGStm[c] \cdot (1 - CSTGLoss[c]) \cdot CSTGWtrEnth[c] \cdot CSTGNo[c] + \sum_{c \in COND} CONDStm[c] \cdot (1 - CONDLoss[c]) \cdot CONDEnth[c] \cdot CONDNo[c]$$

Deaerator:

Material Balance.

$$(SkimTankOutFlow + DEAStmFlow) \cdot (1 - DEALoss) = DEAVentFlow + DEAOutWtrFlow$$

Energy Balance.

$$SkimTankOutFlow \cdot SkimTankOutEnth + DEAStmFlow \cdot DEAStmEnth = DEAVentFlow \cdot DEAVentEnth + DEAOutWtrFlow \cdot DEAOutWtrEnth$$

Boiler Feedwater
Material Balance.

$$BFWLow = \sum_{h \in HDR} HDRBFW[h] + \sum_{b \in BLR} BLRBFW[b] \cdot BLRNo[b] + \sum_{c \in COGEN} COGEN[c] \cdot COGENNo[c]$$

$$BFWFow = DEAOutWtrFlow \cdot (1 - BFWLoss)$$

Power:
Total Power Generation Calculation.

$$TotPwrGen = \sum_{c \in COGEN} COGENPwr[c] \cdot COGENNo[c] + \sum_{s \in STG} STGPwr[s] \cdot STGNo[s] + \sum_{ms \in STG} MSwitchMWToPST + \sum_{c \in CSTG} CSTGPwr[c] \cdot CSTGNo[c]$$

Satisfy Power Requirements.

$$TotPwrGen + TotPwrImp - TotPwrExp \geq TotPwrDem,$$

Note:

$$TotPwrDem = \Sigma_{i=0}^{24} PwrDem_{Indsc} + PwrDem_{hospital} + PwrDem_{comrcial} + PwrDem_{Rerid}$$

Exported Power Calculation.

$$TotPwrExp = \begin{cases} TotPwrGen + \\ TotPwrImp - TotPwrDem, \\ 0, \end{cases} \begin{array}{l} \text{if } TotPwrGen + \\ TotPwrImp > TotPwrDem \\ \text{Otherwise} \end{array}$$

Constraints:
Process Cooling Demand:

$$PCoolongDem = \sum_{(i,PC) \in PCoolingDem} AirCDuty[l] + \sum_{(i,PC) \in PCoolingDem} WtrCDuty[l] + \sum_{(LPC) \in PCoolingDem} RefDutyR[i]$$

Fuel:
Total Fuel Use.

$$TotFuelUse = \sum_{b \in BLR} BLRFuel[b] \cdot BLRNo[b] + \sum_{c \in COGEN} COGENFuel[c] \cdot COGENNo[c]$$

Steam Reserves:
Maximum Steam Generation from a Boiler Unit.

$$MaxBlrStm = \max_{b \in BLR} \{BLRStm[b] \cdot BLRNo[b]\}$$

Maximum Steam Generation from a Cogen Unit.

$$MaxCogenStm = \max_{c \in COGEN} \{COGENStm[b] \cdot COGENNo[b]\}$$

Required Steam Reserves Calculation.

RequiredStmRes=max{MaxBlrStm,MaxCogenStm}

Condensate Steam Reserves Calculation.

$$CondStemRes = \sum_{c \in CSTG} CSTGStm[c] \cdot (1 - CSTGLoss[c]) \cdot CSTGNo[c] +$$
$$\sum_{c \in COND} CONDStm[c] \cdot (1 - CONDLoss[c]) \cdot CONDNo[c]$$

Steam Reserves Calculation.

StemRes=max{RequiredStmRes−CondStmRes,0}

Economics Calculation:

The model can advantageously solve the problem in two steps, one step to find the optimum configuration design point of view, which will be based on the maximum demands values. The next step is to optimally operate the utilities complex model to solve all demands for each time step (i).

Total Design Calculation:

$$TotCost = (TotFuelUse \cdot PriceFuel + MUWtrFlow \cdot PriceMUWtr +$$
$$TotPwrImp \cdot PriceImpPwr - TotPwrExp \cdot PriceExpPwr)/1000 +$$
$$\sum_{b \in BLR} BLRNo[b] \cdot BLRPrice[b] + \sum_{h \in hdr} Hdr[h] \cdot HdrPrice[h] +$$
$$\sum_{c \in COGEN} COGENNo[c] \cdot COGENPrice[c] +$$
$$\sum_{s0 \in SOLAR} SOLARNo[s] \cdot SOLARPrice[s] +$$
$$\sum_{s \in STG} STGNo[s] \cdot STGPrice[s] + \sum_{c \in CSTG} CSTGNo[c] \cdot CSTGPrice[c] +$$
$$\sum_{b \in BOS} BOSNo[b] \cdot BOSPrice[b] + \sum_{c \in COND} CONDNo[c] \cdot CONDPrice[c] +$$
$$\sum_{(i,PC) \in PCoolingDem} AirCDuty[l] \cdot AirCPrice[l] +$$
$$\sum_{(i,PC) \in PCoolingDem} WtrCDuty[i] \cdot WtrCPrice[i] +$$
$$\sum_{(i,PC) \in PCoolingDem} RefDutyR[i] \cdot RefCPrice[i]$$

Objective:

The objective is to minimize the total operating cost, which can be expressed as: minimizeTotCost Note: This is done for the maximum demand over the range of whole time steps to find the most optimum design configuration.

Total Operating Cost Calculation (Operational Optimization):

$$TotOperCost = \sum_{t \in Interval} \Big( (TotFuelUse \cdot PriceFuel + MUWtrFlow \cdot PriceMUWtr +$$
$$TotPwrImp \cdot PriceImpPwr - TotPwrExp \cdot PriceExpPwr)/1000 +$$
$$\sum_{b \in BLR} BLRNo[b] \cdot BLRPrice[b] + \sum_{h \in hdr} Hdr[h] \cdot HdrPrice[h] +$$
$$\sum_{c \in COGEN} COGENNo[c] \cdot COGENPrice[c] +$$
$$\sum_{s0 \in SOLAR} SOLARNo[s] \cdot SOLARPrice[s] +$$
$$\sum_{s \in STG} STGNo[s] \cdot STGPrice[s] + \sum_{c \in CSTG} CSTGNo[c] \cdot CSTGPrice[c] +$$
$$\sum_{b \in BOS} BOSNo[b] \cdot BOSPrice[b] +$$
$$\sum_{c \in COND} CONDNo[c] \cdot CONDPrice[c] +$$
$$\sum_{(i,PC) \in PCoolingDem} AirCDuty[l] \cdot AirCPrice[l] +$$
$$\sum_{(i,PC) \in PCoolingDem} WtrCDuty[i] \cdot WtrCPrice[i] +$$
$$\sum_{(i,PC) \in PCoolingDem} RefDutyR[i] \cdot RefCPrice[i] \Big)$$

Where, i: is the time interval (h) at which the problem will be solved for each interval, start with maximum demand, and then solve for each time step.

Objective:

The objective is to minimize the total operating cost, which can be expressed as:

minimize TotOperCost

Note: This is done for the whole time steps to find the most optimum operation modes.

That claimed is:

1. A computerized method comprising the steps of:
identifying, by a computer processor, a plurality of functional areas for an eco-industrial park, the plurality of functional areas comprising a plurality of industrial functional areas and one or more non-industrial functional areas in adjacent geographical locations, each of the plurality of industrial functional areas containing one or more process streams comprising one or more of the following: one or more hot process streams to be cooled and one or more cold process streams to be heated, each of the one or more non-industrial functional areas containing one or more of the following: one or more hot streams and one or more cold streams;
identifying, by the computer processor, a plurality of significant heating and cooling tasks for each significant time-dependent and non-time-dependent industrial and non-industrial activity within the eco-industrial park;
responsive to the identified functional areas and identified significant heating and cooling tasks, determining, by the computer processor, one or more inter-time zone thermal energy integration thermal targets and one or more intra-time zone thermal energy integration thermal targets; and
responsive to the determined one or more inter-time zone thermal energy integration thermal targets and one or more intra-time zone thermal energy integration thermal targets, performing, by the computer processor, inter-time zone thermal energy integration matching comprising identifying one or more inter-time zone thermal energy integration matching solutions across a plurality of time zones to satisfy a thermal load to be integrated via inter-time zone thermal energy integration.

2. A method as defined in claim 1, wherein the plurality of time zones includes at least three times zones, the method further comprising the step of:
generating one or more technically viable eco-industrial park heat exchange system design alternatives responsive to the identified one or more inter-time zone thermal energy integration matching solution.

3. A method as defined in claim 1, wherein the plurality of time zones includes at least three times zones, the method further comprising the step of:
generating at least one technically viable energy efficient eco-industrial park alternative that satisfies the eco-industrial park thermal energy and steam utilities demands for the plurality of time zones as well as rendering a corresponding optimal operating scenario at each specific time-zone.

4. A method as defined in claim 1, wherein the step of determining one or more inter-time zone thermal energy integration targets includes analyzing duration of the plurality of time zones as an optimization variable.

5. A method as defined in claim 1, wherein boundaries of the plurality of time zones are defined by a smallest heating or cooling time duration for any significant candidate activity in the eco-industrial park under analysis.

6. A method as defined in claim 1, wherein the steps of determining one or more inter-time zone thermal energy integration thermal targets and intra-time zone thermal energy integration thermal targets comprises the steps of:
identifying total supply and demand thermal energy loads at each of a plurality of temperature intervals;
identifying inter-time zone surplus thermal energy load between each of the plurality of time zones at each of the plurality of temperature intervals;
identifying total supply and demand thermal energy loads at each of the plurality of time zones at each of the plurality of temperature intervals; and
identifying a thermal energy load to be integrated via inter-time zone thermal energy integration and intra-time zone matching.

7. A method as defined in claim 1, wherein the steps of determining inter-time zone thermal energy integration thermal targets and intra-time zone thermal energy integration thermal targets, includes the steps of:
identifying total supply and demand at each temperature interval;
identifying the supply and demand and surplus of each functional area; and
identifying the global minimum heating and cooling needs for the dependent and non-time dependent industrial and non-industrial activities.

8. A method as defined in claim 1, wherein the step of identifying the one or more inter-time zone thermal energy integration matching solutions comprises the step of:
identifying best and second best matching solutions from the one or more potential inter-time zone thermal integration matching solutions.

9. A method as defined in claim 8, further comprising the step of:
selecting a matching solution either satisfying an optimal one of the one or more inter-time zone thermal energy integration thermal targets or a level of one or more energy targets for heating utility, cooling utility, or both heating utility and cooling utility selected by a decision-maker.

10. A method as defined in claim 1, wherein the step of performing inter-time zone thermal energy integration matching is performed prior to performing intra-time zone thermal energy integration matching, the method further comprising the step of:
performing intra-time zone thermal energy integration matching.

11. A method as defined in claim 1, wherein the step of identifying one or more inter-time zone thermal energy integration matching solutions comprises performing inter-time zone thermal energy integration matching, to include temporally and spatially matching batch process streams with batch process streams and batch process streams with continuous process streams.

12. A method as defined in claim 1, wherein the step of identifying one or more inter-time zone thermal energy integration matching solutions, comprises:
matching waste heat of multiple hot process streams within each functional area with multiple hot process streams of each other functional area of a plurality of functional areas; and
the matching of the waste heat including separately matching for each of a plurality of different steam levels.

13. A method as defined in claim 1,
wherein the step of performing inter-time zone thermal energy integration matching is accomplished while simultaneously considering both inter-time-zones and inter-area thermal energy integration; and
wherein the inter-time zone thermal energy integration matching includes identifying a plurality of the functional areas to be included in one or more of the functional areas to be excluded from the matching solution.

14. A method as defined in claim 1, wherein the step of performing inter-time zone thermal energy integration matching is accomplished while simultaneously considering both inter-time zone and inter-area integration, comprising a plurality of the following:
performing hybrid matching techniques comprising: direct and indirect area integration, hot-to-hot process-to-process matching, cold-to-cold unit process-to-process matching, and process identities switching;
performing process stream rescheduling;
performing process energy storage; and
performing process stream heat capacity flowrate manipulation using variable speed drivers.

15. A method as defined in claim 1, further comprising the steps of:
identifying media of the thermal load to be integrated via inter-time zone thermal energy integration, the media comprising one or more of the following: thermal energy storage, rescheduling of activities or process streams, and changing of process stream flow rates; and
identifying one or more intra-time zone thermal energy integration matching solutions for each of the plurality of time zones and across a plurality of the functional areas having one or more tasks operating within the respective time zone when having more than one functional area associated therewith.

16. A method as defined in claim 15, wherein the step of identifying one or more intra-time zone thermal energy integration matching solutions, comprises the steps of:
identifying best and the second best matching solutions among the hot and cold process streams in the eco-industrial park for spatial energy integration, and
identifying best and second best matching solutions among each of the plurality of time-zones for temporal energy integration and greenhouse gas emissions reduction for optimal synthesis or retrofit of the eco-industrial park.

17. A method as defined in claim 15,
wherein the steps of identifying one or more inter-time zone thermal integration matching solutions and identifying one or more intra-time zone thermal integration matching solutions includes identifying functional areas to consider for integration and others to neglect as having an in substantial energy values;

wherein the method further comprises generating a plurality of technically viable energy efficient eco-industrial park alternatives that satisfies eco-industrial park utilities demands during each of the plurality of time zones as well as rendering a corresponding optimal operating scenario at each specific time-zone; and wherein the step of generating a plurality of technically viable energy efficient eco-industrial park alternatives comprises identifying a scheme of inter-area integration, the scheme of inter-area integration comprising direct, indirect or hybrid inter-area integration, and when either indirect or hybrid are utilized, identifying indirect medium, the indirect medium comprising water, steam, hot oil, or a combination thereof.

18. A method as defined in claim 1, wherein the one or more hot process streams comprise a plurality of hot process streams, and wherein a subset of the plurality of hot process streams: have different start up or shut down times, work intermittently at partial loads, or have seasonal dependent operating conditions.

19. A method as defined in claim 1, further comprising the steps of:
identifying one or more best energy and greenhouse gas emission reduction targets;
systematically identifying when direct inter-time integration is best utilized and is the only option to reach the best energy and greenhouse gas emissions reductions' targets; and
systematically identifying when indirect intra-time integration alone can be used to reach the best energy and greenhouse gas emissions reduction targets.

20. A method as defined in claim 1,
wherein the plurality of industrial functional areas comprising one or more of the following: a plurality of spatial zones, a plurality of blocks, a plurality of facilities, a plurality of plants, and a plurality of batch and continuous process units;
wherein the one or more non-industrial functional areas comprise one or more of the following: one or more housing compounds, one or more hospitals, one or more laundry facilities, and one or more facilities having large capacity dishwashing units; and
wherein the one or more hot streams comprised by the one or more non-industrial functional areas comprise one or more of the following: one or more waste streams emanating from the one or more housing compounds, the one or more hospitals, the one or more laundry facilities, and the one or more facilities having large capacity dishwashing.

21. A method as defined in claim 1, further comprising the steps of:
extracting operational data for the plurality of significant heating and cooling tasks, the operational data comprising duration, process stream initial type, supply temperature, target temperature, and heat capacity flow rate;
constructing a virtual time-space schematic for the eco-industrial park heating and cooling tasks to identify time zone boundaries;
providing a Time-Temperature-Duty-Diagram to establish a functional area supply-demand cascade from heating and cooling tasks respectively at each of a plurality of temperature intervals;
calculating a total supply and demand at each temperature interval, the step of calculating comprising cascading the functional areas supply and demand in time;
calculating one or more of the following: inter-time zones energy load storage, rescheduling requirements, and stream flowrate modifications among each of the plurality of time zones for the eco-industrial park; and
calculating global minimum heating and cooling needs for the dependent and non-dependent industrial and non-industrial activities of the eco-industrial park.

22. A method as defined in claim 1, wherein the step of identifying one or more inter-time zone thermal energy integration matching solutions comprises constructing a problem wide time-temperature duty diagram, comprising the steps of:
forming a global Cold Composite Line (gCCL) to summarize heating energy requirements for all significant zones, blocks, facilities, plants and process streams in each of a plurality of time zones at each of a plurality of temperature intervals;
forming a global Hot Composite Line (gHCL) summarize for cooling energy requirements for all the zones, blocks, facilities, plants and processes' streams in each time zone at each of the plurality of temperature intervals;
displaying a problem-wide pinch location;
displaying indicia of cold composite and hot composite thermal loads above the problem-wide pinch temperature for each individual time zone;
displaying indicia of a cold composite and hot composite thermal loads below the problem-wide pinch temperature for each individual time zone;
displaying indicia of total surplus heating load for each time zone for above the problem wide pinch temperature and for below the problem wide pinch temperature;
displaying indicia of a global cooling energy utility requirement;
displaying indicia of total surplus cooling load for each time zone for above the problem-wide pinch temperature and for below the problem-wide pinch temperature; and
displaying indicia of a global heating energy utility requirement.

23. A method as defined in claim 1, wherein the step of performing inter-time zone thermal energy integration matching comprises performing hybrid inter-time zone inter-area thermal energy integration matching, comprising the steps of:
predefining a global Cold Composite Line (gCCL) accounting for heat energy requirements for all significant zones, blocks, facilities, plants and processes' streams comprised by the plurality of functional areas in each of a plurality of time zones at each of a plurality of temperature intervals;
predefining a global Hot Composite Line (gHCL) accounting for cooling energy requirements for all the zones, blocks, facilities, plants and processes' streams in each time zone at each of the plurality of temperature intervals;
identifying thermal loads to be integrated via intra-time integration and inter-time integration;
conducting inter-time zone energy matching;
defining media of the thermal load to be integrated via the inter-time zone thermal energy integration; and
conducting intra-time zone intra-area energy matching for each of the plurality of time zones, to include the steps of:

initiating the intra-time intra-area matching via delumping of each predetermined time zone specific global cold composite line and each predefined time zone specific global hot composite line into its functional area structures from largest to smallest, and conducting the intra-time intra-area matching.

24. A method as defined in claim 1, further comprising the steps of:

determining global minimum heating energy utility and global minimum cooling energy utility requirements under all reasonably probable combinations of process-specific modifications and stream-specific $\Delta T\_min$ in an acceptable user defined range across space and time;

locating problem wide pinch interval and pinch location controlling stream or streams;

determining energy targets for inter-time inter- and intra-space energy integration and intra-time inter- and intra-space energy integration;

receiving decision maker selection identifying desired level of energy targets for one or more of the following: heating utility, cooling utility, and both heating and cooling utilities;

receiving user input of constrained and forbidden functional area and process streams matching whereby a respective thermal load must be satisfied via indirect integration;

collapsing operational data intervals when operational data is provided in interval form to locate the problem wide best for desired pinch temperature, the pinch-temperature location controlling process, and the best process stream changes as well as streams-specific $\Delta T\_min$ in the acceptable user defined range; and wherein the step of identifying one or more inter-time zone thermal energy integration matching solutions comprises the step of determining one or more best possible matches among the time zones and the functional areas.

25. A method as defined in claim 1, further comprising the step of:

generating a plurality of technically viable energy efficient eco-industrial park alternatives that satisfies eco-industrial park utilities demands during each of the plurality of time zones as well as rendering a corresponding optimal operating scenario at each specific time-zone.

26. A method as defined in claim 25, wherein the step of generating a plurality of technically viable energy efficient eco-industrial park alternatives, comprises the steps of:

identifying best generation and allocation of steam energy utilities, and synthesizing the combined heat and power utility system that satisfies the eco-industrial park utilities demands during each of the plurality of time zones as well as rendering its best operating scenario at each specific time-zone.

27. A method as defined in claim 25, wherein the step of generating a plurality of technically viable energy efficient eco-industrial park alternatives, comprises the steps of:

calculating required steam supply and demand levels and loads for the plurality of functional areas;

establishing a virtual functional area steam supply-demand cascade in space from steam supply and demand loads respectively at each a plurality of steam levels;

calculating total supply and demand loads at each steam level responsive to the cascade of the functional areas steam supply and demand in space;

defining functional area arrangements which minimize steam transportation; and identifying amounts of steam to be transferred from one functional area to another to achieve global minimum steam demand before steam letdowns.

28. A method as defined in claim 25, wherein the step of generating a plurality of technically viable energy efficient eco-industrial park alternatives, comprises the step of performing a domino affect low-pressure steam sharing targeting process, comprising the steps of:

allocating low-pressure steam to functional areas in a mosaic starting with a central power plant or main cogeneration plant then followed by functional areas arranged in the form of demand supply demand and ending by functional area demand, steam being transferred from one functional area to the next functional area primarily or completely only to avoid long distances and steam condensation, a plurality of the functional areas acting as a conduit to pass steam from a supplying functional area to another functional area without requiring steam from the supplying functional area;

highlighting in-process modifications that can be performed to enhance process or functional area capability in producing more steam or whose status can be changed from demanding to supplying or vice versa; and arranging the functional areas by their geographical locations to reduce steam travel distances and steam condensation.

29. A computerized method comprising the steps of:

identifying, by a computer processor, a plurality of functional areas for an eco-industrial park, the plurality of functional areas comprising a plurality of industrial functional areas and one or more non-industrial functional areas in adjacent geographical locations, the plurality of industrial functional areas comprising one or more of the following: a plurality of spatial zones, a plurality of blocks, a plurality of facilities, a plurality of plants, and a plurality of batch and continuous process units, each of the plurality of industrial functional areas containing one or more process streams comprising one or more of the following: one or more hot process streams to be cooled and one or more cold process streams to be heated, each of the one or more non-industrial functional areas containing one or more of the following: one or more hot streams and one or more cold streams;

identifying, by the computer processor, at least all significant heating and cooling tasks for each significant time-dependent and non-time-dependent industrial and non-industrial activities within the eco-industrial park;

responsive to the identified functional areas and identified significant heating and cooling tasks, determining, by a computer processor, one or more inter-time zone thermal energy integration thermal targets and one or more intra-time zone thermal energy integration thermal targets;

responsive to the one or more inter-time zone thermal energy integration thermal targets and one or more intra-time zone thermal energy integration thermal targets, identifying, by the computer processor, one or more potential inter-time zone thermal energy integration matching solutions across a plurality of time zones and a plurality of the functional areas within each time zone to satisfy a thermal load to be integrated via inter-time zone thermal energy integration;

identifying, by the computer processor, one or more intra-time zone thermal energy integration matching solutions for each of the plurality of time zones and across a plurality of the functional areas having one or more tasks operating within the respective time zones when having more than one functional area associated therewith; and generating, by the computer processor, a plurality of technically viable energy efficient eco-industrial park alternatives that satisfies eco-industrial park utilities demands during each of the plurality of time zones as well as rendering a corresponding optimal operating scenario at each specific time-zone.

30. A computerized method comprising the steps of:

identifying, by a computer processor, a plurality of functional areas for an eco-industrial park, the plurality of functional areas comprising a plurality of industrial functional areas and one or more non-industrial functional areas in adjacent geographical locations, the plurality of industrial functional areas comprising one or more of the following: a plurality of spatial zones, a plurality of blocks, a plurality of facilities, a plurality of plants, and a plurality of batch and continuous process units, each of the plurality of industrial functional areas containing one or more process streams comprising one or more of the following: one or more hot process streams to be cooled and one or more cold process streams to be heated, each of the one or more non-industrial functional areas containing one or more of the following: one or more hot streams and one or more cold streams;

identifying, by the computer processor, at least all significant heating and cooling tasks for each significant time-dependent and non-time-dependent industrial and non-industrial activities for the eco-industrial park;

determining, by the computer processor, one or more inter-time zone thermal energy integration thermal targets and one or more intra-time zone thermal energy integration thermal targets, comprising the steps of:
identifying total supply and demand thermal energy loads at each of a plurality of temperature intervals,
identifying inter-time zone surplus thermal energy load between each of the plurality of time zones at each of the plurality of temperature intervals, the plurality of time zones comprising at least three time zones,
identifying total supply and demand thermal energy loads at each of the plurality of time zones at each of the plurality of temperature intervals, and
identifying a thermal energy load to be integrated via inter-time zone thermal energy integration matching;

identifying, by the computer processor, the global minimum heating and cooling needs for the dependent and non-time dependent industrial and non-industrial activities;

receiving, by the computer processor, a decision-maker selection of a desired level or levels of thermal energy integration for heating utility, cooling utility, or both heating and cooling utilities;

identifying, by the computer processor, one or more potential inter-time zone thermal energy integration matching solutions across the plurality of time zones and across a plurality of the functional areas having one or more tasks operating within each of the respective time zones when having more than one functional area associated therewith to satisfy a thermal load or loads to be integrated via inter-time zone thermal energy integration, comprising the steps of:
identifying best set and second best matching solutions from the one or more potential inter-time zone thermal energy integration matching solutions, and
selecting a matching solution satisfying the desired level or levels of thermal energy integration selected by the decision-maker;

identifying, by the computer processor, media of the thermal load or loads to be integrated via inter-time zone thermal energy integration, the media comprising one or more of the following: thermal energy storage, rescheduling of activities or process streams, and changing of process stream flow rates;

identifying, by the computer processor, one or more intra-time zone thermal energy integration matching solutions for each of the plurality of time zones and across a plurality of the functional areas having one or more tasks operating within the respective time zone when having more than one functional area associated therewith,
identifying best and the second best matching solutions among the hot and cold process streams in the eco-industrial park for spatial energy integration, and
identifying best and second best matching solutions among each of the plurality of time-zones for temporal energy integration and greenhouse gas emissions reduction for optimal synthesis or retrofit of the eco-industrial park, generating, by the computer processor, a plurality of technically viable energy efficient eco-industrial park alternatives having similar physical structure and that satisfies eco-industrial park utilities demands during each of the plurality of time zones as well as rendering a corresponding optimal operating scenario at each specific time-zone, comprising the steps of:
identifying best generation and allocation of energy utilities, and
synthesizing the combined heat and power utility system that satisfies the eco-industrial park utilities demands during each of the plurality of time zones as well as rendering its best operating scenario at each specific time-zone.

* * * * *